United States Patent
Jeon et al.

(10) Patent No.: US 10,877,728 B2
(45) Date of Patent: Dec. 29, 2020

(54) ARTIFICIAL INTELLIGENCE REFRIGERATOR

(71) Applicant: LG ELECTRONICS INC., Seoul (KR)

(72) Inventors: Chansung Jeon, Seoul (KR); Hyocheol Jeong, Seoul (KR); Sanghun Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/794,909

(22) Filed: Feb. 19, 2020

(65) Prior Publication Data

US 2020/0183649 A1 Jun. 11, 2020

Related U.S. Application Data

(63) Continuation of application No. 15/860,191, filed on Jan. 2, 2018, now Pat. No. 10,599,392.

(30) Foreign Application Priority Data

Jan. 2, 2017 (KR) .................. 10-2017-0000484

(51) Int. Cl.
*G06F 3/16* (2006.01)
*F25D 23/02* (2006.01)
(Continued)

(52) U.S. Cl.
CPC ............ *G06F 3/167* (2013.01); *A47F 3/0434* (2013.01); *F25D 23/02* (2013.01); *F25D 23/028* (2013.01); *F25D 29/00* (2013.01); *G06F 3/0482* (2013.01); *G06F 3/04886* (2013.01); *G09G 5/10* (2013.01); *G10L 15/22* (2013.01); *F25D 2400/361* (2013.01); *F25D 2700/04* (2013.01); *G02B 6/009* (2013.01); *G02B 6/0068* (2013.01); *G02B 6/0088* (2013.01); *G02B 6/0091* (2013.01);
(Continued)

(58) Field of Classification Search
CPC .................................................... A47F 3/0434
See application file for complete search history.

(56) References Cited

U.S. PATENT DOCUMENTS

2012/0105424 A1 5/2012 Lee et al.
2015/0267960 A1 9/2015 Cheon et al.
2015/0379992 A1 12/2015 Lee et al.

FOREIGN PATENT DOCUMENTS

KR   10-2007-0116336   12/2007

OTHER PUBLICATIONS

European Extended Search Report in European Application No. 17208470.9, dated May 15, 2018, 10 pages.

*Primary Examiner* — Gustavo Polo
(74) *Attorney, Agent, or Firm* — Ked & Associates, LLP

(57) ABSTRACT

Provided is an artificial intelligence refrigerator. The artificial intelligence refrigerator includes a cabinet defining a storage space, a door opening and closing the cabinet, a transparent display assembly which covers an opened see-through part of the door and through which an inner space of the artificial intelligence refrigerator is seen, and a screen is outputted, a display PCB controlling an operation of the transparent display assembly, a voice recognition unit connected to the display PCB to process a user's voice signal, and a microphone connected to the voice recognition unit. The display PCB outputs output screens of the transparent display assembly in stages according to a processing state of the voice signal when a user's voice is inputted.

20 Claims, 44 Drawing Sheets

(51) Int. Cl.
*A47F 3/04* (2006.01)
*F25D 29/00* (2006.01)
*G06F 3/0482* (2013.01)
*G06F 3/0488* (2013.01)
*G09G 5/10* (2006.01)
*G10L 15/22* (2006.01)
*F21V 8/00* (2006.01)

(52) U.S. Cl.
CPC . *G09G 2320/0626* (2013.01); *G09G 2354/00* (2013.01); *G10L 2015/223* (2013.01)

ARTIFICIAL INTELLIGENCE REFRIGERATOR

CROSS-REFERENCE TO RELATED APPLICATIONS

The present application is a Continuation of U.S. application Ser. No. 15/860,191, filed Jan. 2, 2018, which claims priority under 35 U.S.C. 119 and 35 U.S.C. 365 to Korean Patent Application No. 10-2017-0000484, filed Jan. 2, 2017, whose entire disclosures are hereby incorporated by reference.

BACKGROUND

The present disclosure relates to a refrigerator. In general, refrigerators are home appliances for storing foods at a low temperature in a storage space that is covered by a door. For this, refrigerators cool the inside of the storage space by using cool air generated by being heat-exchanged with a refrigerant circulated through a refrigeration cycle to store foods in an optimum state.

In recent years, refrigerators tend to increase in size more and more, and multi-functions are applied to refrigerators as dietary life changes and high-quality is pursued, and accordingly, refrigerators of various structures for user convenience and efficient use of an internal space are being brought to the market.

A storage space of such a refrigerator may be opened and closed by a door. Also, refrigerators may be classified into various types according to an arranged configuration of the storage space and a structure of the door for opening and closing the storage space.

Generally, the refrigerator has a limitation that foods stored therein are not confirmed unless the door is not opened. That is, the door has to be opened to confirm that a desired food is stored in the refrigerator or in a separate storage space provided in the door. In addition, if the stored position of the food is not known precisely, an opened time of the door may increase, or the number of times for opening the door increases. In this case, there is a limitation that unnecessary leakage of cool air occurs. In recent years, to solve such a limitation, a refrigerator has been developed while allows a portion of a door thereof to be transparent or allows the inside thereof to be seen from the outside.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Reference will now be made in detail to the embodiments of the present disclosure, examples of which are illustrated in the accompanying drawings. The invention may, however, be embodied in many different forms and should not be construed as being limited to the embodiments set forth herein; rather, that alternate embodiments included in other retrogressive inventions or falling within the spirit and scope of the present disclosure will fully convey the concept of the invention to those skilled in the art.

Figure 1:
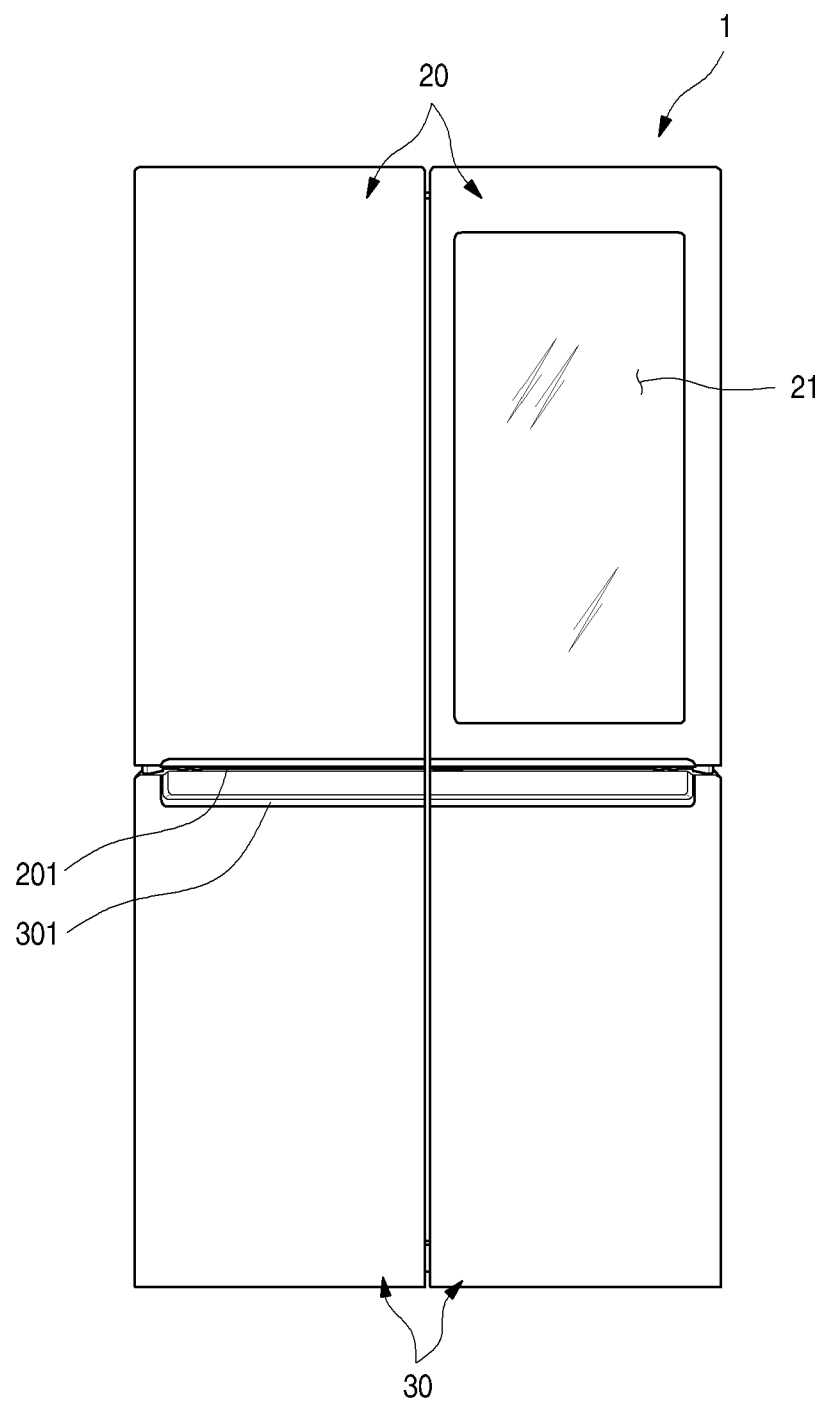
FIG. 1 is a front view of a refrigerator according to an embodiment.
Figure 2:
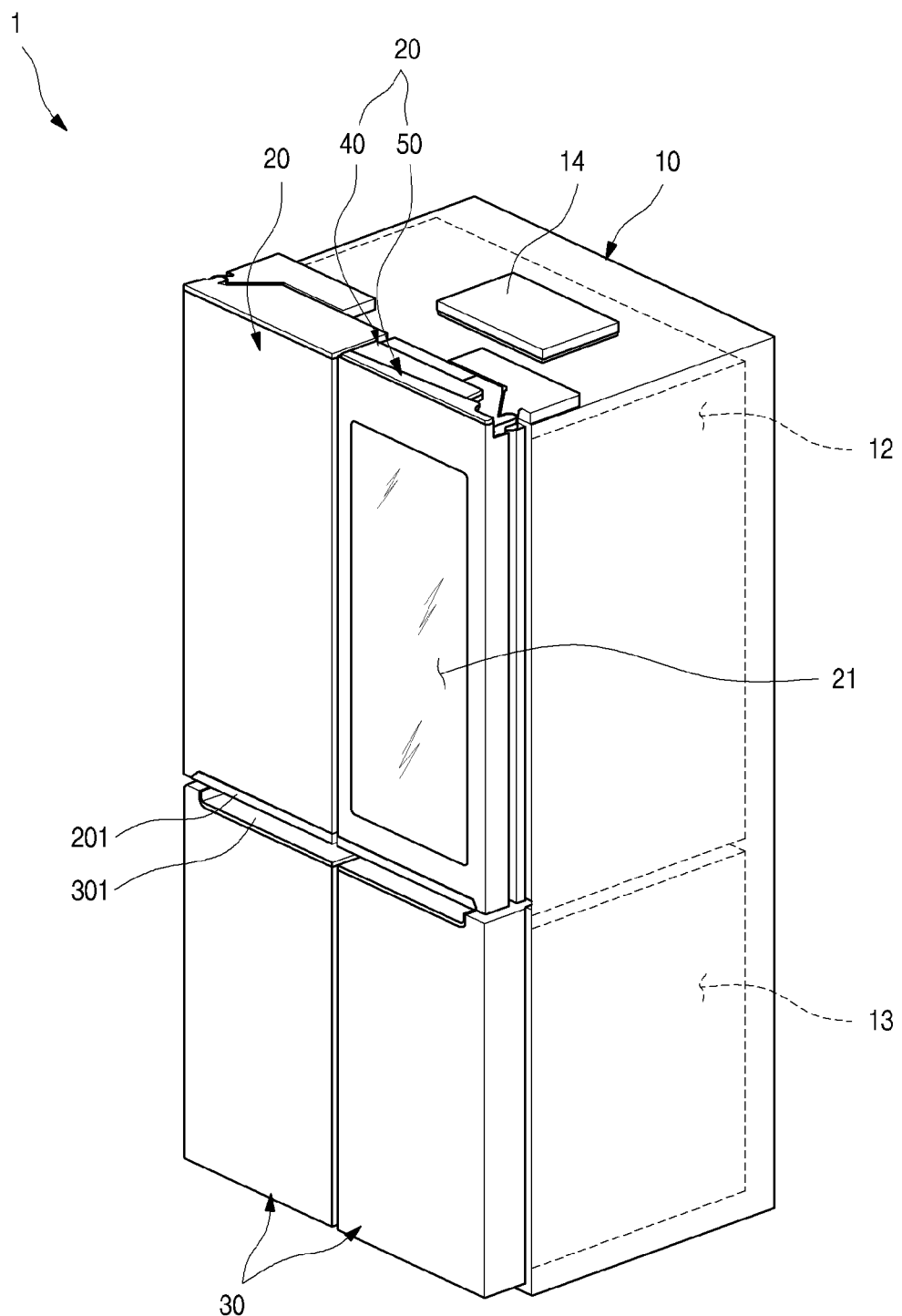
FIG. 2 is a perspective view of the refrigerator.

FIG. 1 is a front view of a refrigerator according to an embodiment. Also, FIG. 2 is a perspective view of the refrigerator. Referring to FIGS. 1 and 2, a refrigerator 1 according to an embodiment includes a cabinet 10 defining a storage space and a door that opens or closes the storage space. Here, an outer appearance of the refrigerator 1 may be defined by the cabinet 10 and the door.

Figure 11:
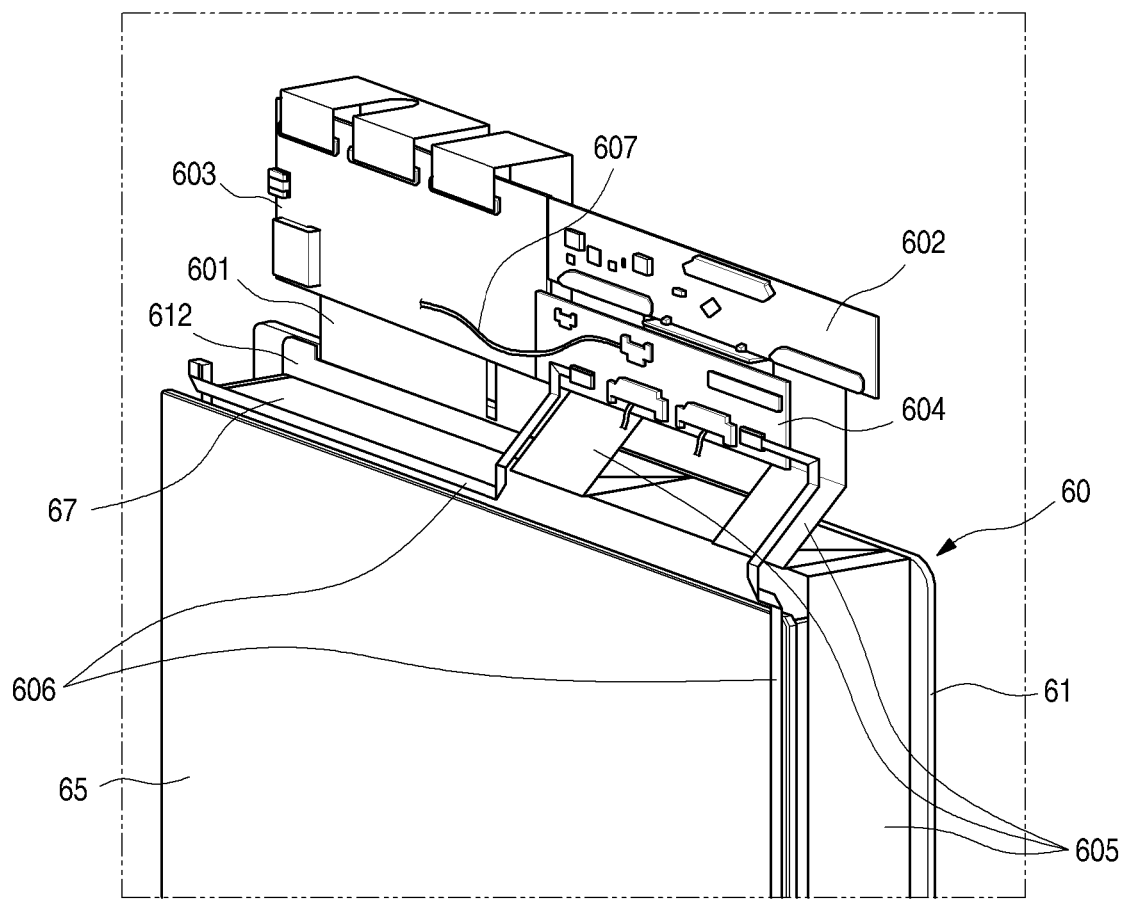
FIG. 11 is a partial perspective view illustrating a state in which a PCB is disposed on an upper portion of the transparent display assembly.

The inside of the cabinet 10 is partitioned into upper and lower portions by a barrier (see FIG. 11). A refrigerating compartment 12 may be defined in the upper portion of the cabinet 10, and a freezing compartment 13 may be defined in the lower portion of the cabinet 10.

Also, a control unit 14 for controlling an overall operation of the refrigerator 1 may be disposed on a top surface of the cabinet 10. The control unit 14 may be configured to control a cooling operation of the refrigerator as well as electric components for selective see-through and screen output of a see-through part 21.

The door may include a refrigerating compartment door 20 and a freezing compartment door 30. The refrigerating compartment door 20 may be opened and closed by rotating an opened front surface of the refrigerating compartment 12, and the freezing compartment door 30 may be switched by rotating an opened front surface of the freezing compartment 13.

Also, the refrigerating compartment door 20 may be provided in a pair of left and right doors. Thus, the refrigerating compartment 12 is covered by the pair of doors. The freezing compartment door 30 may be provided in a pair of left and right doors. Thus, the freezing compartment 13 may be opened and closed by the pair of doors. Alternatively, the freezing compartment door 30 may be withdrawable in a draw type as necessary and provided as one or more doors.

Although a refrigerator having a French type door in which a pair of doors rotate to open and close one space is applied to a bottom freezer type refrigerator in which the freezing compartment 13 is provided at a lower portion, is described as an example in this embodiment, the present disclosure may be applied to all types of refrigerators including door without being limited to shapes of the refrigerators.

Also, recessed handle grooves 201 and 301 may be provided in a lower end of the refrigerating compartment door 20 and an upper end of the freezing compartment door 30. A user may insert a his/her hand into the handle groove 201 or 301 to open and close the refrigerating compartment door 20 or the freezing compartment door 30.

At least one door may be provided so that the inside of the refrigerator is seen through the door. A see-through part 21, which is an area through which the storage space in the rear surface of the door and/or the inside of the refrigerator are seen, may be provided in the refrigerating compartment door 20. The see-through part 21 may constitute at least a portion of a front surface of the refrigerating compartment door 20. The see-through part 21 may be selectively transparent or opaque according to user's manipulation. Thus, foods accommodated in the refrigerator may be accurately identified through the see-through part 21.

Also, although the structure in which the see-through part 21 is provided in the refrigerating compartment door 20 is described as an example in this embodiment, the see-through part 21 may be provided in different types of refrigerator doors such as the freezing compartment door 30 according to a structure and configuration of the refrigerator.

Figure 3:
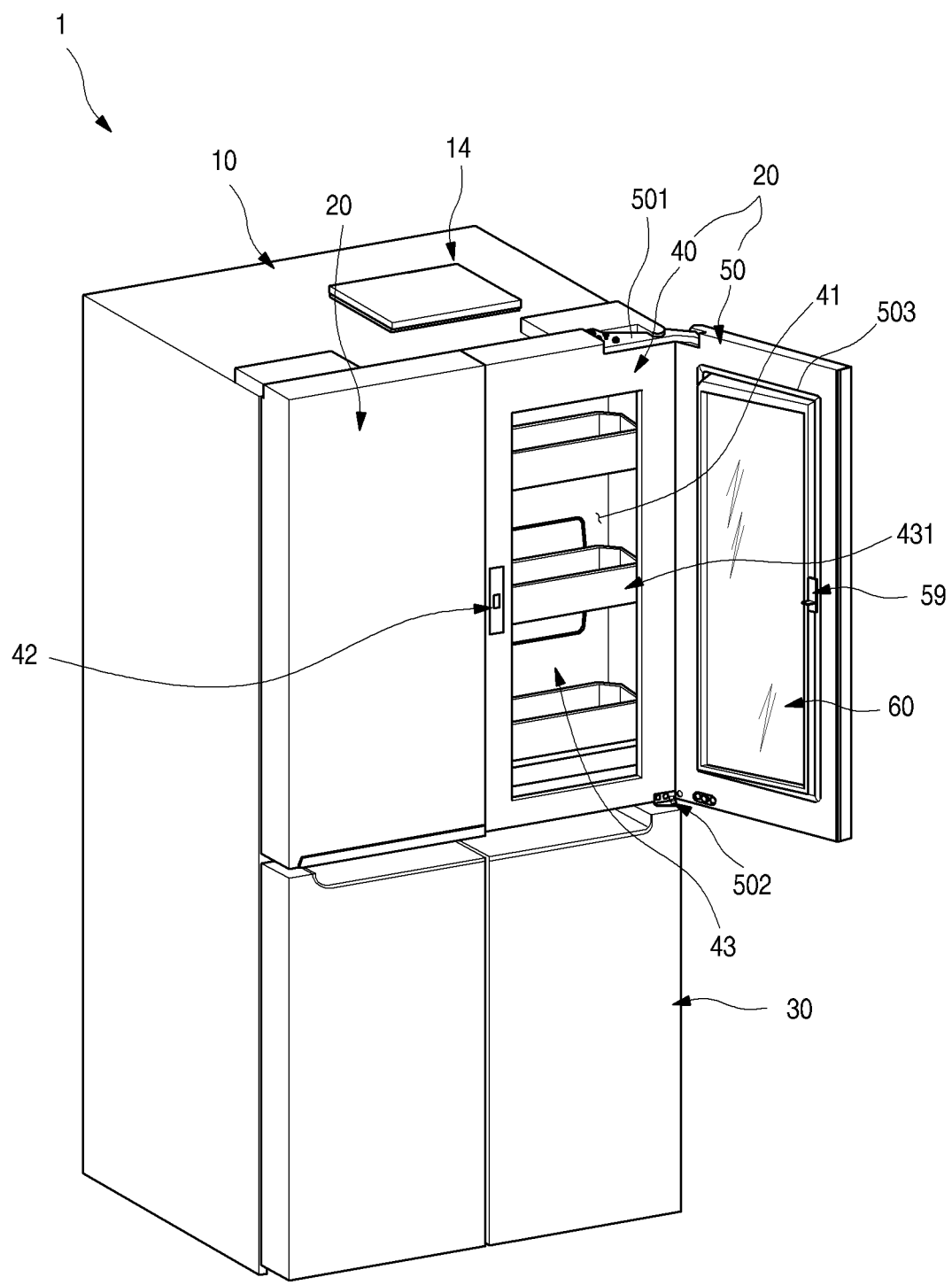
FIG. 3 is a perspective view of the refrigerator with a sub door opened.
Figure 4:
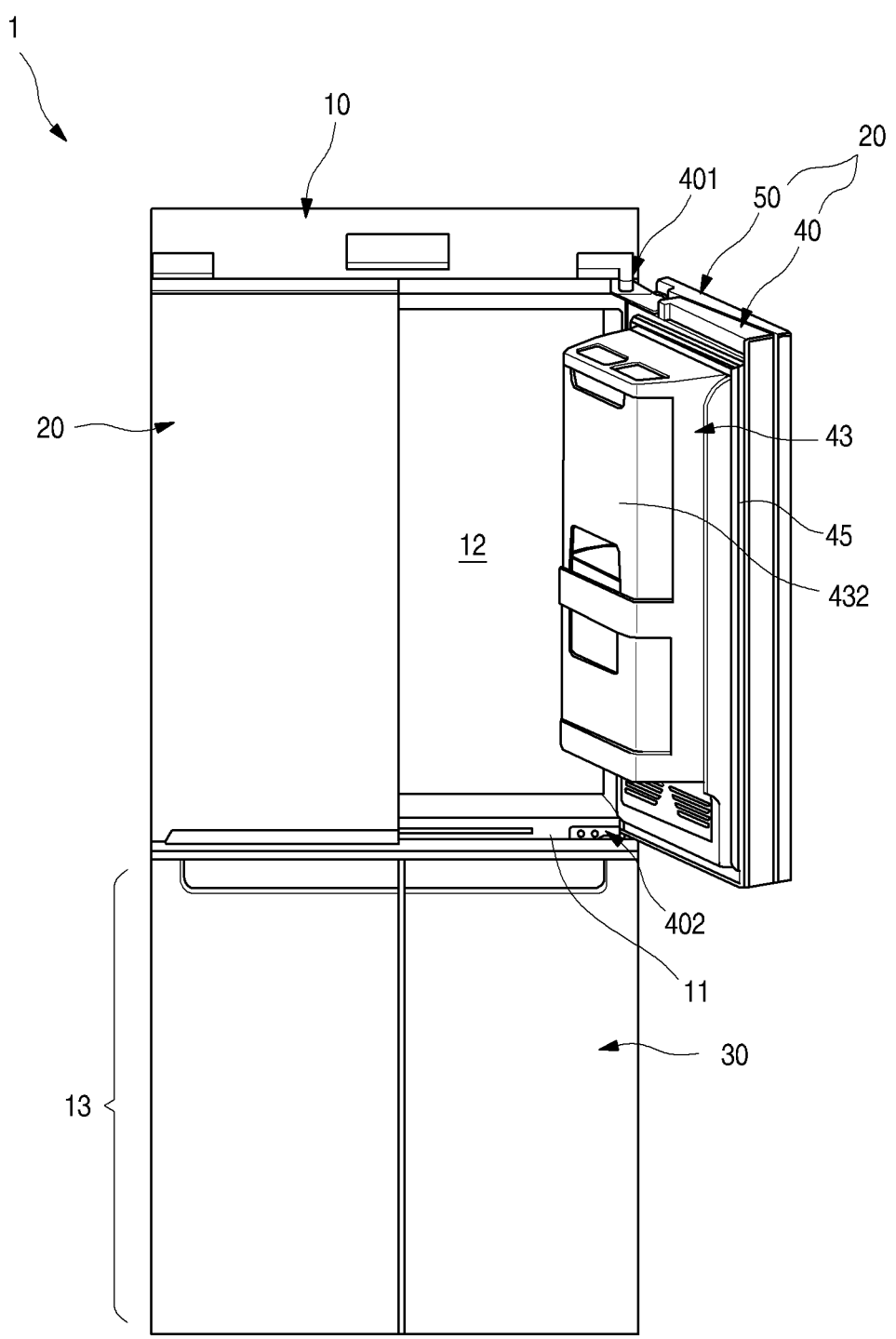
FIG. 4 is a perspective view of the refrigerator with a main door opened.

FIG. 3 is a perspective view of the refrigerator with a sub door opened. Also, FIG. 4 is a perspective view of the refrigerator with a main door opened. As illustrated in FIGS. 3 and 4, the refrigerating compartment door 20, which is disposed at the right side (when viewed in FIG. 3), of the pair of refrigerating compartment doors 20 may be doubly opened and closed. In detail, the refrigerating compartment door 20, which is disposed at the right side, may include a main door 40 that opening and closing the refrigerating compartment 12 and a sub door 50 rotatably disposed on the main door 40 to open and close an opening defined in the main door 40.

The main door 40 may have the same size as that of the refrigerating compartment door 20, which is disposed at the left side (when viewed in FIG. 1), of the pair of refrigerating compartment doors 20. The main door 40 may be rotatably mounted on the cabinet 10 by an upper hinge 401 and a lower hinge 402 to open at least a portion of the refrigerating compartment door 20.

Also, an opening 41 that is opened with a predetermined size is defined in the main door 40. A door basket 431 may be mounted on the rear surface of the main door 40 as well as the inside of the opening 41. Here, the opening 41 may have a size that occupies most of the front surface of the main door 40 except for a portion of a circumference of the main door 40. Also, a main gasket 45 may be disposed on a circumference of the rear surface of the main door 40 to prevent cool air within an internal space of the cabinet 10 from leaking when the main door 40 is opened.

The sub door 50 may be rotatably mounted on the front surface of the main door 40 to open and close the opening 41. Thus, the sub door 50 may be opened to expose the opening 41.

The sub door 50 may have the same size as the main door 40 to cover the entire front surface of the main door 40. Also, when the sub door 50 is closed, the main door 40 and the sub door 50 may be coupled to each other to provide the same size and configuration as those of the left refrigerating compartment door 20. Also, a sub gasket 503 may be disposed on the rear surface of the sub door 50 to seal a gap between the main door 40 and the sub door 50.

A transparent display assembly 60 that selectively sees the inside and outputs a screen may be disposed at a center of the sub door 50. Thus, even though the sub door 50 is closed, the inside of the opening 41 may be selectively seen, and also an image inside the opening 41 may be outputted. The see-through part 21 may be a portion of the sub door 50, through which the inside of the refrigerator 1 is seen. However, the see-through part 21 may not necessarily match the entirety of the transparent display assembly 60.

The transparent display assembly 60 may be configured to be selectively transparent or opaque according to user's manipulation. Thus, only when the user desires, the transparent display assembly 60 may be transparent so that the inside of the refrigerator 1 is visualized, otherwise, be maintained in the opaque state. Also, the transparent display assembly 60 may output a screen in the transparent or opaque state.

A sub upper hinge 501 and a sub lower hinge 502 may be respectively provided on upper and lower ends of the sub door 50 so that the sub door 50 is rotatably mounted on the front surface of the main door 40. Also, an opening device 59 may be provided on the sub door 50. A locking unit 42 may be provided on the main door 40 to correspond to the opening device 59. Thus, the sub door 50 may be maintained in the closed state by the coupling between the opening device 59 and the locking unit 42. When the coupling between the opening device 59 and the locking unit 42 is released by manipulation of the opening device 59, the sub door 50 may be opened with respect to the main door 40.

Also, a damping device 504 (see FIG. 6) may be provided on a lower end of the sub door 50. The damping device 504 may be disposed on edges of the lower end and lateral end of the sub door 50, which are adjacent to the sub lower hinge 502, so that an impact is damped when the sub door 50 having a relatively heavy weight by the transparent display assembly 60 is closed.

An accommodation case 43 may be provided in the rear surface of the main door 40. A plurality of door baskets 431 may be disposed on the accommodation case 43, and a case door 432 may be provided on the accommodation case 43.

Figure 5:
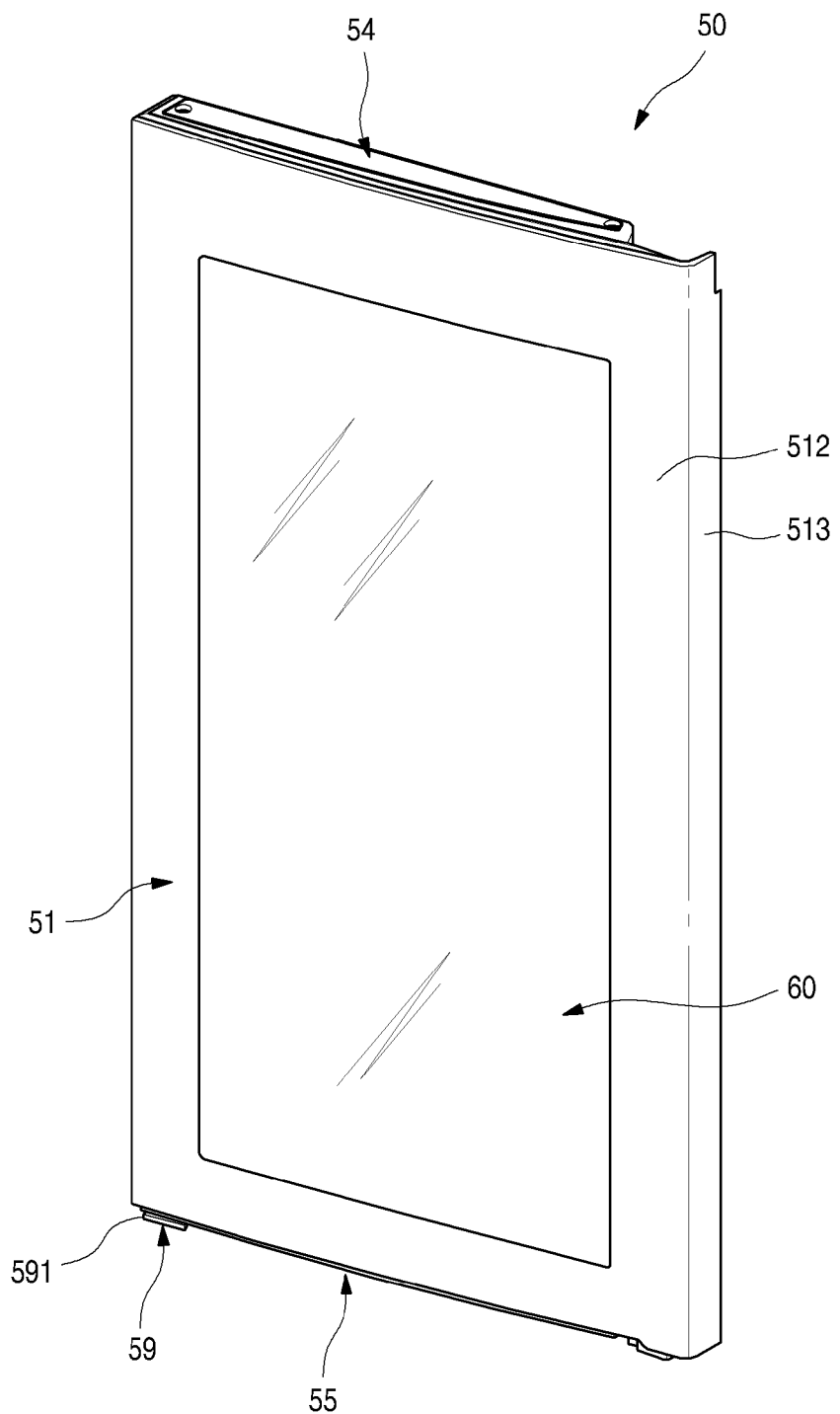
FIG. 5 is a perspective view of the sub door when viewed from a front side.
Figure 6:
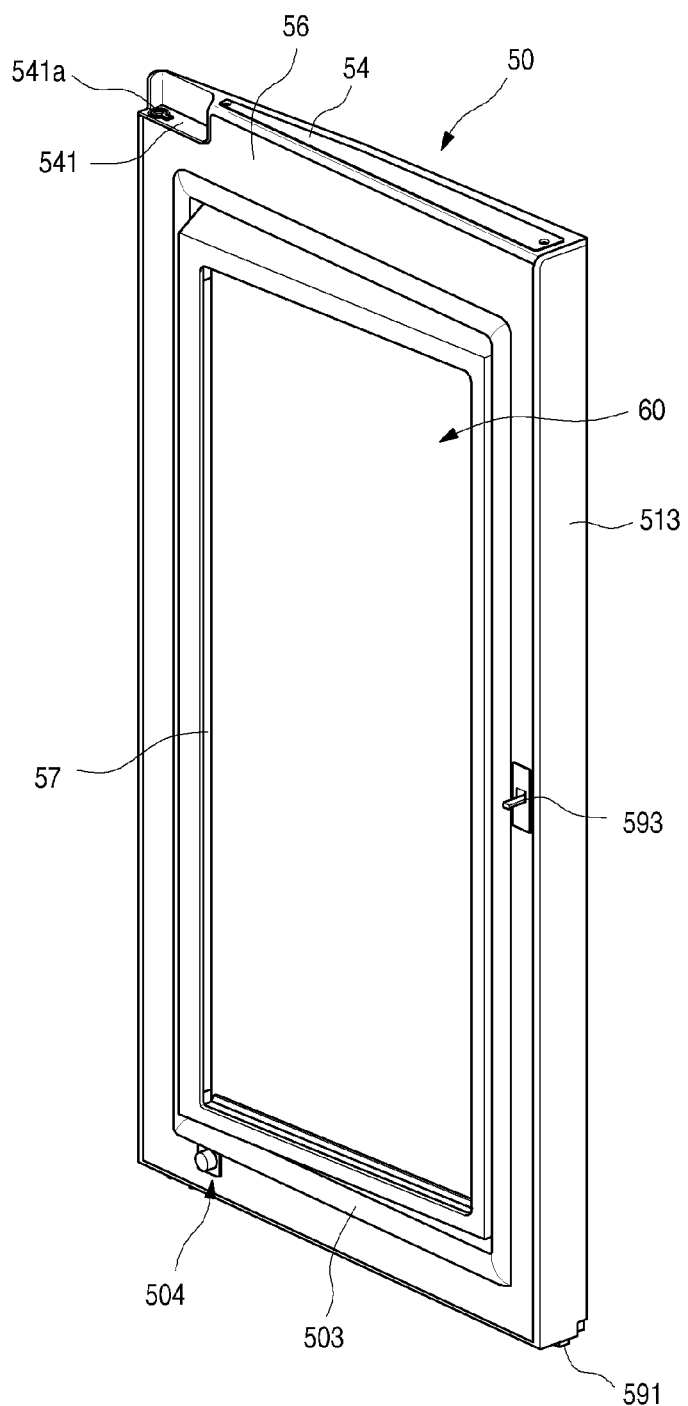
FIG. 6 is a perspective view of the sub door when viewed from a rear side.
Figure 7:
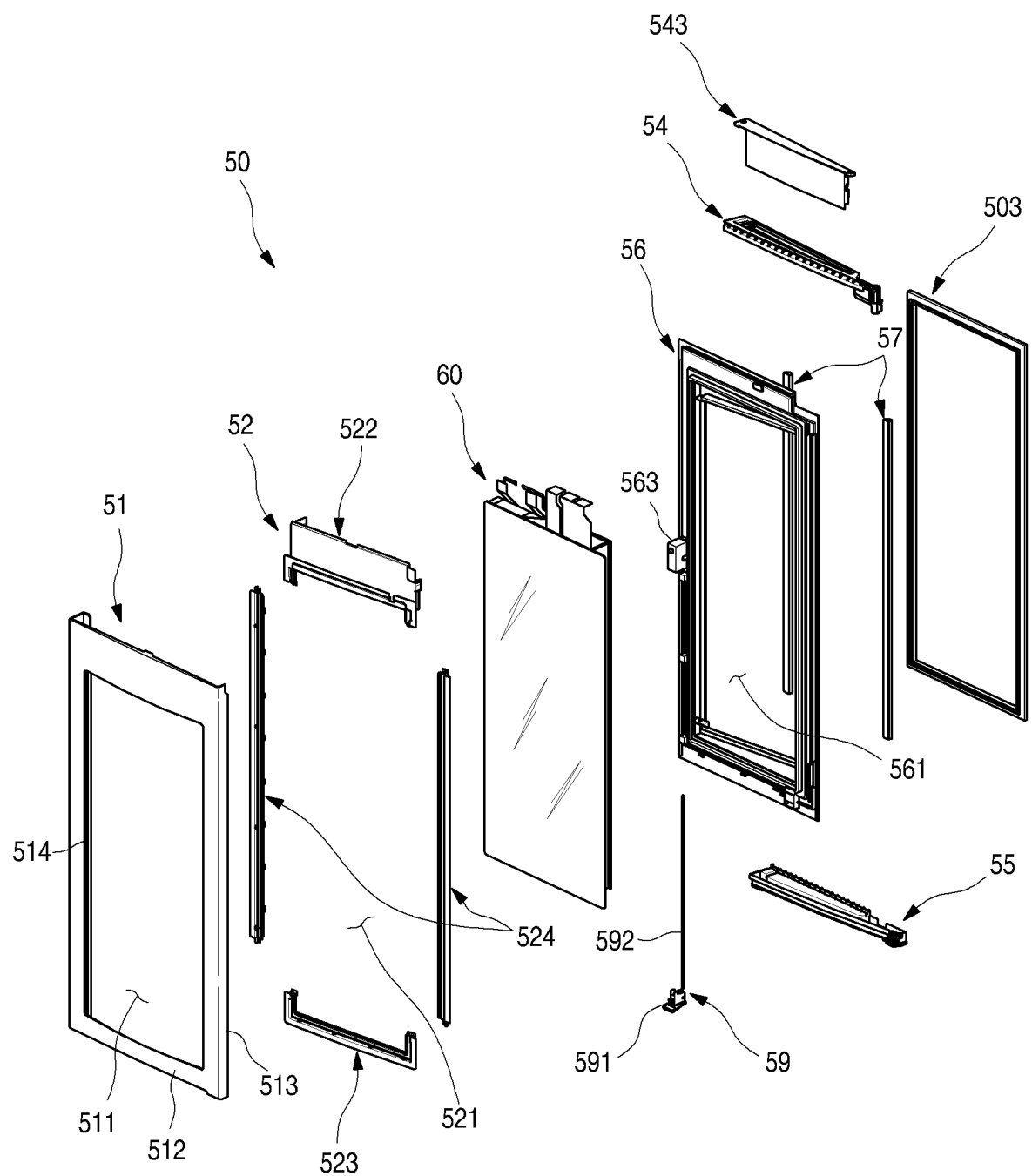
FIG. 7 is an exploded perspective view of the sub door.

FIG. 5 is a perspective view of the sub door 50 when viewed from a front side. FIG. 6 is a perspective view of the sub door 50 when viewed from a rear side. Also, FIG. 7 is an exploded perspective view of the sub door 50. As illustrated in the drawings, the sub door 50 may include an outer plate 51 defining an outer appearance of the sub door 50, a door liner 56 mounted to be spaced apart from the outer plate 51, the transparent display assembly 60 mounted on an opening of the outer plate 51 and the door liner 56, and upper and lower cap decos 54 and 55 defining the top and bottom surfaces of the sub door 50. The above-described constituents may be coupled to define the whole outer appearance of the sub door 50.

The outer plate 51 may constitute an outer appearance of the front surface of the sub door 50 and a portion of a circumferential surface of the sub door 50 and be made of a stainless steel material. The outer plate 51 may constitute a portion of the outer appearance of the sub door 50 as well as the front surface of the sub door 50. Also, the outer plate 51 may be made of the same material of the front surface of each of the refrigerating compartment door 20 and the freezing compartment door 30. Various surface treatments such as coating or film attachment so as to realize anti-fingerprint coating, hair lines, colors, or patterns may be performed on the front surface of the outer plate 51.

The outer plate 51 may include a front part 512 defining the outer appearance of the front surface and a side part 513 defining an outer appearance of the side surface that is exposed to the outside. Also, a plate opening 511 may be defined at a center of the front part 512. Here, the plate opening 511 may be covered by the transparent display assembly 60. Also, since the inside of the refrigerator 1 is seen through the transparent display assembly 60 covering the plate opening 511, the inside of the plate opening 511 is called the see-through part 21.

The front part 512 may have a curvature that gradually decreases outward from a central side of the refrigerator 1 as a whole. The front part 512 may be rounded to correspond to the front surface of the refrigerating compartment door 20, which is adjacent to the front part 512. Thus, the outer appearance of the front surface of the refrigerator 1 may be three-dimensionally viewed as a whole.

Also, an opening bent part 514 that is bent backward may be disposed on a circumferential surface of the plate opening 511. The opening bent part 514 may be disposed along a circumference of the plate opening 511 and extend by a predetermined length so as to be inserted into and fixed to an inner frame 52 that will be described below. Thus, the plate opening 511 may be defined by the opening bent part 514.

The side part 513 that is bent backward may be disposed on each of both ends of the front part 512. The side part 513 may define an outer appearance of the side surface of the sub door 50. Also, an end of the side part 513 may also be bent inward to be coupled to the door liner 56.

Upper and lower ends of the outer plate 51 may also be bent to be coupled to the upper cap deco 54 and the lower cap deco 55. Thus, the outer plate 51 may define the outer appearance of the sub door 50 by being coupled to the door liner 56 and the upper and lower cap decos 54 and 55.

The door liner 56 defines the rear surface of the sub door 50 and has a door liner opening 561 in the area on which the transparent display assembly 60 is disposed. Also, a sub gasket 503 for sealing a gap between the sub door 50 and the main door 40 may be mounted on the rear surface of the door liner 56.

Also, a door light 57 may be provided on each of both sides of the door liner opening 561. The door light 57 may illuminate the rear surface of the sub door 50 and a rear side of the transparent display assembly 60.

Thus, the door light 57 may illuminate an inner space of the accommodation case 43, and simultaneously, serve as an auxiliary backlight function of the transparent display assembly 60 to more clearly output a screen of the transparent display assembly 60. When the door light 57 is turned on, the inside of the accommodation case 43 may be brightened up, and thus, the inside of the refrigerator 1 may be more brightened up than the outside of the refrigerator 1 so that the inside of the refrigerator 1 may be visualized through the transparent display assembly 60.

The door light 57 may be disposed on both sides of the transparent display assembly 60 in directions facing each other. The mounted position of the door light 57 may variously vary as long as the door light 57 has sufficient brightness at the rear side of the sub door.

Also, the opening device 59 may be mounted on the door liner 56. The opening device 59 may include a manipulation member 591 exposed to the lower end of the sub door 50, a load 592 extending from the manipulation member 591, and a locking member 593 protruding from the rear surface of the door liner 56. The user may manipulate the manipulation member 591 to allow the load 592 to move the locking member 593 so that the sub door 50 is selectively restricted by the main door 40 and also to manipulate the opening and closing of the sub door 50.

The upper cap deco 54 may define a top surface of the sub door 50 and be coupled to upper ends of the outer plate 51 and the door liner 56. Also, a sub upper hinge mounting part 541 may be disposed on one end of the upper cap deco 54, and a hinge hole 541a into which a hinge shaft of the upper hinge 401 is inserted may be defined in the sub upper hinge mounting part 541. A structure of the upper cap deco 54 will be described below in more detail. The lower cap deco 55 may define a bottom surface of the sub door 50 and be coupled to lower ends of the outer plate 51 and the door liner 56.

The transparent display assembly 60 may be disposed between the outer plate 51 and the door liner 56. Also, the transparent display assembly 60 may be configured to cover the plate opening 511 and the door liner opening 561. Also, the transparent display assembly 60 may be selectively manipulated to one state of transparent, translucent, opaque, and screen output states by the user. Thus, the user may selectively see through the inner space of the sub door 50 through the transparent display assembly 60 and see the screen outputted through the transparent display assembly 60.

The inner frame 52 for supporting the transparent display assembly 60 is mounted on a circumference of the plate opening 511 of the outer plate 51. The transparent display assembly 60 may be fixed and mounted on the outer plate 51 by the inner frame 52. Particularly, a front surface of the outer plate 51 and the front surface of the transparent display assembly 60 may be disposed on the same extension line so that the front surface of the sub door 50 has a sense of unity.

A frame opening 521 is defined at a center of the inner frame 52. The frame opening 521 has a size somewhat less than that of the plate opening 511 and has a structure in which the transparent display assembly 60 is seated thereon. Also, the frame opening 521 may have a size less than that of the front panel 61 and greater than that of the rear panel 65. Thus, when the transparent display assembly 60 is mounted, the rear panel 65 may successively pass through the plate opening 511 and the frame opening 521 and then be seated on the door liner 56.

Also, the inner frame 52 may have a coupling structure with the outer plate 51. Here, the outer plate 51 and an end of the transparent display assembly 60 may be mounted on the inner frame 52 in a state in which the outer plate 51 and the end of the transparent display assembly 60 are closely attached to each other.

Thus, when the transparent display assembly 60 is mounted, the inner frame 52 may support a rear surface of the plate opening 511 of the outer plate 51 and a rear surface of the circumference of the transparent display assembly 60 at the same time. Also, in the state in which the transparent display assembly 60 is mounted, the front surface of the outer plate 51 and the front surface of the transparent display assembly 60 may be disposed on the same plane without being stepped with respect to each other.

Figure 8:
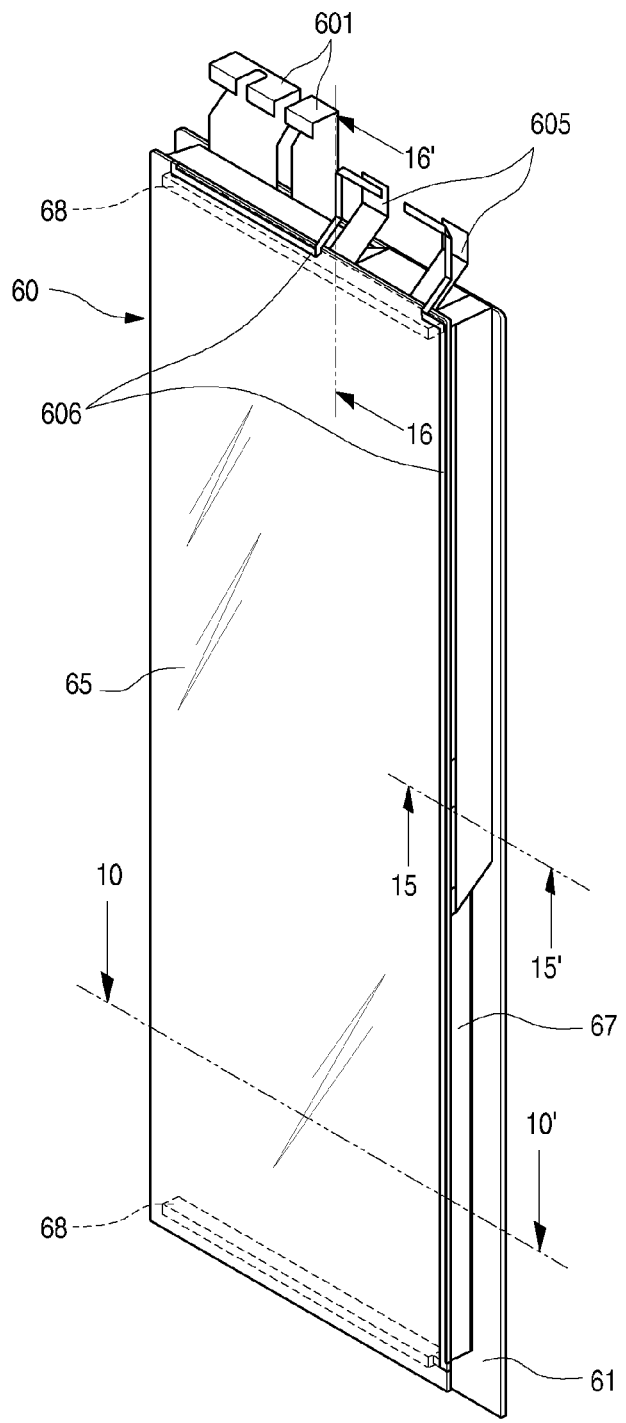
FIG. 8 is a perspective view of a transparent display assembly according to an embodiment.
Figure 9:
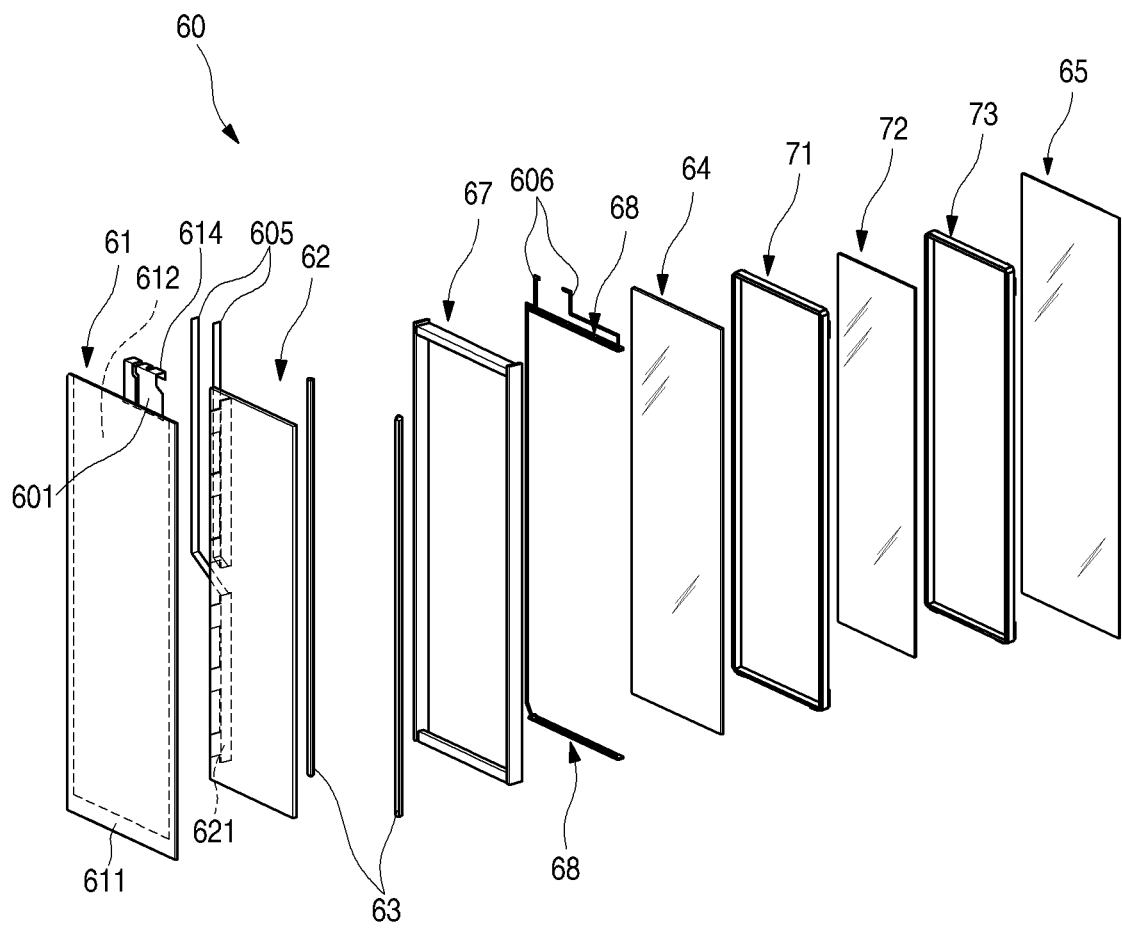
FIG. 9 is an exploded perspective view of the transparent display assembly.
Figure 10:
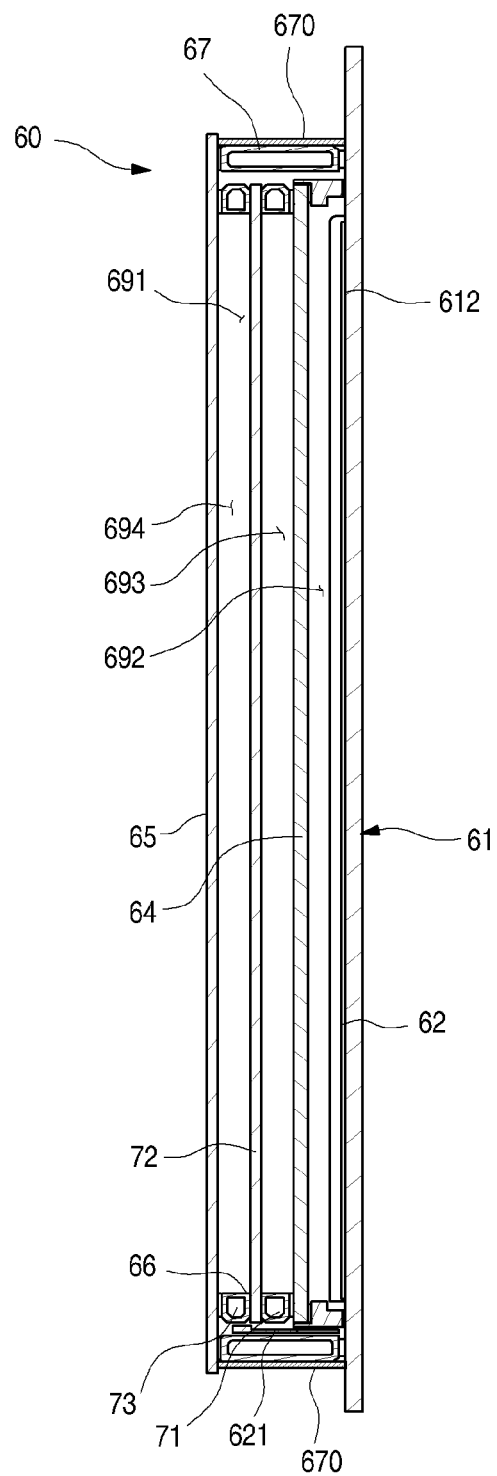
FIG. 10 is a cross-sectional view taken along line 10-10' of FIG. 8.

FIG. 8 is a perspective view of the transparent display assembly according to the first embodiment. Also, FIG. 9 is an exploded perspective view of the transparent display assembly. Also, FIG. 10 is a cross-sectional view taken along line 10-10' of FIG. 8. As illustrated in the drawings, the transparent display assembly 60 may have a size that is enough to cover the plate opening 511 and the liner opening 561 inside the sub door 50. Also, the see-through part 21 may be provided in the transparent display assembly 60 so that the inner space of the refrigerator is selectively seen, and a screen is outputted.

In more detail with respect to the transparent display assembly 60, the transparent display assembly 60 may have an outer appearance that is defined by the front panel 61 and the rear panel 65, which define the front and rear surfaces of the transparent display assembly 60, and the outer spacer 67 connecting the front panel 61 to the rear panel 65. Also, a display 62 and a light guide plate 64 may be disposed between the front panel 61 and the rear panel 65. In addition, a first spacer 63 for supporting the display 62 and the light guide plate 64 may be further provided, and a display light 68 for emitting light to the light guide plate 64 may be provided.

In more detail, the front panel 61 may be made of a transparent glass material that defines an outer appearance of the front surface of the transparent display assembly 60. The front panel 61 may be made of a different material through which the inside of the front panel 61 is seen, and a touch input is enabled.

In detail, the front panel 61 may be made of a material such as transparent blue glass so that the inside thereof is seen, and the touch sensor 612 may be attached to the front panel 61 to input manipulation for driving the display 62. Thus, the user may touch-manipulate the surface of the front panel 61, and the touch sensor 612 may recognize the touch manipulation to generate a signal for the operation of the display 62 or the refrigerator 1.

Accordingly, the front panel 61 may perform a function for inputting an operation of the display 62 or the refrigerator in addition to the see-through function. An insulation coating layer 652 that will be described below is not provided on the surface of the front panel 61 so that an accurate touch input of the touch sensor 612 that operates in an electrostatic capacity manner is performed.

The front panel 61 may have a size greater than that of the plate opening 511 and be supported by the inner frame 52. That is, when the transparent display assembly 60 is assembled and mounted from the rear side, a circumferential portion of the front panel 61 may be supported by the rear surface of the inner frame 52.

In detail, a front protrusion 613 that further protrudes outward than the rear panel may be disposed on the front panel 61. The front protrusion 613 may have a length greater than that of the rear panel 65 in all directions. Also, the front panel 61 defining the front surface of the transparent display assembly 60 may further extend outward from the plate opening 511 and then be stably fixed and mounted on the inner frame 52 due to characteristics of the transparent display assembly 60 mounted on at the rear side of the outer plate 51.

Thus, when the transparent display assembly 60 is mounted, each of the extending ends of the front panel 61, i.e., the front protrusion 613 may be supported by the inner frame 52, and thus, the transparent display assembly 60 may be stably maintained in the mounted state without being separated.

A bezel 611 may be disposed on a circumference of the rear surface of the front panel 61. The bezel 611 may be printed with a black color and have a predetermined width so that the outer spacer 67 and the first spacer 63 are covered without being exposed to the outside.

A touch sensor 612 may be disposed on an inner area of the bezel 611. The touch sensor 612 may be formed on the rear surface of the front panel 61 in a printing manner and be configured to detect user's touch manipulation of the front panel 61. Alternatively, the touch sensor 612 may be formed in various manners such as a film adhesion manner, rather than the printing manner, so that the user touches the front panel 61 to perform the touch input.

A touch cable 601 connected to the touch sensor 612 may be disposed on the upper end of the front panel 61. The touch cable 601 may be provided as a flexible film type cable such as a flexible flat cable (FFC) or a flexible print cable or flexible print circuit board (FPC). A printed circuit may be printed on the touch cable 601 to constitute at least a portion of a touch PCB 603. Also, the touch cable 601 may be connected to the touch PCB 603 that will be described below.

The display 62 may be disposed on the rear surface of the front panel 61. The display 62 may be provided as an LCD module for outputting a screen. Also, the display 62 may be transparent so that the user sees the inside through the display 62 when the screen is not outputted.

A source board 621 may be disposed on one end of both left and right sides of the display 62. The source board 621 may be configured to output a screen through the display 62 and provided as one assembly with the display 62. Also, a portion of the source board 621 may include the flexible film type cable structure and extend upward along a side surface of the transparent display assembly 60 in the bent state.

Also, the source board 621 may have a width less than a thickness of the transparent display assembly 60 and be bent while the transparent display assembly 60 is assembled. Here, a position at which the source board 621 is disposed may be defined between the inside of the outer spacer 67 and the first spacer 63 and come into contact with an inner surface of the outer spacer 67 in the bent state.

Also, the source board 621 may be connected to a display cable 605. The display cable 605 may be connected to a T-CON board 623 at an upper portion of the sub door 50.

In detail, when the source board 621 is disposed on the rear surface of the display 62, the source board 621 may be exposed to the outside through the see-through part 21 due to the characteristics of the display 62 that is transparent. Also, when the source board 621 has a structure that protrudes laterally, the sub door 50 may increase in size.

Thus, the source board 621 may be disposed on an end of a circumferential side of the display 62 and bent to come into contact with the inner surface of the outer spacer 67 inside the outer spacer 67. Also, the source board 621 may have a size corresponding to that of the outer spacer 67 without getting out of a region of the outer spacer 67 in a state of being closely attached to the outer spacer 67.

The source board 621 may be constituted by two upper and lower boards 621 and respectively connected to the pair of display cables 605. The display cable 605 may have a flexible and flat structure like the touch cable 601 and also have a structure that is freely bendable.

The display cable 605 may extend along the circumferential surface of the transparent display assembly 60 and pass through a sealant 691 defining the side surface of the transparent display assembly 60 to extend to the outside of the transparent display assembly 60.

Also, the display cable 605 may be bent to extend along the circumferential surface of the transparent display assembly 60, i.e., be bent so that an end thereof extends upward from the transparent display assembly 60. Thus, the display cable 605 may be coupled to the T-CON board 602 at the upper side of the sub door 50.

Both ends of the display 62 may be supported by the first spacer 63. The first spacer 63 may have a rod or stick shape extending from an upper end to the lower end of the display 62 and be provided in a pair on both left and right sides to support both left and right ends of the display 62. The first spacer 63 may be made of an aluminum material and maintain a preset distance between the display 62 and the light guide plate 64.

The light guide plate 64 may be disposed at a rear side of the display, supported by the pair of first spacers 63 disposed at both left and right sides, and disposed to be spaced a predetermined distance from the display 62. There is a difference in depth feeling of the screen outputted from the display 62 according to the position of the light guide plate 64.

Thus, the light guide plate 64 may be disposed further forward than an intermediate point between the front panel 61 and the rear panel 65 so that the screen outputted by the display 62 is felt closer to the front panel 61. As a result, a height of the first spacer 63 may be determined.

The light guide plate 64 may guide light emitted from the display light 68 toward the display 62 and be made of various materials. For example, the light guide plate 64 may be made of a polymer material or formed by forming a pattern or attaching a film on a surface thereof. The light guide plate 64 may illuminate the display 62 from the rear side of the display 62 when the display light 68 is turned on. For this, the light guide plate 64 may have a plate shape having a size equal to or somewhat greater than that of the display 62. The display light 68 may be disposed at a position corresponding to each of upper and lower ends of the light guide plate 64.

The rear panel 65 may be disposed at a rear side of the light guide plate 64. The rear panel 65 may define the rear surface of the transparent display assembly 60 and have a size greater than that of the light guide plate and less than that of the front panel 61. Also, the rear panel 65 may have a size greater than that of the liner opening 561 to cover the liner opening 561.

A circumference of the rear panel 65 may further protrude outward from the outer spacer 67 to provide a rear panel protrusion 651. The rear panel protrusion 651 may be seated on the door liner 56 when the transparent display assembly 60 is mounted and provide a space in which a foaming solution is filled when the insulation material 531 is molded in the sub door 50.

A second spacer 71 disposed along a circumference of the light guide plate 64 and having a rectangular frame shape may be disposed on the rear surface of the light guide plate 64. Thus, the insulation panel 72 may be fixed to be spaced a predetermined distance from the light guide plate 64 by the second spacer 71. Also, the insulation panel 72 may be made of the same insulation glass as the rear panel 65. Thus, the transparent display assembly 60 may be more improved in insulation performance.

A third spacer 73 may also be disposed on the rear surface of the insulation panel 72. The rear panel 65 may come into contact with a rear surface of the third spacer 73 to space the insulation panel 72 from the rear panel 65 by a preset distance. The third spacer 73 may be adequately designed according to a thickness of the second spacer 71. That is, the third spacer 73 may have a thickness at which the rear panel 65 adheres to the second spacer 73 and the rear surface of the outer spacer 67 when the rear panel 65 is mounted.

Although the spacers 63, 71, 73, and 67 have structures different from each other in this embodiment, the spacers 63, 71, 73, and 67 may maintain a distance between the adjacent panels 61 and 65 and the light guide plate 64 and have various shapes such as a shape in which the moisture absorbent is accommodated into a shape such as a rod.

The rear panel 65 may adhere to the outer spacer 67 and be fixed to maintain a predetermined distance from the front panel 61. Also, the display 62, the first spacer 63, the light guide plate 64, the second spacer 64, the insulation panel 72, and the third spacer 73 may be sequentially disposed in an inner region of the outer spacer 67 between the front panel 61 and the rear panel 65.

Also, a second insulation layer 693 may be provided between the light guide plate 64 and the insulation panel 72 by the second spacer 71, and a third insulation layer 694 may be provided by the insulation panel 72 and the third spacer 73. Also, the first insulation layer 692 may be provided inside the outer spacer 67 to substantially thermally insulate the entire region of the transparent display assembly 60, thereby significantly improving the insulation performance of the transparent display assembly 60. If the insulation performance of the transparent display assembly 60 is satisfied, at least one of the second insulation layer 693 and the third insulation layer 694 may be omitted.

An argon gas may be filled into the first, second, and third insulation layers 692, 693, and 694 to improve the insulation performance. Thus, when the argon gas is filled into the insulation layers 692, 693, and 694, the heat transfer due to the convection may not occur between the insulation layers 692, 693, and 694, and thus, the overall insulation performance of the transparent display assembly 60 may be improved. Alternatively, an inert gas having the insulation performance except for the argon gas may be filled into the insulation layers 692, 693, and 694.

The rear panel 65 may come into contact with the door light 57. Thus, a distance between the display 62 and the door light 57 may be determined according to the position of the rear panel 65. The door light 57 may serve as an auxiliary backlight of the display 62 in the turn-on state.

In detail, a distance between the display 62 and the door light 58 may range from about 5 cm to about 15 cm. When the distance between the display 62 and the door light 57 is less than about 5 cm, a shade may occur. When the distance between the display 62 and the door light 57 exceeds about 5 cm, the door light may not serve as the backlight. Thus, to maintain the distance between the display 62 and the door light 57, the rear panel 65 may also be maintained to be spaced a predetermined distance from the display 62, and thus, the width of each of the second spacer 71 and the third spacer 73 may be determined.

The outer spacer 67 may connect the rear surface of the front panel 61 to the front surface of the rear panel 65 and also define the circumferential surface of the transparent display assembly 60. Also, a space in which the display light 68 is mounted may be provided in an inner surface of the outer spacer 67. The outer spacer 67 may have a rectangular frame shape. Also, the outer spacer 67 may have a size in which the light guide plate 64, the first, second, and third spacers 63, 71, and 73, and the insulation panel 72 are accommodated.

The first spacer 63 disposed inside the outer spacer 67 may have upper and lower ends, which come into contact with the outer spacer 67, but may not be completely sealed due to the simple contact structure thereof. Thus, a space between the front panel 61 and the rear panel 65, which is spaced by the first spacer 63, may not have a sealed structure.

However, the outer spacer 67 may be disposed between the front panel 61 and the rear panel 65 to seal the space between the front panel 61 and the rear panel 65. Although the first spacer 63 does not seal the space between the front panel 61 and the light guide plate 64 inside the outer spacer 67, the space between the front panel 64 and the rear panel 65 inside the outer spacer 67 in addition to the space between the front panel 61 and the light guide plate 64, in which the first spacer 63 is accommodated therebetween, may be sealed by the outer spacer 67.

In detail, the outer spacer 67 may define a circumference of an outer portion of the transparent display assembly 60 and also have a connection structure that is capable of allowing the front panel 61 to be maintained at a certain distance. The space between the front panel 61 and the rear panel 65, i.e., the inner space of the outer spacer 67 may be completely sealed by the coupling of the outer spacer 67. Also, the inside of the outer spacer 67 may be more sealed by the sealant 691 applied to the circumference of the outer spacer 67.

The overall outer appearance of the transparent display assembly 60 may be defined by the front panel 61, the rear panel 65, and the outer spacer 67, and all of the remaining constituents may be provided in the outer spacer 67. Thus, the sealing may be performed only between the outer spacer 67, the front panel 61, and the rear panel 65 to completely seal the multilayered panel structure.

Particularly, when a plate-shaped structure such as the light guide plate 64 is provided in the outer spacer 67, when only the outer spacer 67 adheres to the front panel 61 and the rear panel 65, the sealed structure of the transparent display assembly 60 may be achieved. The sealed structure may maintain a minimal sealing point even in the multilayered structure due to the plurality of panel including the light guide plate 64.

Thus, introduction of external air into the transparent display assembly 60 or the dew condensation in the transparent display assembly 60 due to introduction of moisture may be minimized. Also, when the inside of the outer spacer 67 becomes in a vacuum state, or a gas for the thermal insulation is injected, the insulation layer may be provided in the whole multilayered structure within the transparent display assembly 60 to more improve the thermal insulation performance.

The transparent display assembly 60 may be disposed in the sub door 50 so that the inside of the refrigerator is seen, and the screen is outputted, and also, the thermal insulation structure may be achieved in the multilayered panel structure at the minimum sealing point to secure the thermal insulation performance.

Also, the display light 68 may be mounted on each of the upper and lower ends of the outer spacer 67. The light guide plate 64 may be disposed between the display lights 68 disposed on the upper and lower ends of the outer spacer 67. Thus, light emitted through the display light 68 may be directed to an end of the light guide plate 64 and then travel along the light guide plate 64 so that the entire surface of the light guide plate 64 emits light.

The display lights 68 disposed on the inner upper and lower ends of the transparent display assembly 60 may be connected to a display light cable 606. The display light cable 606 may have a flexible and flat shape like the touch cable 601 and the display cable 605. The display light cable 606 may be connected to the display light 68 that is mounted inside the outer spacer 67 to extend to the outside of the transparent display assembly 60 through the sealant 691.

Also, the display light cable 606 may extend along the circumference of the transparent display 62 so that the display light cable 606 is not exposed through the transparent display 62. Also, the display light cable 606 may extend upward in a state of being closely attached to the rear surface of the rear panel 65. As occasion demands, the display light cable 606 may be bent in the state of adhering to the rear surface of the rear panel 65 and then may be connected to a docking PCB 604 disposed on the upper portion of the sub door 50. Here, since the display light cable 606 extends in the state of being closely attached to the circumference of the rear panel 65, when the sub door 50 is viewed from the outside, the display light cable 606 may be covered by the bezel 611 and thus may not be exposed through the transparent display assembly 60.

The sealant 691 may be applied to the circumference of the outer spacer 67. The sealant 691 may be applied to form the circumferential surface of the transparent display assembly 60. That is, the sealant 691 may completely seal a circumferential surface between the front panel 61 and the rear panel 65.

The sealant 691 may seal the transparent display assembly 60 to prevent air from being introduced into the transparent display assembly 60 and be made of a polysulfide (that is called a thiokol) material. As occasion demands, the sealant 691 may be made of a different sealant material such as silicon or urethane so that the sealant 691 comes into direct contact with the foaming solution that is injected to mold the insulation material 531.

The sealant 691 may maintain the coupling of the outer spacer 67, the front panel 61, and the rear panel 65 and completely seal the connected portions of the components to prevent water or moisture from being introduced. Also, the sealant 691 may be a portion, which comes into directly contact with the foaming solution when the insulation material 531 is molded, and protect the circumference of the transparent display assembly 60.

Also, the sealant 691 may allow cables 601, 605, and 606 connected to the touch sensor 612, the display panel 62, and the display light 68 within the transparent display assembly 60 to be accessible therethrough. The sealant 691 may cover outer surfaces of the cables 601, 605, and 606 to prevent water or moisture from being introduced through spaces through which the cables 601 605, and 606 are accessible when the cables 601 605, and 606 extent through the circumferential surface of the transparent display assembly 60. Thus, the inside of the outer spacer 67 may be completely sealed by the sealant 670, and the argon gas for the thermal insulation injected into the outer spacer 67 may be prevented from leaking.

Figure 12:
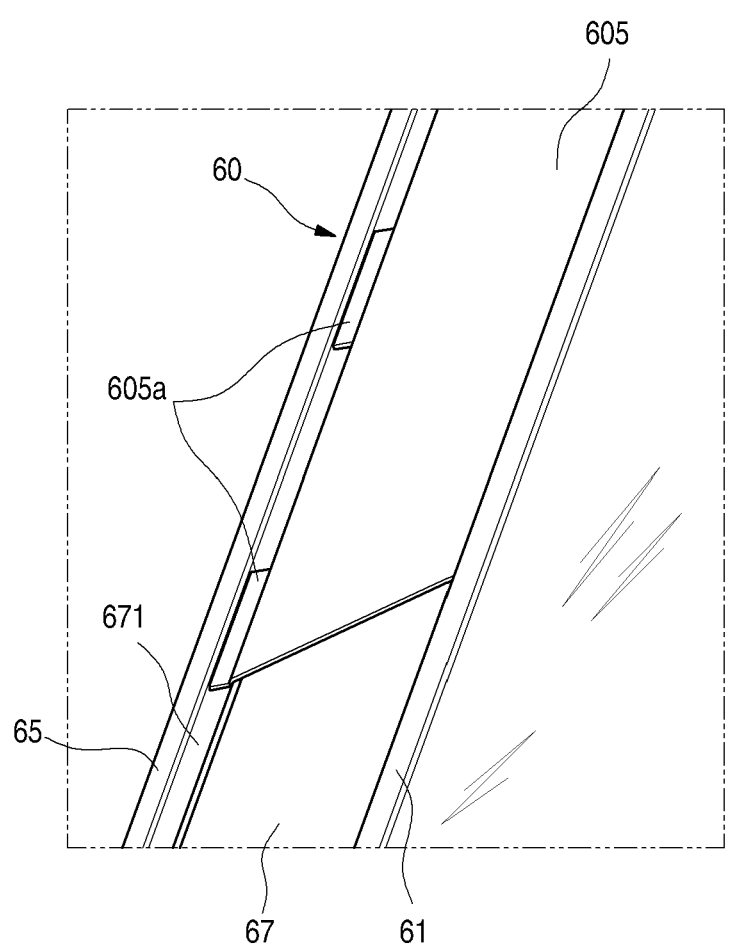
FIG. 12 is a partial perspective view illustrating a structure in which a display cable is disposed on the transparent display assembly.
Figure 13:
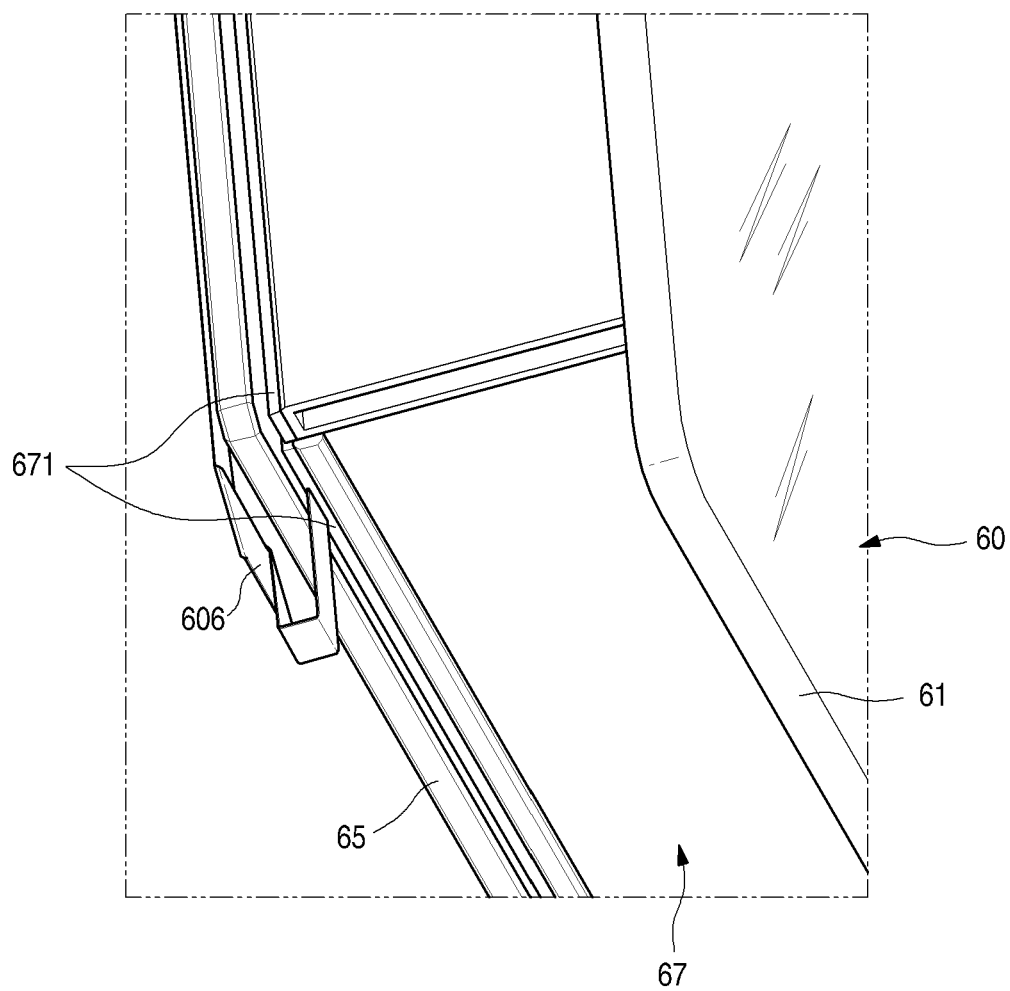
FIG. 13 is a partial perspective view illustrating a structure in which a display light cable is disposed on the transparent display assembly.

FIG. 11 is a partial perspective view illustrating a state in which the PCB is disposed on the upper portion of the transparent display assembly. Also, FIG. 12 is a partial perspective view illustrating a structure in which the display cable is disposed on the transparent display assembly. FIG. 13 is a partial perspective view illustrating a structure in which the display light cable is disposed on the transparent display assembly. As illustrated in the drawings, a plurality of PCBs 602, 603, and 604 for driving the transparent display assembly 60 may be disposed on an upper side of the sub door 50, i.e., a space between an upper end of the transparent display assembly 60 and the upper cap deco.

The PCBs mounted on the PCB mounting part 545 may include the T-CON board 602, the touch PCB 603, and the docking PCB 604. The T-CON board 602 may include a display cable 605 for driving the display 62. The touch PCB 603 may process a touch input signal of the touch sensor 612 and include a touch cable 601 connected to the touch sensor 612. The docking PCB 604 may connect the touch PCB 603 and/or the T-CON board 602, and the control unit 14 on the cabinet 10 to the wire type connection cable 607.

The cables 601, 605, and 606 connecting the plurality of cables 602, 603, and 604 to each other may be provided as the flexible film type FFC or FPC. Thus, the touch cable 601, the display cable 605, and the display light cable 606 may occupy a large space within the sub door 50 and be disposed to be closely attached to each other along the outside of the transparent display assembly 60. Also, the connection structure with the PCBs 602, 603, and 604 may also be simply provided and may not be exposed to the outside through the see-through part 21. In addition, when the insulation material 531 is foamed to be molded in the sub door 50, the PCBs 602, 603, and 604 may not interfere with the insulation material 531.

In more detail, as illustrated in FIG. 11, the touch cable 601 may extend upward from an upper end of the touch sensor 612 and be connected to the touch PCB 603 disposed at an upper side thereof. The touch cable 601 may have a flat shape, and the extending end of the touch cable 601 may be bent to be connected to the touch PCB 603.

The display cable 605 may be connected to the source board 621 to extend upward. Then, the display cable 605 may extend along the circumference of the side surface of the transparent display assembly 60 and then be connected to the T-CON board 602.

The display cable 605 may be connected to the source board 621 inside the transparent display assembly 60. As illustrated in FIG. 12, the display cable 605 may be guided to the outside of the outer spacer 67 through the space between the rear panel 65 and the outer spacer 67.

In detail, a cable connection part 605a is provided on the display cable 605. The cable connection part 605a may be introduced into the transparent display assembly 60 through the space defined by the rear panel 65 and the end of the outer spacer 67 and then be connected to the source board 621 in the inner space of the transparent display 62.

A double-sided tape or an adhesion member 671 such as an adhesive, which adheres to the rear panel 65, may be disposed on an end of the outer spacer 67. The cable connection part 605a may pass through the adhesion member 671 and be guided to the outside of the outer spacer 67.

Also, a sealant 670 may be applied to an outer surface of the outer spacer 67 to cover a circumference of the cable connection part 605a, thereby preventing the argon gas from leaking to the outside through the cable connection part 605a and preventing moisture from being introduced. Also, the display cable 605 may be bent at the outside of the outer spacer 67 to extend upward along the circumference of the outer spacer 67 coated with the sealant 670 and then be connected to the T-CON board 602.

The display light cable 606 may be connected to the display light 68 disposed on each of the upper and lower portions of the transparent display assembly 60 to extend upward along the outer circumference of the transparent display assembly 60 and then be connected to the docking PCB 604. In detail, as illustrated in FIG. 12, the display light cable 606 may be introduced into the transparent display assembly 60 through the space between the rear panel 65 and the outer spacer 67 and then be connected to the display light 68 disposed inside the outer spacer 67.

The display light cable 606 may pass through the adhesion member 671 for allowing the outer spacer 67 and the rear panel 65 to adhere to each other and then be exposed to the outside. Then, the display light cable 606 may be bent to face the docking PCB 604 and extend along a circumference of the rear panel 65.

The docking PCB 604 may be connected to an end of the door light cable 609 that extends from the door light 57. The door light 57 may be provided as a separate part with respect to the transparent display assembly 60 and mounted on the door liner 56. The docking PCB 604 may be connected to at least one of the touch PCB 603 and the T-CON board 602 and also be connected to the control unit 14 via the sub door 50 by the wire type connection cable 607.

Thus, the plurality of flat cables 601, 605, and 606 may be connected to the docking PCB 604, and the less number of connection cables 607 connected to the docking PCB 604 may be guided to the outside of the sub door 50 and then be connected to the control unit 14. Thus, the control unit 14 and the electric components of the transparent display assembly 60 may communicate with each other by the connection cable 607 and the cables 601, 605, and 606 to transmit information for operation.

Figure 14:
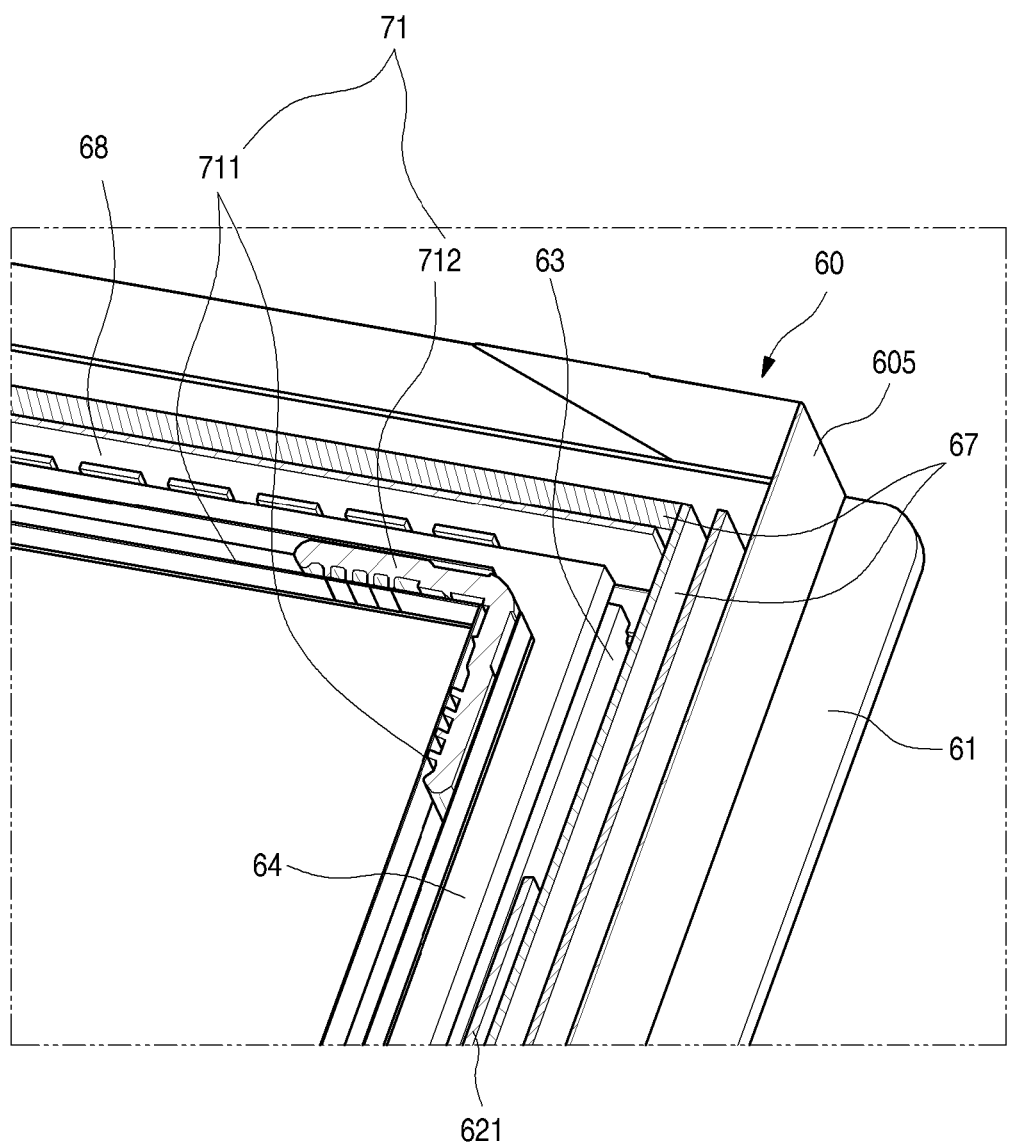
FIG. 14 is a partial cutaway perspective view of the transparent display assembly.
Figure 15:
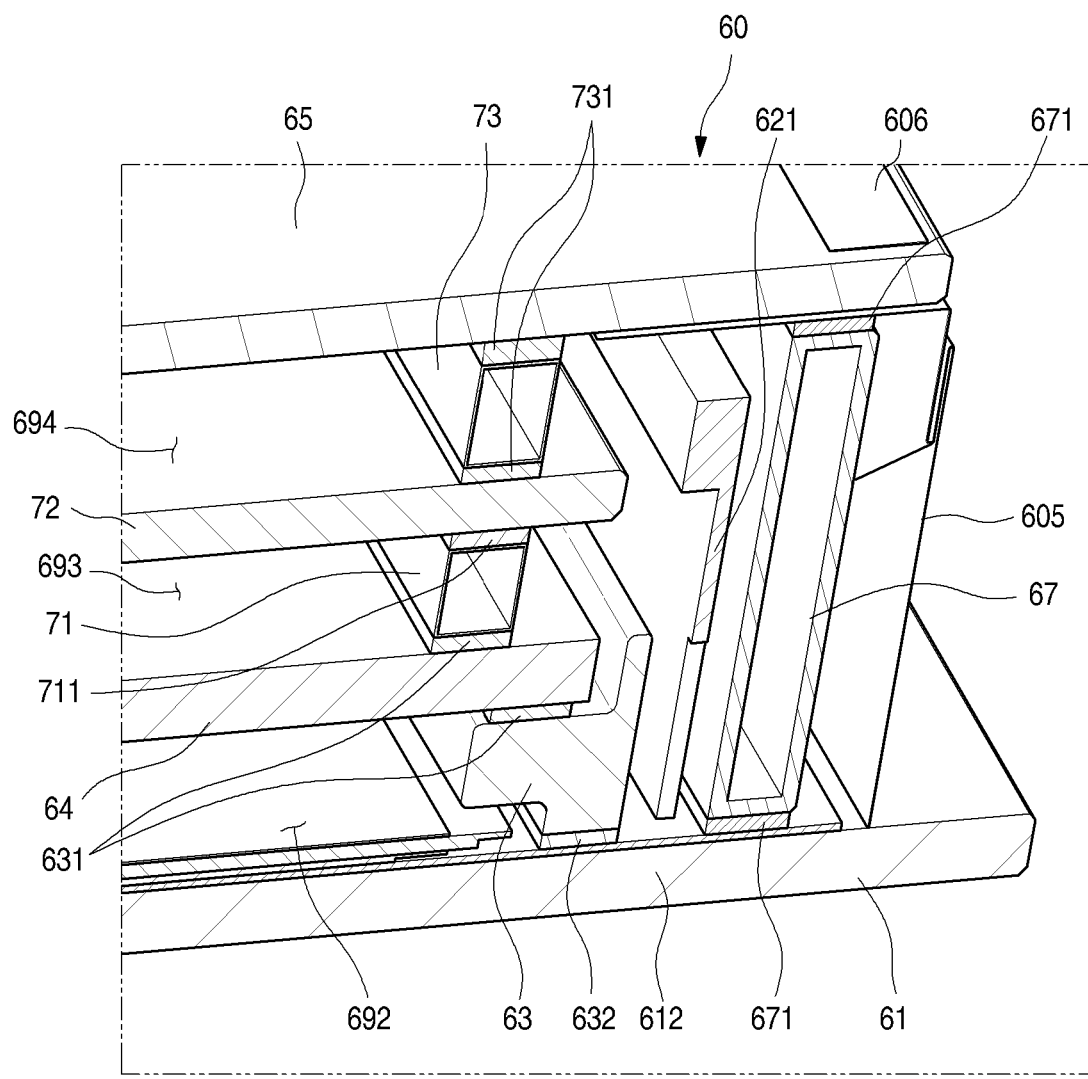
FIG. 15 is a cross-sectional view taken along line 15-15' of FIG. 8.
Figure 16:
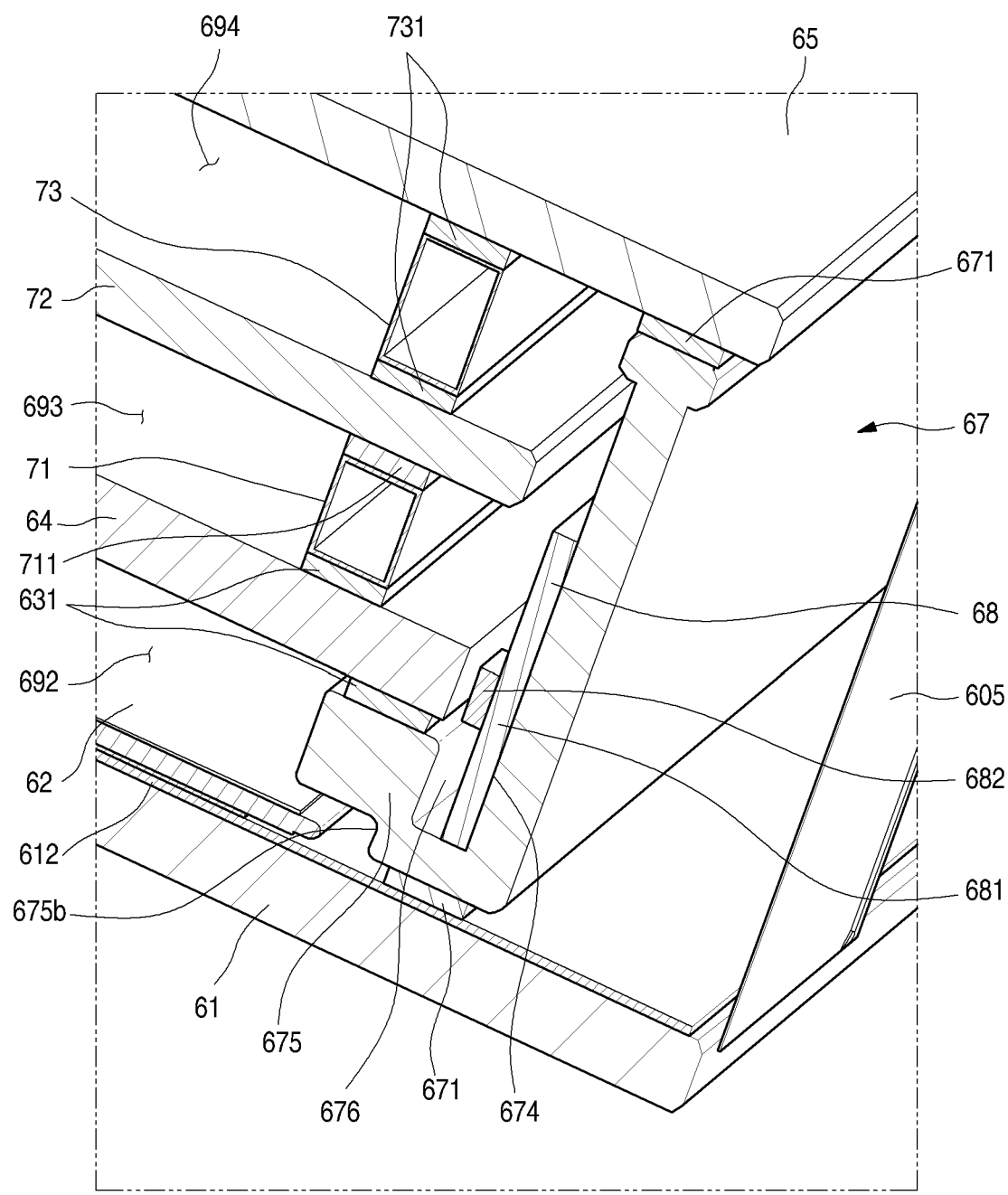
FIG. 16 is a cross-sectional view taken along line 16-16' of FIG. 8.

The transparent display assembly 60 has an insulation structure to prevent heat transfer between the inside of the refrigerator and the outside from occurring. Hereinafter, this structure will be described in more detail with reference to the accompanying drawings. FIG. 14 is a partial cutaway perspective view of the transparent display assembly. Also, FIG. 15 is a cross-sectional view taken along line 15-15' of FIG. 8. Also, FIG. 16 is a cross-sectional view taken along line 16-16' of FIG. 8.

As illustrated in the drawings, the transparent display assembly 60 provides the second insulation layer 693 sealed between the light guide plate 64 and the insulation panel 72 by the second spacer 71 and also provides the third insulation layer 694 sealed between the insulation panel 72 and the rear panel 65 by the third spacer 73. Also, the first insulation layer 692 may be provided between the rear panel 65 and the front panel 61 by the outer spacer 67.

In detail, the outer spacer 67 may be disposed on the rear surface of the front panel 61, which has the largest area, and the display 62, the first spacer 63, the light guide plate 64, the second spacer 71, insulation panel 72, and the third spacer 73 may be sequentially disposed inside the outer spacer 67. Also, the rear panel 65 may adhere to the rear surface of the outer spacer 67 to define an outer appearance of the transparent display assembly 60.

The touch sensor 612 is disposed on the rear surface of the front panel 61, and the display 62 is disposed on a rear surface of the touch sensor 612. The light guide plate 64 may be disposed at a position that is spaced a predetermined distance from the display 62 by the first spacer 63 and the outer spacer 67.

Here, since the light guide plate 64 may be contracted by heat due to the operation of the display light 68, the end of the circumference of the light guide plate 64 may not be completely fixed, and ends of the first spacer 63 and the light guide plate support part 675 may be disposed adjacent to each other without being fixed and coupled to each other. Due to this structure, the first spacer 63 may not be completely sealed, and air or a gas may flow between the inside and the outside of the first spacer 63.

The display light 68 is disposed on the outer spacer 67, which corresponds to each of upper and lower ends of the light guide plate 64. Also, the LED 682 mounted on the substrate 681 of the display light 68 may emit light toward the end of the light guide plate 64 at a position corresponding to the end of the light guide plate 64.

Also, in a state in which the light guide plate 64 is supported by the first spacer 63 and the light guide plate support part 675, the display light 68 may be disposed at positions corresponding to the upper and lower ends of the light guide plate 64. The display light 68 may be configured so that a plurality of LEDs 682 are disposed on the substrate 681. Here, the LEDs 682 may be continuously disposed along the end of the light guide plate 64.

Here, the outer spacer 67 may include a display light mounting part 674 so that the LEDs 682 are disposed on the end of the light guide plate 64. A substrate accommodation part 676 into which the substrate 681 is inserted may be recessed to be defined in a portion at which the display light mounting part 674 and the light guide plate support part 675 are connected to each other. Thus, the LEDs 682 may emit light to the end of the light guide plate 64 at the position corresponding to the end of the light guide plate 64.

The first spacer 63, the light guide plate 64, the second spacer 71, the insulation panel 72, and the third spacer 73 may be spaced apart from the inner surface of the outer spacer 67 to define a space therebetween. Also, the source board 621 may be disposed inside the outer spacer 67. Since the source board 621 is disposed, a sealed space may not be provided in a space between the front panel 61 and the light guide plate 64, which is provided by the first spacer 63.

Also, the second spacer 71 may be disposed on the rear surface of the light guide plate 64. The second spacer 71 may have both ends that are opened and have a hollow polygonal tube shape in section. Also, the second spacer 71 may be provided as tube members 771 that define upper/lower and left/right sides thereof. A corner connection member 712 defining an edge of the second spacer 71 may be coupled to an opened end of each of the tube members 771. The ends of the tube members 771 may be connected to cross each other by the corner connection member 712, thereby providing the second spacer 71.

Figure 17:
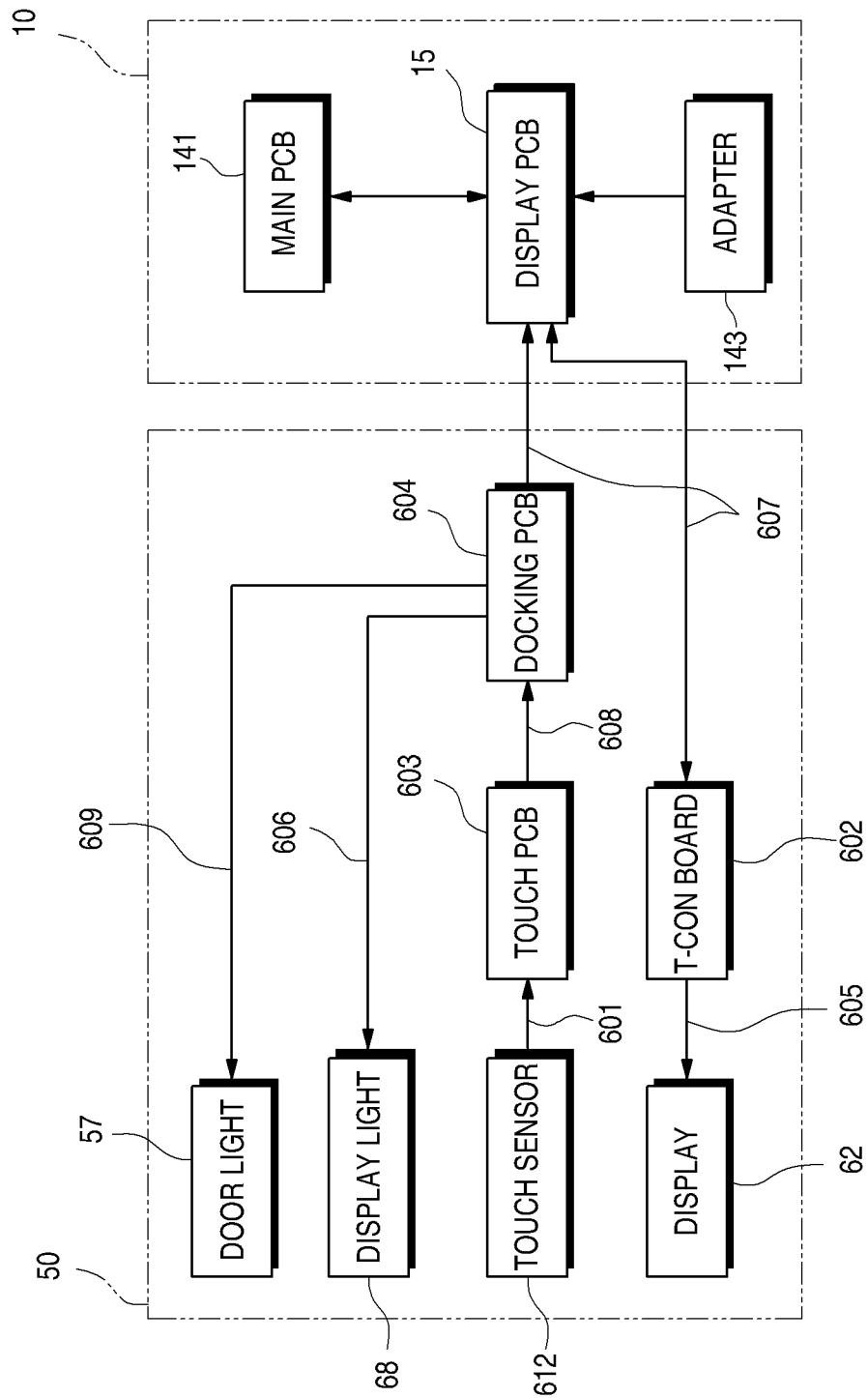
FIG. 17 is a block diagram illustrating a flow of a control signal of the refrigerator.

FIG. 17 is a block diagram illustrating a flow of a control signal of the refrigerator. As illustrated in the drawing, the plurality of printed circuit boards (PCBs) 602, 603, and 604, i.e., the touch PCB 603, the T-CON board 602, and the docking PCB 604 may be mounted on the sub door 50. Also, the plurality of PCBs 602, 603, and 604 may be connected to the plurality of cables 601, 605, and 606 within the sub door 50.

Each of the cables 601, 605, and 606 connecting the plurality of PCBs 602, 603, and 604 to each other may be provided as a flexible film-type FFC or FPC. Thus, the touch cable 601, the display cable 605, and the display light cable 606 may occupy a large space inside the sub door 50 and also be disposed to be closely attached along the outside of the transparent display assembly 60. Also, the connection structure of the cables 601, 605, and 606 with respect to the PCBs 602, 603, and 604 may be simply provided, and the cables 601, 605, and 606 may not be exposed to the outside through the see-through part 21. In addition, the cables 601, 605, and 606 may not interfere when the insulation material 531 is foamed into the sub door 50.

In more detail, the touch cable 601 may extend from an upper end of the touch sensor and then be connected to the touch PCB 603. The touch PCB 603 may be disposed at a position corresponding to the extending end of the touch cable 601.

The display cable 605 may be connected to the source board 621 to extend upward. Thereafter, the display cable 605 may extend along a circumference of a side surface of the transparent display assembly 60 and then be connected to the T-CON board 602. The display light cable 606 may be connected to the display light 68 disposed on each of the upper and lower portions of the transparent display assembly 60 to extend upward along the circumference of the outside of the transparent display assembly 60 and then be connected to the docking PCB 604.

The door light 57 may be provided as a separate component with respect to the transparent display assembly 60 and be mounted on the door liner 56. Thus, the door light cable 609 connected to the door light 57 may extend to the docking PCB 604 without passing through the transparent display assembly 60 and be provided as a wire-type cable. In addition, like other cables 601, 605, and 606, the door light cable 609 may also be provided as a flat flexible cable.

The docking PCB 604 may be connected to the touch PCB 603. The docking PCB 604 and the touch PCB 603 may be separately provided. Thus, while being assembled with and mounted on the PCB mounting part 545, the docking PCB 604 and the touch PCB 603 may be connected to each other by a first docking cable 608. The first docking cable 608 may be connected to a PCB connector 604d provided on the docking PCB 604. Also, if necessary, the T-CON board 602 may also be connected to the docking PCB 604. Also, in consideration of a voltage situation or efficiency of signal transmission, the T-CON board 602 may not be connected to the docking PCB 604, but be directly connected to the control unit 14 through the wire-type connection cable 607.

As described above, a plurality of electronic components provided on the sub door 50, particularly, the plurality of flat cables 601, 605, and 606 connected to electronic components constituting the transparent display assembly 60 may be connected to the PCBs 602, 603, and 604 at an upper side of the sub door 50. Also, a hole through which the connection cable 607 passes may be minimized in size, and also, the interference when the sub door 50 is opened and closed may be minimized through the simple structure in which the wire-type connection cable 607 extending from the control unit 14 on the cabinet 10 is connected to the docking PCB 604 and the T-CON board 602.

A main PCB 141, a display PCB 15, and an adapter 143 may be disposed in the control unit 14 connected by the connection cable 607. An overall operation of the refrigeration cycle in the refrigerator 1 may be controlled by the main PCB 141. The main PCB 141 may be connected to the display PCB 15 to receive operation information of the transparent display assembly 60.

Also, the control unit 14 may further include the adapter 143 that converts power supplied from the transparent display assembly 60. DC power may be converted into AC power that is adequate for driving the transparent display assembly 60 by the adapter 143. Also, the adapter 143 may have a relatively large size and high heat generation. Thus, it may be more efficient when the adapter 143 is not disposed in the sub door 50, but disposed in the control unit 14 on the cabinet t10.

Figure 18:
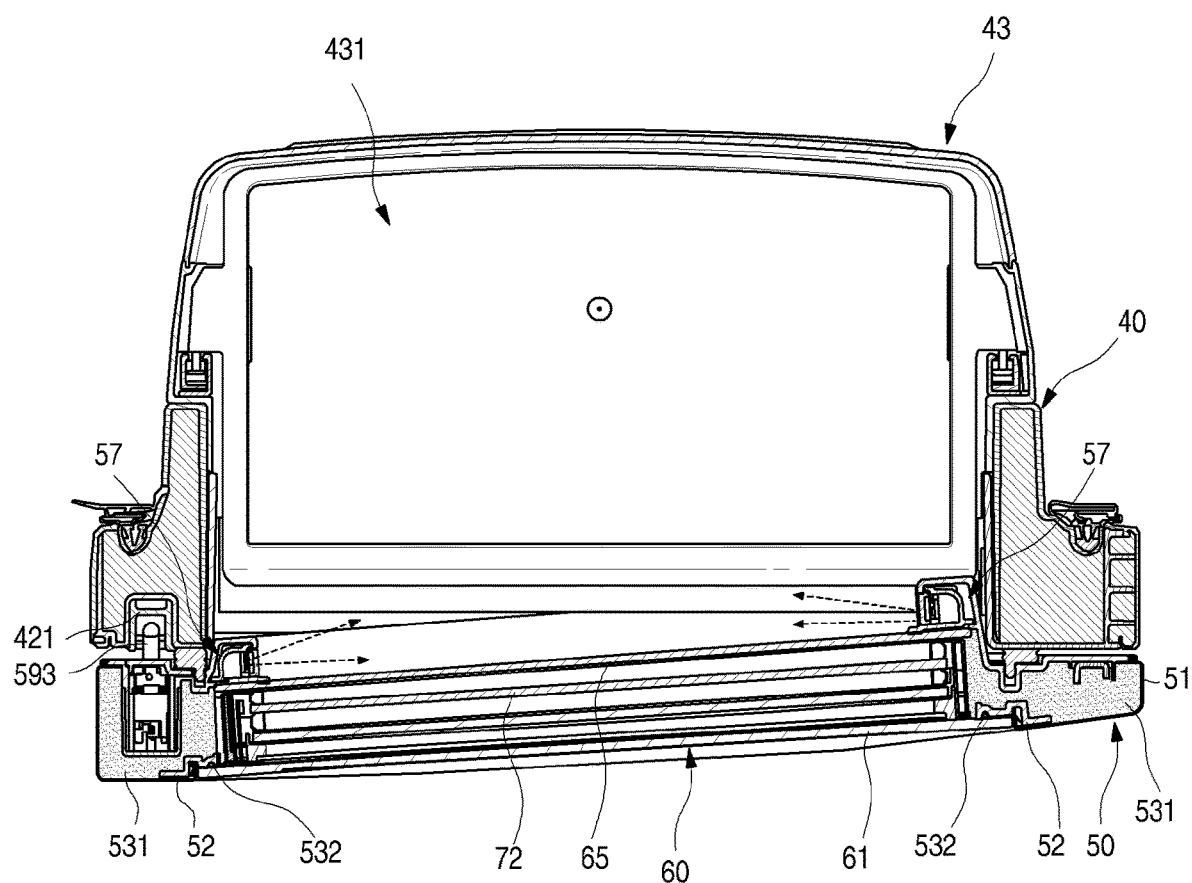
FIG. 18 is a transversal cross-sectional view of the main door and the sub door.
Figure 19:
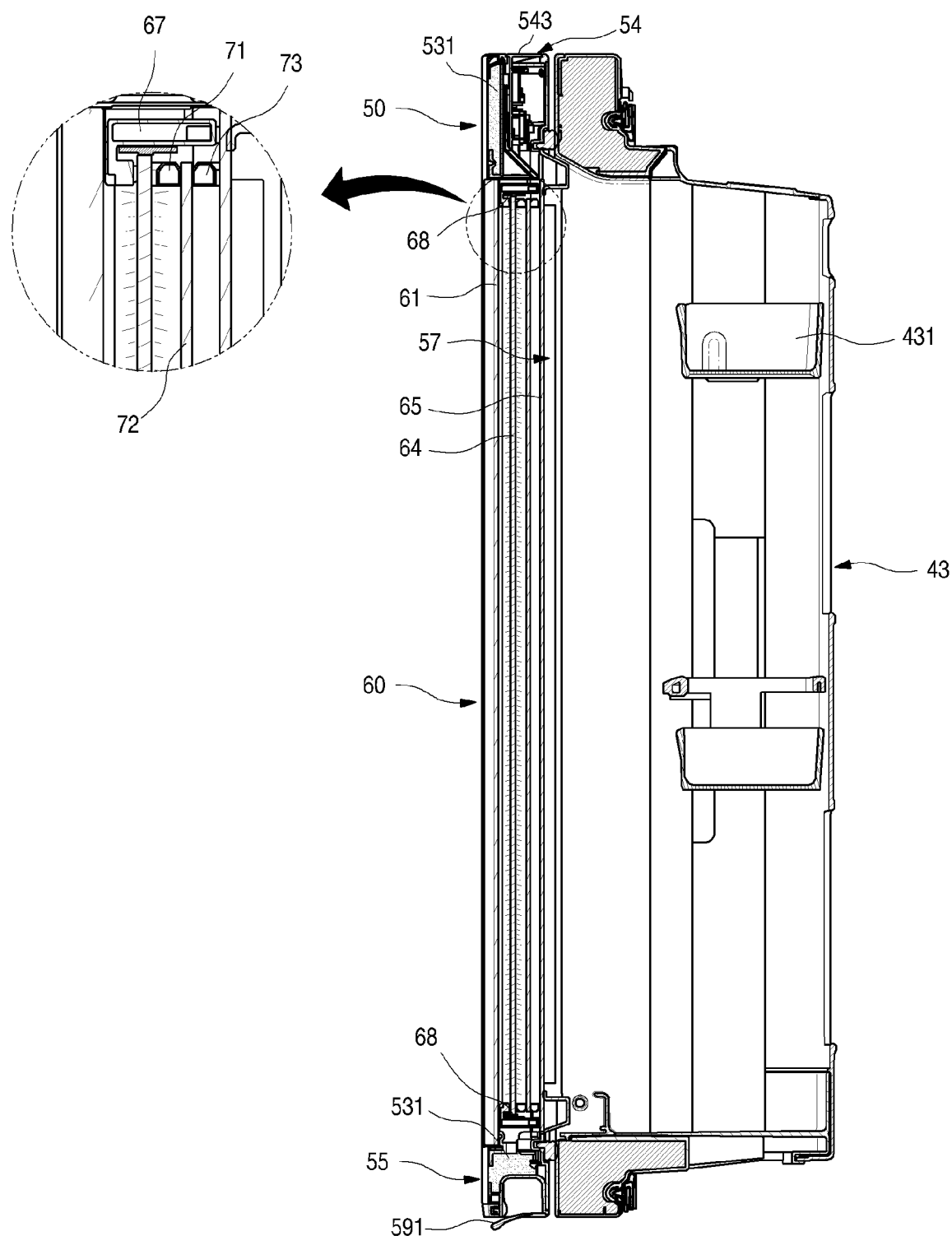
FIG. 19 is a longitudinal cross-sectional view of the main door and the sub door.
Figure 20:
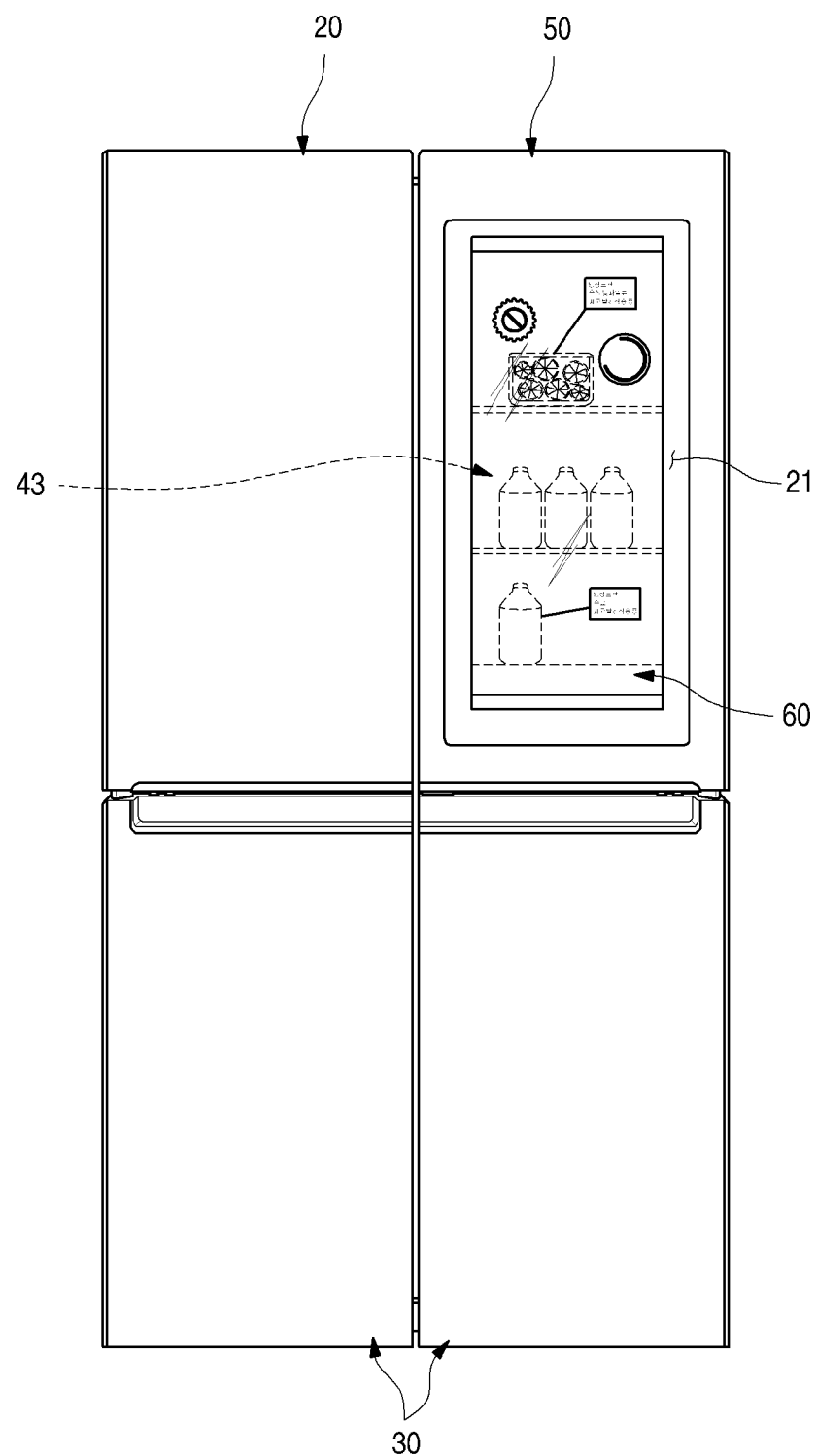
FIG. 20 is a view illustrating a state in which the inside of the refrigerator is capable of being seen through the transparent display assembly.
Figure 21:
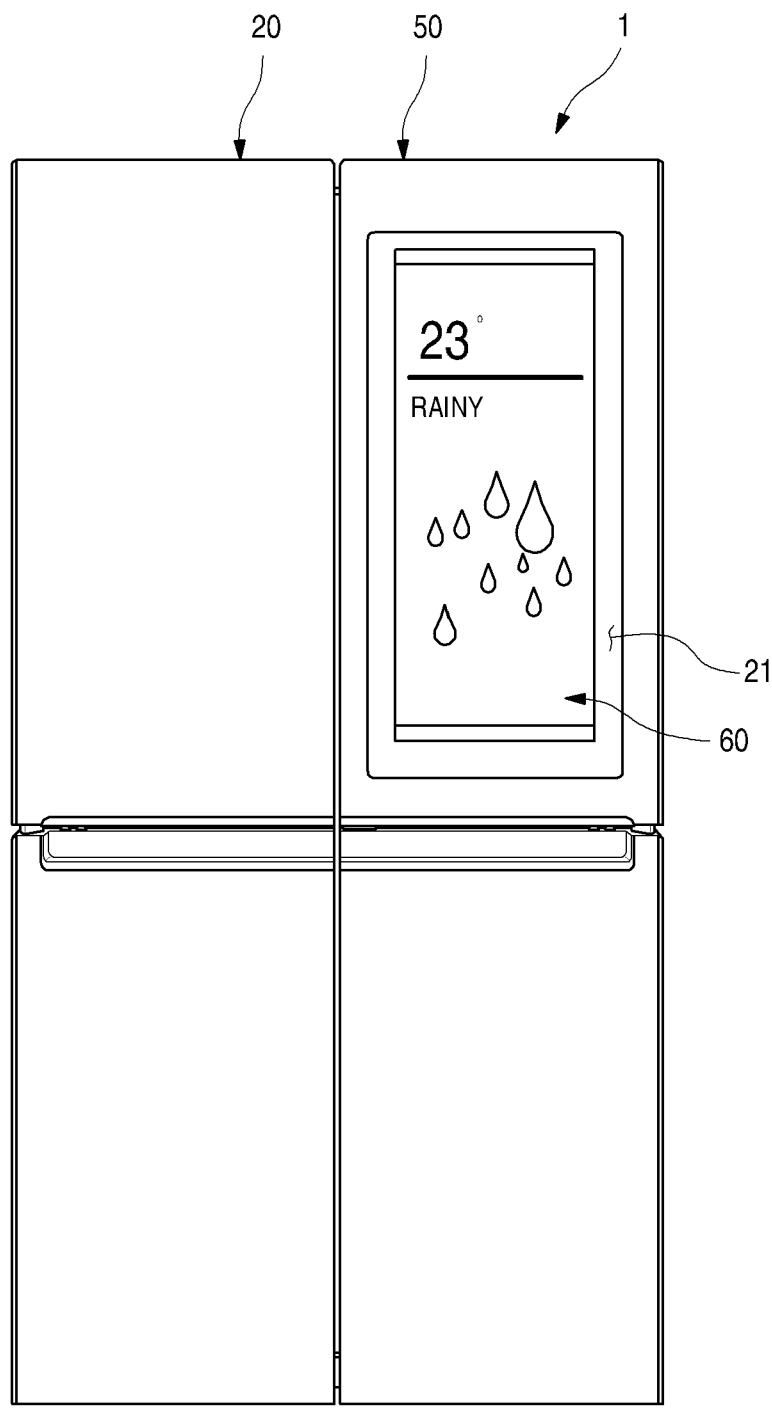
FIG. 21 is a view illustrating a state in which a screen is output through the transparent display assembly.

FIG. 18 is a transversal cross-sectional view of the main door and the sub door. Also, FIG. 19 is a longitudinal cross-sectional view of the main door and the sub door. Also, FIG. 20 is a view illustrating a state in which the inside of the refrigerator is capable of being seen through the transparent display assembly. Also, FIG. 21 is a view illustrating a state in which a screen is output through the transparent display assembly.

As illustrated in the drawings, in a state in which a locking member 593 of the opening device 59 is inserted into a latch hole 421, the sub door 50 may be maintained in a closes state. In this state, the door light 57 may be maintained in a turn-off state. An opened or closed state of the sub door 50 may be detected through a door switch that is separately provided.

In the turn-off state of the door light 57, as illustrated in FIG. 1, the rear space of the sub door 50 may be dark, and thus, the inside of the refrigerator 1 may not be seen through the see-through part 21. Thus, in the closed state of the sub door 50, if separate manipulation is not performed, the door light 57 may be maintained in the turn-off state, and the inside of the refrigerator 1 may not be seen through the see-through part 21. In this state, the user may manipulate the front panel 61 to turn on the door light 57. When the door light 57 is turned on, light emitted from a lighting module may be emitted to positions of both rear left and right sides of the rear panel 65, which face each other.

The door light 57 may extend from the upper end to the lower end of the rear panel 65. That is, the light emitted by the door light 57 may illuminate the entire rear region of the rear panel 65 from both the left and right sides of the rear panel 65. Here, when the display light 68 is in the turn-on state together with the door light 57, light may be emitted upward and downward by the display light 68, and thus the light may be emitted from left and right sides by the door light 57. As a result, the light may be emitted to the see-through part 21 in all directions to maximally brighten up an area of the see-through part 21.

The door light 57 may emit light in directions facing each other in a state of being close to the rear panel 65. The light emitted by the door light 57 may brighten up an inner case of the accommodation case 43 and also brighten up the front region over the rear panel 65. Thus, as illustrated in FIG. 20, the door light 57 may serve as a lighting for brightening up the inner space of the refrigerator 1, which is seen through the see-through part 21 and also serve as an auxiliary backlight for allow the display 62 to be more clearly displayed.

That is, in a state in which a screen is being outputted through the display 62, the inner space of the refrigerator 1, i.e., the rear space of the sub door 50 may be selectively seen through the see-through part 21. To allow the rear space of the sub door 50 to be seen through the see-through part 21, the door light 57 may be turned on. A turn on/off combination of the display light 68 and the door light 57 may be variously realized according to a degree of seeing of the inside of the accommodation case 43 through the see-through part 21.

Figure 23:
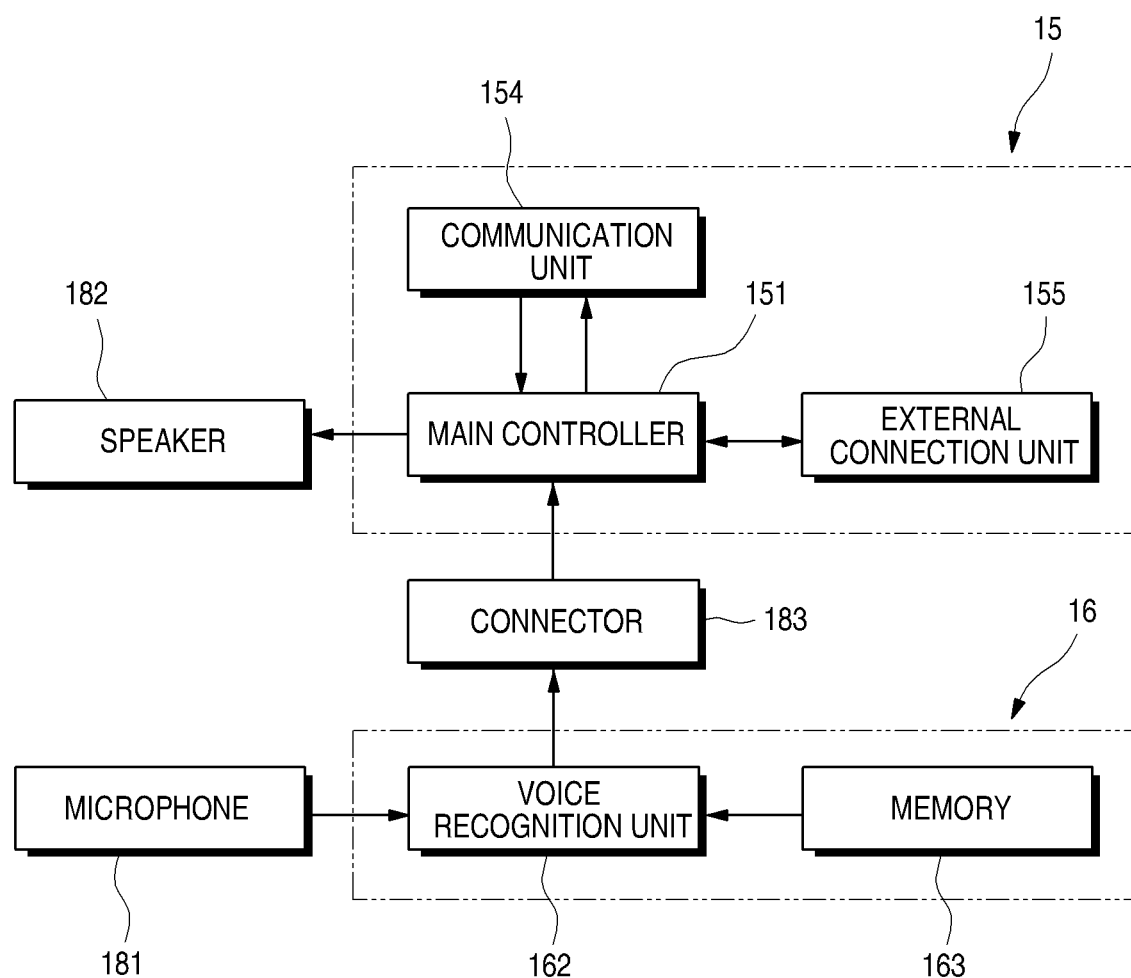
FIG. 23 is a block diagram illustrating a coupling structure of a display PCB according to another embodiment.

Also, when the user manipulates the front panel 61 disposed on the front surface of the refrigerator 1, the display light 68 may be turned on to turn on the display 62. Thus, the transparent display assembly 60 may output a screen as illustrated in FIG. 23. Here, the manipulation of the front panel 61 may be inputted as one of a specific position, the touch number, or a pattern. As occasion demands, a separate physical button or sensor may be used to detect the user's manipulation.

A screen for displaying a state of the refrigerator 1 and manipulating may be outputted on the display 62. Here, various screens for information with respect to accommodated foods may be outputted by using Internet, image output external input devices, or the like. In detail, the display light 69 disposed on each of the upper and lower ends of the light guide plate 64 may be turned on together with the display 62 by the user's manipulation. The light guide plate 64 may irregularly reflect and diffuse light of the display light 68 by the turn-on of the display light 68 to emit light having generally uniform brightness to the front display 62.

Also, light may be emitted to the display 62 from the rear side of the display 62 by the light guide plate 64, and simultaneously, a screen based on inputted image information may be outputted on the display 62. Thus, the user may confirm the clearly outputted screen through the see-through part 21.

The refrigerator according to an embodiment may perform an operation through a user's voice input. Also, the operation due to the voice input may be realized through the display PCB. Hereinafter, the display PCB will be described in more detail.

Figure 22:
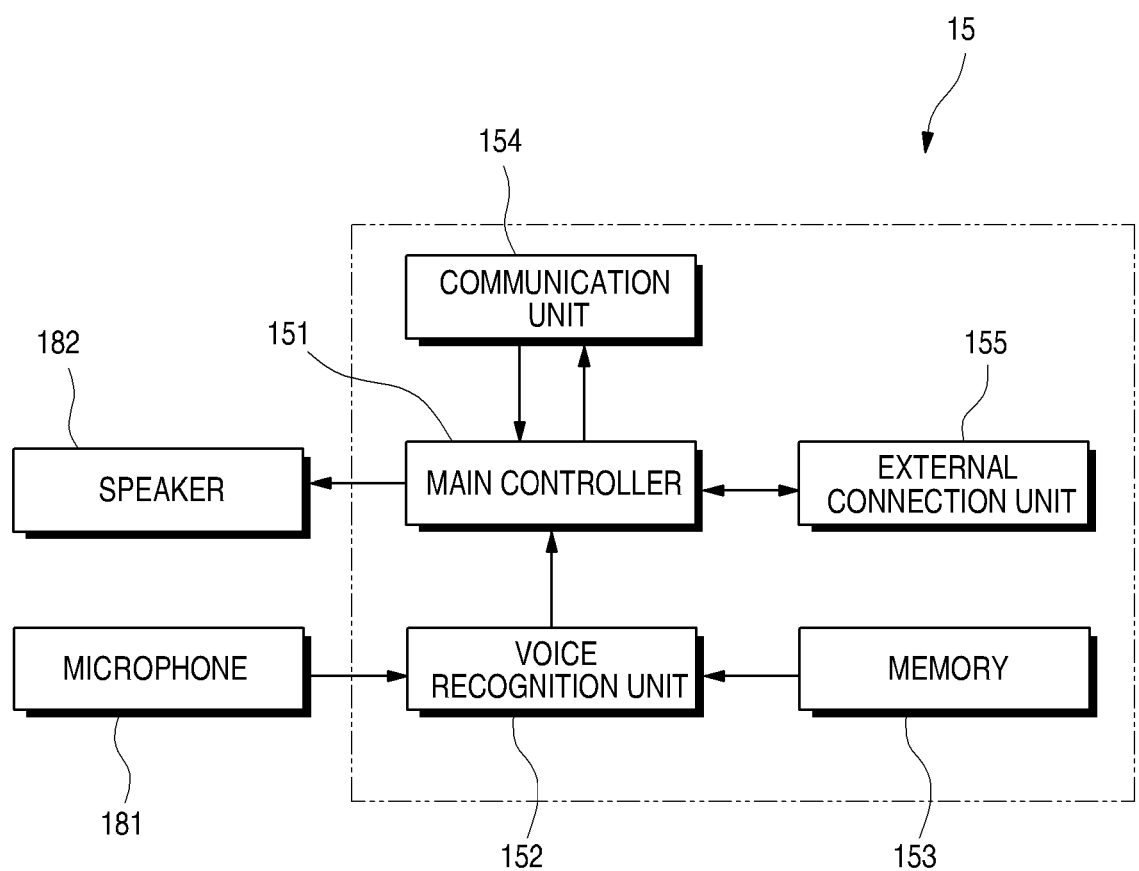
FIG. 22 is a block diagram illustrating components of a display PCB according to an embodiment.

FIG. 22 is a block diagram illustrating constituents of the display PCB according to an embodiment. As illustrated in the drawing, the display PCB 15 according to an embodiment may include a main controller 151 that is in charge of an overall control of the display PCB 15 and a voice recognition unit 152 connected to the main controller 151 to recognize the user's voice input.

The display PCB 15 may include at least one of a communication unit 154, an external connection unit 155, and a memory 153 on one board in addition to the main controller 151 and the voice recognition unit 152, which are connected to each other. Also, a speaker 182 and a microphone 181 may be connected to the display PCB 15 to perform an input and output of a voice. In detail, the display PCB 15 may control an overall operation of the transparent display assembly 60 according to an input signal of the voice recognition unit 152 connected to the display PCB 15 and also control an operation of the refrigerator 1 through the main PCB 151 connected to the display PCB 15.

Also, the voice recognition unit 152 may convert voice information inputted by the user to transmit the converted voice information to the main controller 151. Thus, the voice recognition unit 152 may be connected to the main controller 151. The voice recognition unit 152 and the main controller 151 may be provided as one board.

The microphone 181 may be connected to one side of the voice recognition unit 152. The microphone 181 may be configured to receive a voice by user's manipulation. The microphone 181 may be connected to the display PCB 15 and be disposed at one side of the door 20 or the cabinet 10, which is away from the display 62.

Here, the microphone 181 may be disposed on a front surface of the door 20 or one side of a front surface of the cabinet 10 to more clearly receive the user's voice. Alternatively, the microphone 181 may be provided in the other constituent of the refrigerator 1 except for the door 20 and the cabinet 10. Here, the microphone 181 may be disposed to face a front side to effectively receive the user's voice.

Also, the microphone 181 may be provided in plurality. The plurality of microphones 181 may be disposed to be spaced a predetermined distance from each other so that the voice signal of the user is easily received and analyzed.

The memory 153 may be connected to the voice recognition unit 152 to store a voice codec for converting an inputted analog voice signal into a digital signal. Thus, the voice recognition unit 152 may convert an analog signal of an inputted user's voice into a digital signal on the basis of the voice codec stored in the memory 453 to transmit the digital signal to the main controller 151.

Also, the speaker 182 may be connected to the main controller 151 to output a processed result or operation state according to the user's manipulation input through the speaker 182 as a voice. Also, an amplifier that is capable of amplifying and outputting the voice signal outputted from the main controller 151 may be further disposed between the speaker 182 and the main controller 151.

The speaker 182 may be mounted on one side of the outside of the door 20 or the cabinet 10 of the refrigerator 1, and if necessary, the speaker 182 may be disposed at one side that is away from the refrigerator 1. The speaker 182 may also be disposed at one side of the front of the refrigerator 1 that is near to the user to more effectively transmit the user's voice. Also, the speaker 182 and the microphone 181 may be provided as a module and mounted at the same position.

The communication unit 154 may be connected to the main controller 151 to communicate with other home appliances and a remote internet server, which are connected to the refrigerator 1 through a network. The communication unit 154 may be configured to enable wireless communication such as Wi-Fi and Bluetooth as well as wired connection. An internet connection network may be used for long distance communication. In case of a short distance communication in homes, the communication unit 154 may be connected through short distance direct communication as well as the internet connection network. The wireless connection of the communication unit 154 may be performed through one of Wi-Fi, Ethernet, Zigbee, Z-wave, Bluetooth, and NFC.

Wi-Fi is a trademark of Wi-Fi alliance, but is used as a term that is commonly used as a wireless communication technology. That is, Wi-Fi represents a series of technologies that support wireless LAN connection between devices, connection (Wi-Fi P2P) between devices, PAN/LAN/WAN configuration, and the like according to the general rules defined by the WLAN specification (IEEE 802.11).

Ethernet is a networking technology according to the IEEE 802.3 standard and is the most representative standard for local area network (LAN) hardware, protocols, and cables. Ethernet mainly uses carrier sense multiple access with collision detection (CSMA/CD) for data transmission.

Zigbee is a wireless network technology for configuring a private communication network using a small and low-power digital radio to perform communication and is a communication method according to the regulations defined in IEEE 802.15. Zigbee has a small size, low power consumption, and low cost, and thus, is widely used as a ubiquitous building solution such as the home network. Also, Zigbee is used in various fields such as an intelligent home network, a near field communication market for buildings, an industrial automation, logistics, environment monitoring, a human interface, telematics, military fields, and the like.

A Zigbee protocol consists of a physical layer, a media access control (MAC) layer, a network layer, and an application layer. The physical and MAC layers of Zigbee are defined in the IEEE 802.15.4 standard. The ZigBee network layer supports routing and addressing for tree structures and mesh structures, and Zigbee home automation public profiles and Zigbee smart energy profiles are representatively used as the application profiles. Also, RF4CE that is a new Zigbee specification defines a solution for remote control of home appliances and a simple network stack for star topology. The RF4CE uses a 2.4 GHz frequency band and provides security using AES-128.

Zigbee is mainly used in fields requiring long battery lifespan and security at a low transmission speed. Zigbee is suitable for periodic or intermittent data transmission or data transmission for simple signal transmission such as a sensor and an input device. Examples of application fields of Zigbee include wireless lighting switches, household watt-hour meters, traffic management systems, and other personal and industrial devices that require near-field low-speed communication. Zigbee has advantages that it is relatively simple and inexpensive when compared to other WPAN technologies such as Bluetooth and Wi-Fi.

Z-wave is a wireless transmission scheme designed for low-power and low-bandwidth devices such as home automation and sensor networks, and the main purpose of Z-wave is to provide reliable communication between one or more nodes and a control unit in a wireless network. Z-wave is composed of a physical layer, a media access control (MAC) layer, a transmission layer, a routing layer, and an application layer and provides a speed of about 9.6 kbps, about 40 kbps, and about 200 kbps while using a baseband of about 900 MHz (Europe: 869 MHz, USA: 908 MHz) and a baseband of about 2.4 GHz.

Near field communication (NFC) is a non-contact communication technology that uses a frequency band of about 13.56 MHz as one of radio frequency identification (RFID) technologies. NFC is a next-generation LAN technology that is attracting attention due to its relatively low security and relatively low price because of its short communication distance. In case of NFC, since both data reading and writing functions are available, there is no need for a dongle (reader) that was previously required for using the RFID. NFC is similar to the existing near field communication technologies such as Bluetooth, but has an advantage of not having to set up between devices like Bluetooth.

The external connection unit 155 is configured to connect the display PCB 15 to an external device or components and may be provided in various port formats such as USB and HDMI. Thus, the external connection unit 155 may easily connect the display PCB 15 to video equipment, storage devices, and additional devices. Also, although not shown, the main controller 151 may be directly or indirectly connected to the main PCB 141, the transparent display assembly 60, and other electronic devices within the refrigerator 1.

The display PCB may have various coupling structures. Hereinafter, a display according to another embodiment will be described with reference to the accompanying drawings. The display according to another embodiment has the same configuration as that of the above-described embodiment, and the same reference numerals are used for the same components, and thus, detailed descriptions thereof will be omitted.

FIG. 23 is a block diagram illustrating a coupling structure of a display PCB according to another embodiment. As illustrated in the drawing, a display PCB 15 according to another embodiment may include a main controller 151, a communication unit 154, and an external connection unit 155.

The main controller 151 and the communication unit 154 may be provided as one board through coupling of the external connection unit 155, and the main controller 151 may be connected to a speaker 182 to output voice information. Thus, the display PCB 15 may be configured to solely control an operation of a transparent display assembly 60.

Also, the main controller 151 may have one side connected to a connector 183, and the connector 183 may be connected to a voice recognition module 16. The voice recognition module 16 may be provided as a separate independent component and be connected to the display PCB 15 through the connector 183.

That is, according to a function of the refrigerator 1, the display PCB 15 for controlling the transparent display assembly 60 may be fundamentally provided. To add an operation function through a voice input, the voice recognition module 16 may be connected to the display PCB 15 through the connector 183.

The voice recognition module 16 may include a voice recognition unit 162 and a memory 163. The voice recognition unit 162 may convert voice information inputted by a user to transmit the converted voice information to the main controller 151. Thus, the voice recognition unit 162 may be connected to the main controller 151 through the connector 183. Also, the memory 163 may be connected to the voice recognition unit 162 to store a voice codec. Thus, the voice recognition unit 162 may convert an analog signal of an inputted user's voice into a digital signal on the basis of the voice codec stored in the memory 163 to transmit the digital signal to the main controller 151. Also, a microphone 181 may be connected to one side of the voice recognition unit 152 to receive a user's manipulation voice.

The display PCB 15 may have various coupling structures. Hereinafter, a display 62 according to another embodiment will be described with reference to the accompanying drawings. The display 62 according to another embodiment has the same configuration as that of the above-described embodiment, and the same reference numerals are used for the same components, and thus, detailed descriptions thereof will be omitted.

Figure 24:
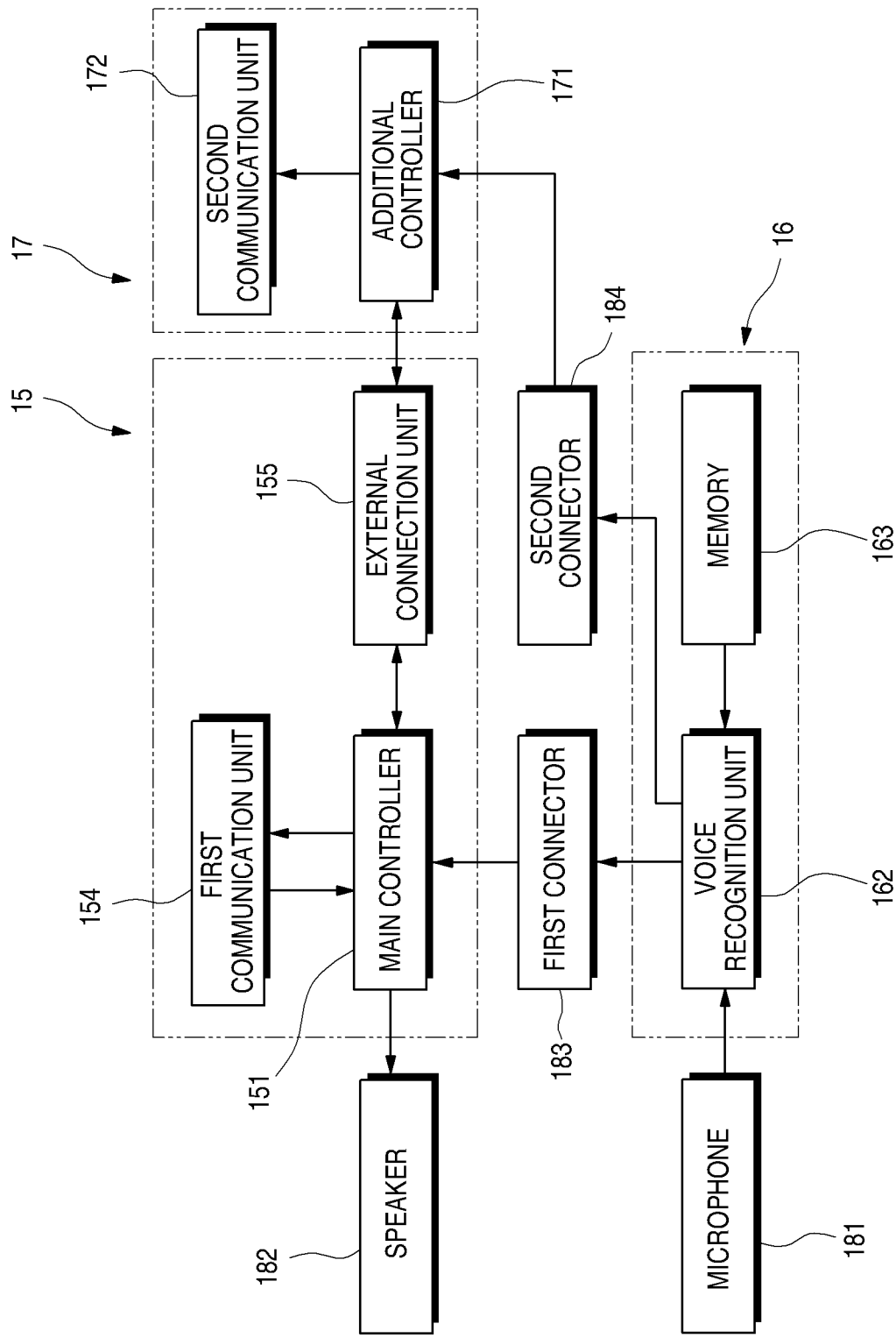
FIG. 24 is a block diagram illustrating a coupling structure of a display PCB according to further another embodiment.

FIG. 24 is a block diagram illustrating a coupling structure of a display PCB according to further another embodiment. As illustrated in the drawing, a display PCB 15 according to another embodiment may include a main controller 151, a first communication unit 154, and an external connection unit 155. Here, the first communication unit 154 may be the same as the communication unit 154 according to the foregoing embodiment.

The main controller 151 and the first communication unit 154 may be provided as one board through coupling of the external connection unit 155, and the main controller 151 may be connected to a speaker 182 to output voice information. Thus, the display PCB 15 may be configured to lonely control an operation of a transparent display assembly 60.

Also, the main controller 151 may have one side connected to a first connector 183, and the first connector 183 may be connected to a voice recognition module 16. The voice recognition module 16 may be provided as a separate independent component and be connected to the display PCB 15 through the first connector 183. That is, according to a function of the refrigerator 1, the display PCB 15 for controlling the transparent display assembly 60 may be fundamentally provided. To add an operation function through a voice input, the voice recognition module 16 may be connected to the display PCB 15 through the first connector 183.

The voice recognition module 16 may include a voice recognition unit 162 and a memory 163, and a microphone 181 may be connected to one side of the voice recognition unit 162. The voice recognition unit 162 may have one side connected to a second connector 184, and the second connector 184 may be connected to an additional control module 17.

The additional control module 17 may be stored in an operating system different from the operating system stored in the main controller 151. Also, the additional control module 17 may be additionally mounted so that an adequate operating system is used according to user's selection or market environments. For example, an android OS may be built in the main controller 151, and a window OS may be built in the additional control module 17.

The additional control module 17 may include an additional controller 171 having an operating system different from that of the main controller 151 and a second communication unit 172 communicating with the additional controller 171. Like the first communication unit 154, the second communication unit 172 may enable wireless communication such as Wi-Fi and Bluetooth as well as wired connection. The second communication unit 172 may communicate with other home appliances and a remote internal server, which are connected to the refrigerator 1 through a network.

The additional controller 171 may be connected to the external connection unit 155. Thus, the additional controller 171 may be connected to the main controller 151 through the external connection unit 155. Thus, the additional controller 171 may control the transparent display assembly 60 and also be connected to the main PCB 141 to control an operation of the refrigerator 1.

As described above, the additional controller 171 may be used when the operating system outputted to the transparent display 62 is provided in plurality. Also, the additional control module 17 may be mounted without changing the display PCB 15 to apply various operating systems. In addition, since the second connector 184 and the additional control module 17 are connected to each other, the voice recognition module 16 may operate without any problem under the operating system by the additional control module 17 and perform an operation of the transparent display assembly 60 and an operation of the refrigerator 1 by a voice command.

Figure 25:
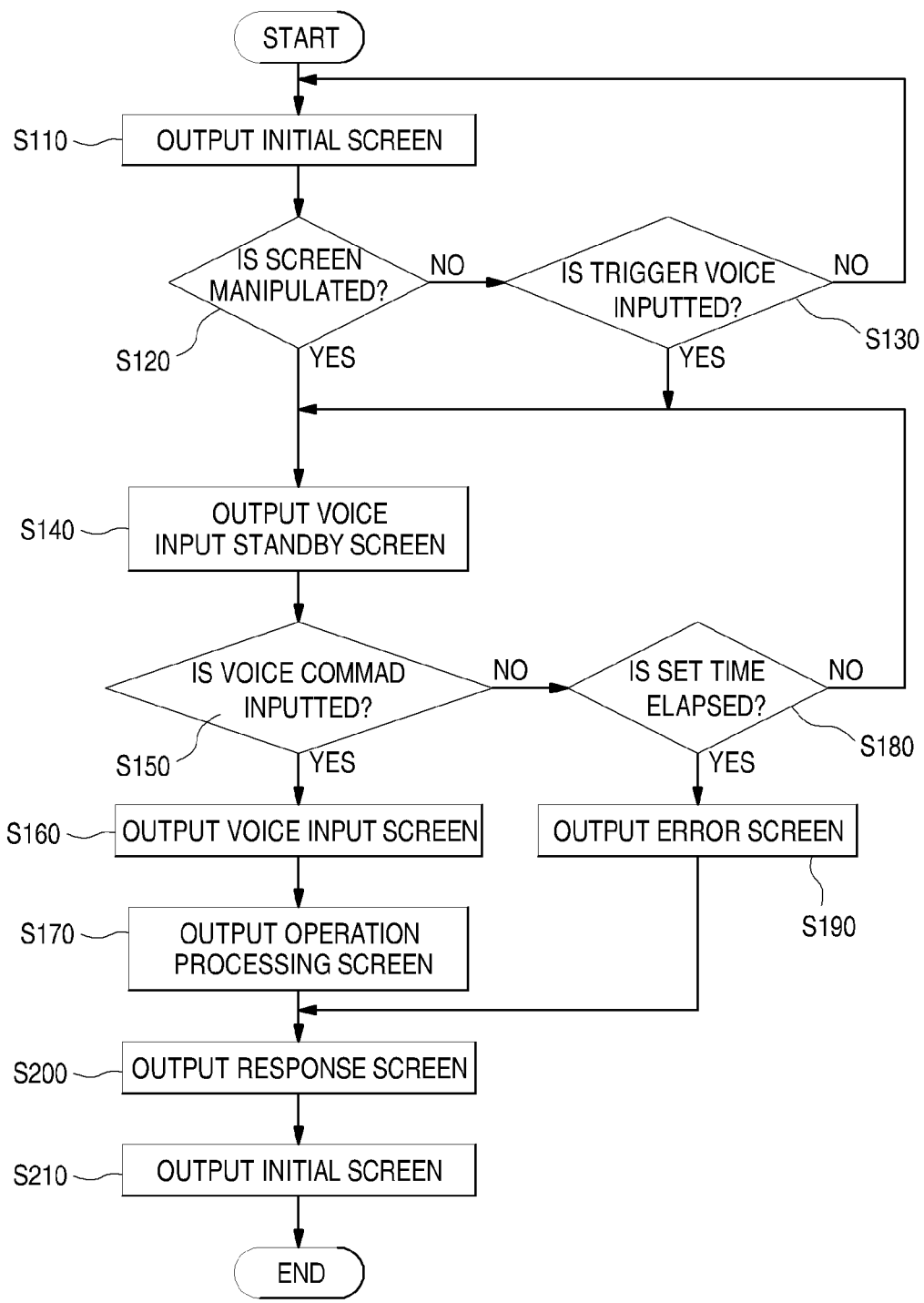
FIG. 25 is a view sequentially illustrating an operation of the refrigerator according to a voice command.
Figure 26:
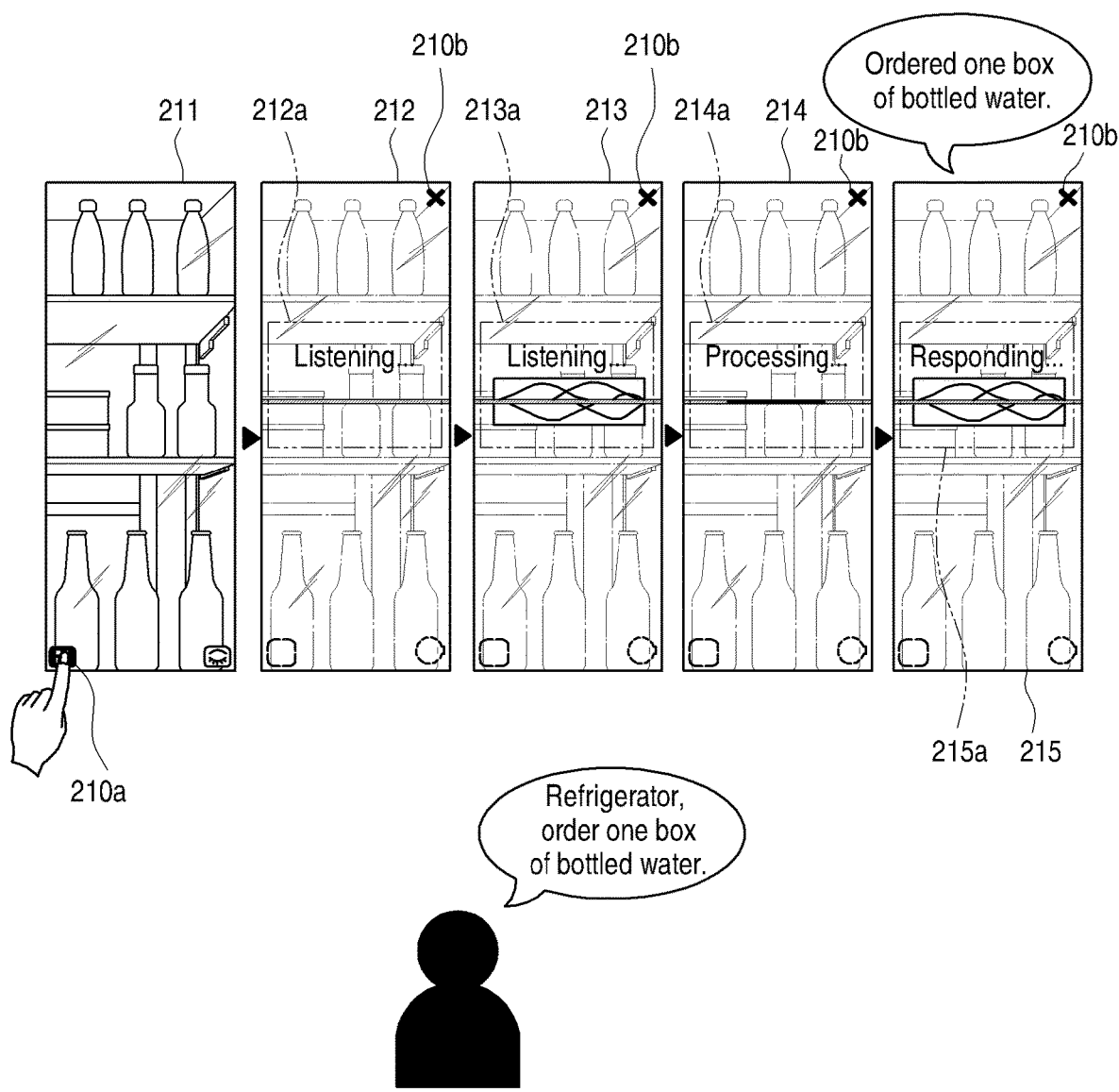
FIG. 26 is a view sequentially illustrating a first example of a state in which a screen outputted by the transparent display assembly is converted.

Hereinafter, an operation by voice recognition of the refrigerator according to an embodiment will be described. FIG. 25 is a view sequentially illustrating an operation of the refrigerator according to a voice command. Also, FIG. 26 is a view sequentially illustrating a first example of a state in which a screen output by the transparent display assembly is converted.

Although not shown, the user may manipulate the transparent display assembly 60 to input a voice command, thereby outputting an initial screen 211 on the see-through part 21. The initial screen 211 may be turned on by touching the front surface of the transparent display assembly 60. The initial screen 211 may be the earliest stage for the manipulation of the transparent display assembly 60 as well as the voice command and allow the display light 68 to be turned on so that the inside of the refrigerator 1 is seen. Also, in the initial screen 211, the door light 57 together with the display light 68 may be turned on so that the transparent display assembly 60 is brightest to become a state in which a state inside the refrigerator is more clearly confirmed through the see-through part 21. In this state, the user may input the voice command to allow the refrigerator 1 to perform a specific operation.

That is, when a state of the see-through part 21 before the user performs the voice input corresponds to the initial screen 211, the accommodation space behind the transparent display assembly 60 may be seen, and thus, kinds or states of foods stored in the accommodation space may be confirmed to take a measure. For example, the user may order bottled water after confirming that there is not enough bottled water in the accommodation space. [S110]

Figure 27:
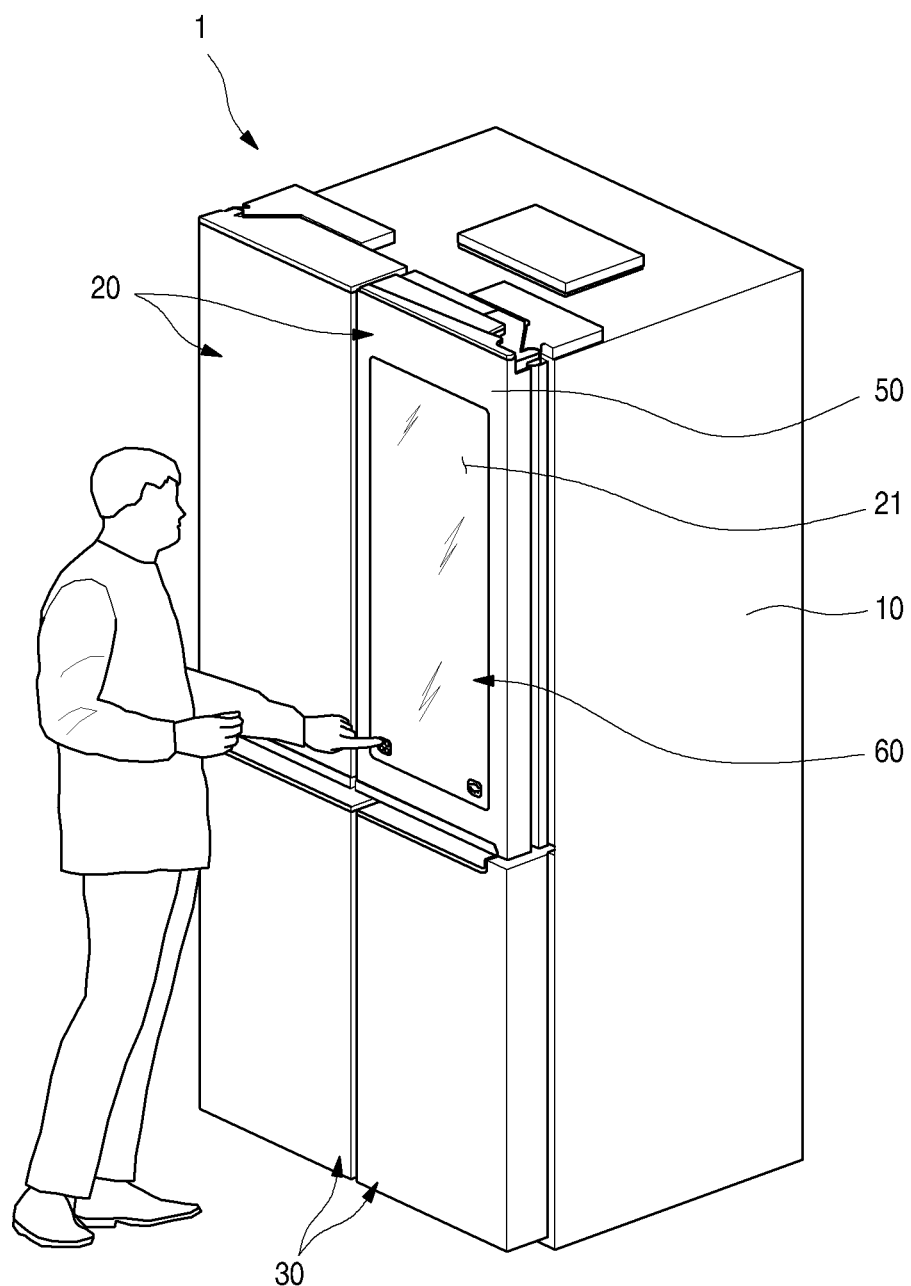
FIG. 27 is a perspective view illustrating an example in which a voice command is inputted together with manipulation of the transparent display assembly in the refrigerator.

FIG. 27 is a perspective view illustrating an example in which the voice command is inputted together with the manipulation of the transparent display assembly in the refrigerator. Also, FIG. 28 is a perspective view illustrating an example in which the voice command is inputted as a trigger voice in the refrigerator.

Referring to FIG. 27, in the initial screen, the user manipulate a menu button 210a to convert the initial screen into a voice input standby screen 212 for inputting the voice command. In this state, the user has to stand in the front of the refrigerator 1 to manipulate the menu button 210a. In this situation, the user may be disposed at a position that is close to the refrigerator 1 to allow the microphone 181 to more effectively receive the voice command when the user speaks the voice command. Also, in this case, when the user manipulates the menu button 210a, the microphone 181 may be disposed on the front surface of the cabinet 10 or the front surface of the door 20, which corresponds to a height of a user's mouth to effectively receive the user's voice command. [S120]

Figure 28:
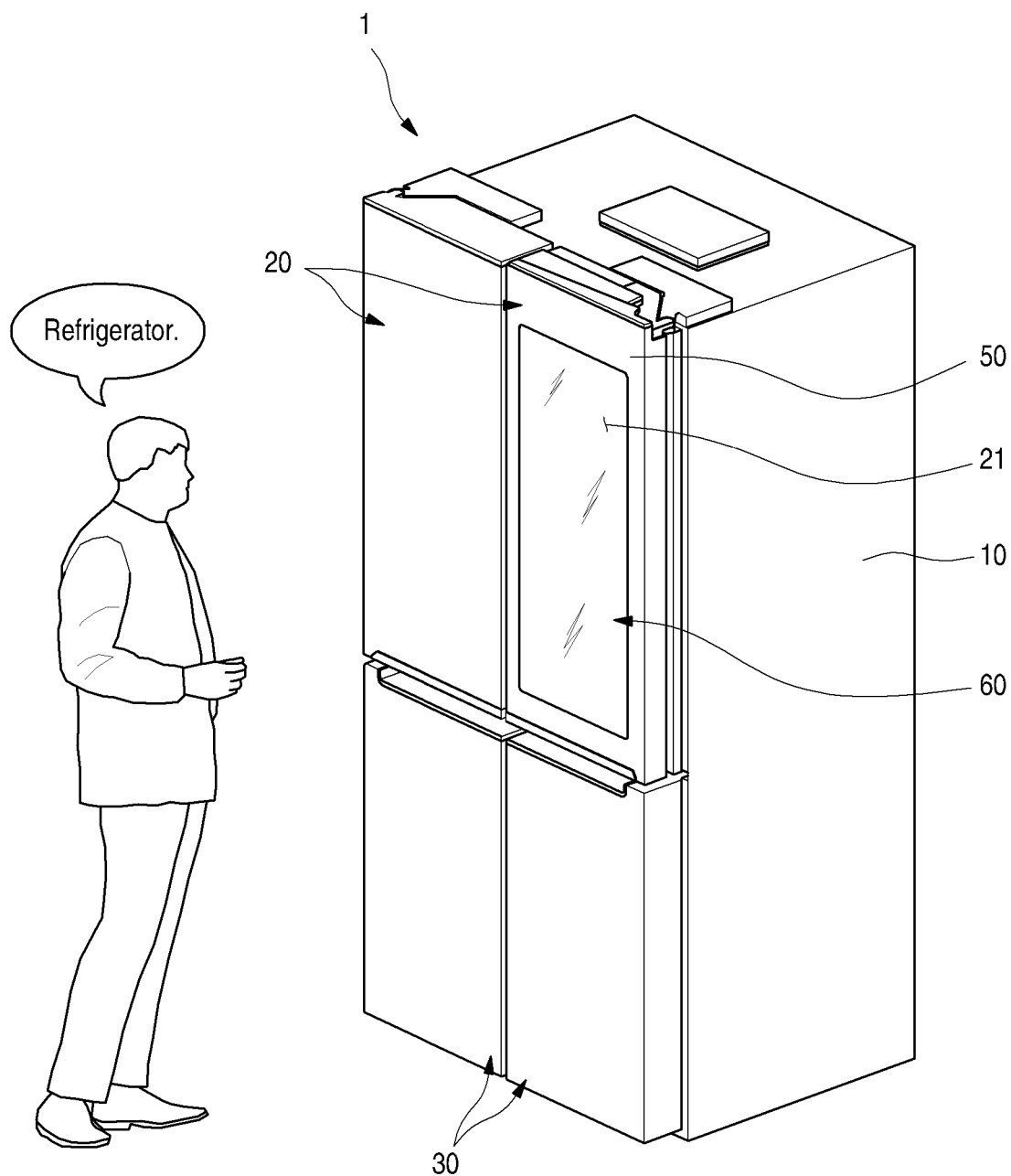
FIG. 28 is a perspective view illustrating an example in which a voice command is inputted as a trigger voice in the refrigerator.

Referring to FIG. 28, the user may not manipulate the menu button 210a on the initial screen 211, but directly input the triggering voice command. That is, if the user is holding an object in his/her hands or is located at a long distance somewhat, the microphone 181 converts the screen into the voice input standby screen 212 when the user speaks a voice that becomes a trigger, for example, a word such as a "refrigerator". Even in a situation in which the transparent display assembly 60 is opaque due to the turn-off of the display light 68 other than the initial screen 211, the trigger sound may be inputted to be converted to the initial screen 211 or directly entered into the screen 212. [S130]

When the manipulation of the menu button 210a or the input of the trigger voice is completed, the voice input standby screen 212 may be outputted. The voice input standby screen 212 may be a screen for displaying that is ready to receive the user's voice command and may display a bar shape having a specific color, for example, a "blue color" on a status bar 212a displayed at a center of the screen and output a phrase "Listening". Thus, the user may confirm the status bar 212a on the voice input standby screen 212 and know that the voice input preparation is completed.

When being converted into the voice input standby screen 212, the transparent display assembly 60 may more become opaque or dark than the initial screen 211 to more clearly display the status bar 212a and improve readability of an outputted message. For this, the screen output of the display 62 may be adjusted, or the display light 68 or the door light 57 may be adjusted in the display PCB 15. Also, after the voice input standby screen 212, a voice input screen 213, an operation processing screen 214, and a response screen 215 may have the same brightness as the sound input standby screen 212. [S140]

When the user inputs the voice command on the voice input standby screen 212, the microphone 181 may receive the voice command, and the see-through part 21 may become a state of the voice input screen 213. [S150] Also, when the voice input is not performed until a preset time elapses in the state of the voice input standby screen 212, that a voice signal is not inputted may be displayed on the screen and guided through the speaker 182 on the response screen. [S180/S190]

The status bar 213a having a rod-like wave shape may be displayed on the voice input screen 213 according to the voice to indicate that the user's voice command is being inputted, and a phrase "Listening" may be outputted. Thus, the user may know that the voice command is properly inputted through a change in state of the status bar 213a. [S160]

When the user inputs the voice command on the voice input screen 213, the see-through part 21 may output the operation processing screen 214. The status bar 214a having the bar shape may be outputted again on the voice input screen 213, and a phrase "Processing" may be outputted. Thus, the user may know that the voice command is properly inputted and processed through a change in state of the status bar 214a. [170]

Figure 29:
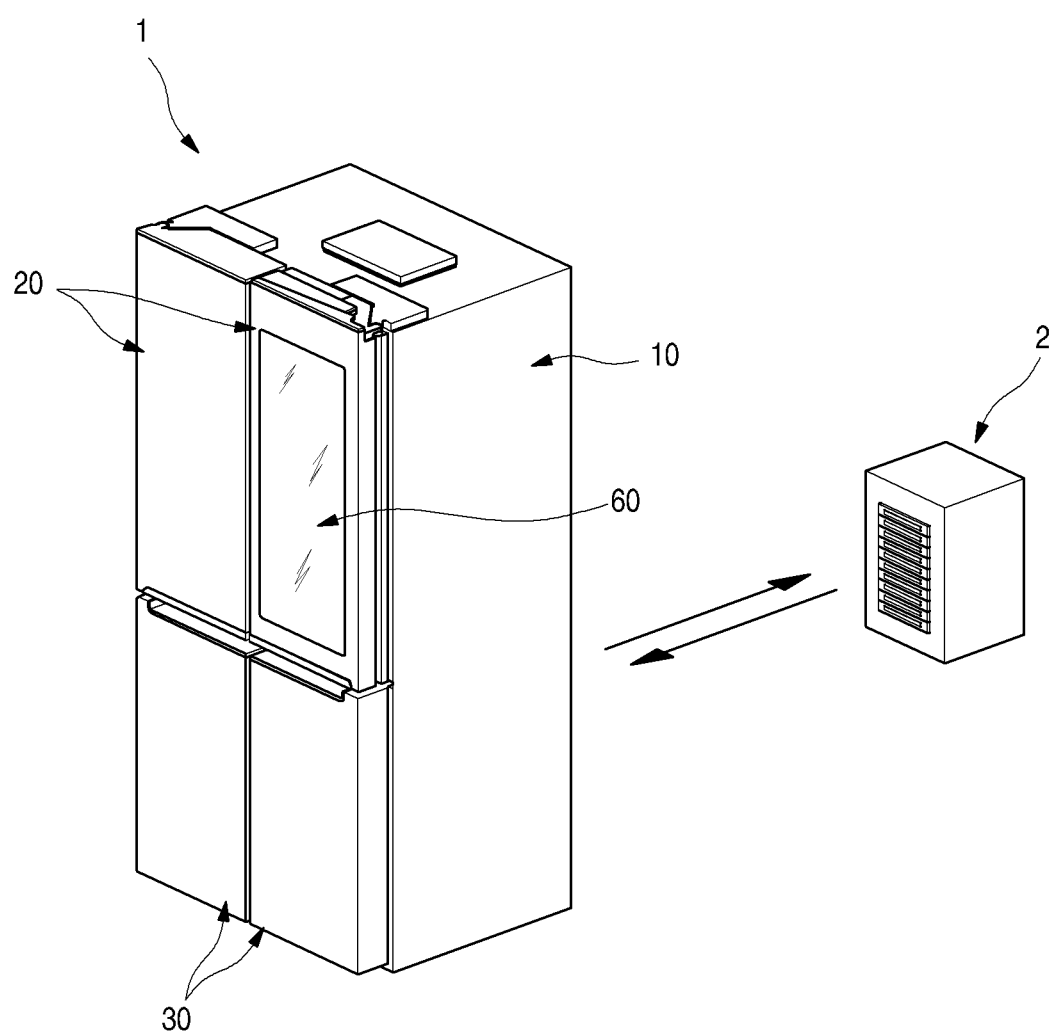
FIG. 29 is a view illustrating communication between the refrigerator and an Internet server.

FIG. 29 is a view illustrating communication between the refrigerator and the internet server. As illustrated in the drawing, when the user inputs a command such as "order one box of bottled water" on the voice input screen 213, the refrigerator 1 may communicate with the remote internet server 2 through the communication unit 154 while the operation processing screen 214 is outputted and order the bottled water online through the internet.

When the online order is completed in the refrigerator 1, the see-through part 21 may be converted into the response screen 215 to output a voice such as "ordered one box of bottled water" through the speaker 182. Also, the status bar 215a having the rod-like wave shape may be displayed, and a phrase "Responding" may be outputted. Thus, the user may know that the voice command is properly inputted through a change in state of the status bar 515a. [S200]

In addition, various conditions for such online ordering may be set. In an embodiment, a simple example in which online ordering is possible is described, and a voice is outputted to allow the user to enable user's selection through the response screen 215. In this case, the screen may be converted again into the voice input standby screen 212 to receive the user's voice command again.

Also, when the voice command is completely inputted, the see-through part 21 may be converted again into the initial screen 211 after the response screen to end the voice command input. Thus, it is possible to input another operation through the manipulation of the menu button 210a by the user or to input the voice command again.

In the voice input standby screen 212, the voice input screen 213, the operation processing screen 214, and the response screen 215, when the menu button 210a displayed on a lower end of each of the screens is converted into a hidden state, and the corresponding area is touched, a menu may be outputted at any time. Also, a cancel button 210b may be outputted on a right upper end of the voice input standby screen 212, and when the user manipulates the cancel button 210b, the screen may return to the initial screen 211.

Figure 30:
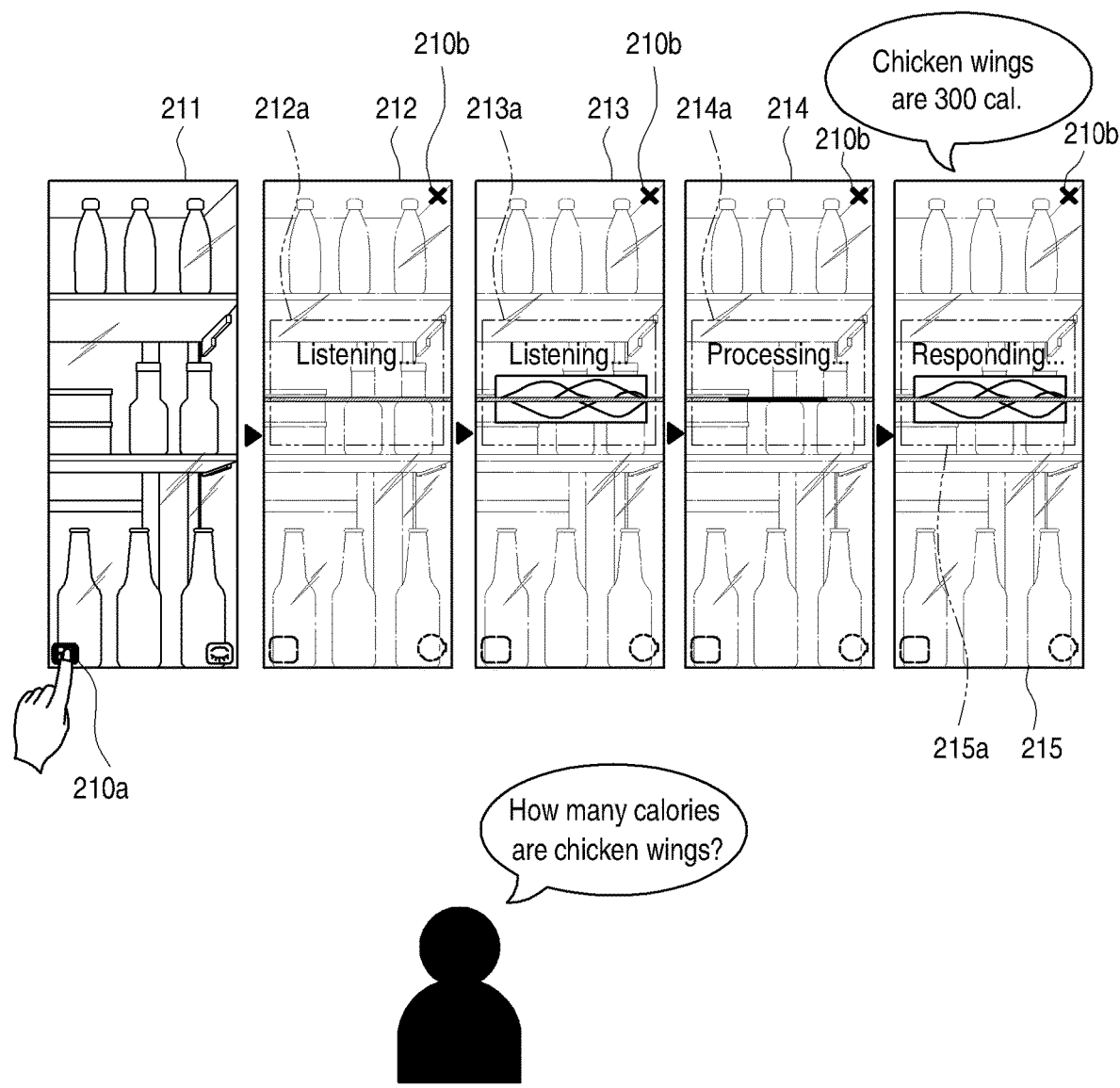
FIG. 30 is a view sequentially illustrating a second example of a state in which a screen outputted by the transparent display assembly is converted.

A different type of a voice command may be inputted into the refrigerator 1 according to an embodiment. For example, information stored in the online or refrigerator 1 may be outputted as a voice. FIG. 30 is a view sequentially illustrating a second example of a state in which a screen outputted by the transparent display assembly is converted.

As illustrated in the drawing, the user manipulates the menu button 210a first on the initial screen 211 to input a voice. When the menu button 210a is manipulated, a screen displayed through the see-through part 21 may be converted into the voice input standby screen 212. Then, a rod-like status bar 212a may be outputted, and a phrase "Listening" may be outputted. In this state, the user may input the voice command.

When being converted into the voice input standby screen 212, the transparent display assembly 60 may more become opaque or dark than the initial screen 211 to more clearly display the status bar 212a and improve readability of an outputted message. For this, the screen output of the display 62 may be adjusted, or the display light 68 or the door light 57 may be adjusted in the display PCB 15. Also, after the voice input standby screen 212, a voice input screen 213, an operation processing screen 214, and a response screen 215 may have the same brightness as the sound input standby screen 212.

When the user inputs the voice command, the see-through part 21 may display the voice input screen 213. Then, the status bar 213a having a rod-like wave shape may be displayed on the voice input screen 213 according to the voice to indicate that the user's voice command is being inputted, and a phrase "Listening" may be outputted.

When the user inputs the voice command on the voice input screen 213, the see-through part 21 may output the operation processing screen 214. The status bar 214a having the bar shape may be outputted again on the operation processing screen 214, and a phrase "Processing" may be outputted. When the user inputs a voice command such as "How many calories are chicken wings?" on the voice input screen 213, the refrigerator 1 performs an operation of confirming information stored in the refrigerator 1 itself or information stored in the internet server 2 through communication while the operation processing screen 214 is outputted.

Also, when the information is confirmed in the refrigerator 1, the see-through part 21 may be converted into the response screen 215 to output a voice such as "Chicken wings are 300 cal" through the speaker 182. Also, the status bar 215a having the rod-like wave shape may be displayed, and a phrase "Responding" may be outputted. Thus, the user may confirm that the response with respect to the voice command is properly performed through a change in state of the status bar 215a. Here, the command for confirming the information by the user is not limited thereto, and thus, various pieces of information obtained from the refrigerator 1 itself or obtained through the internet server 2 may be outputted.

Figure 31:
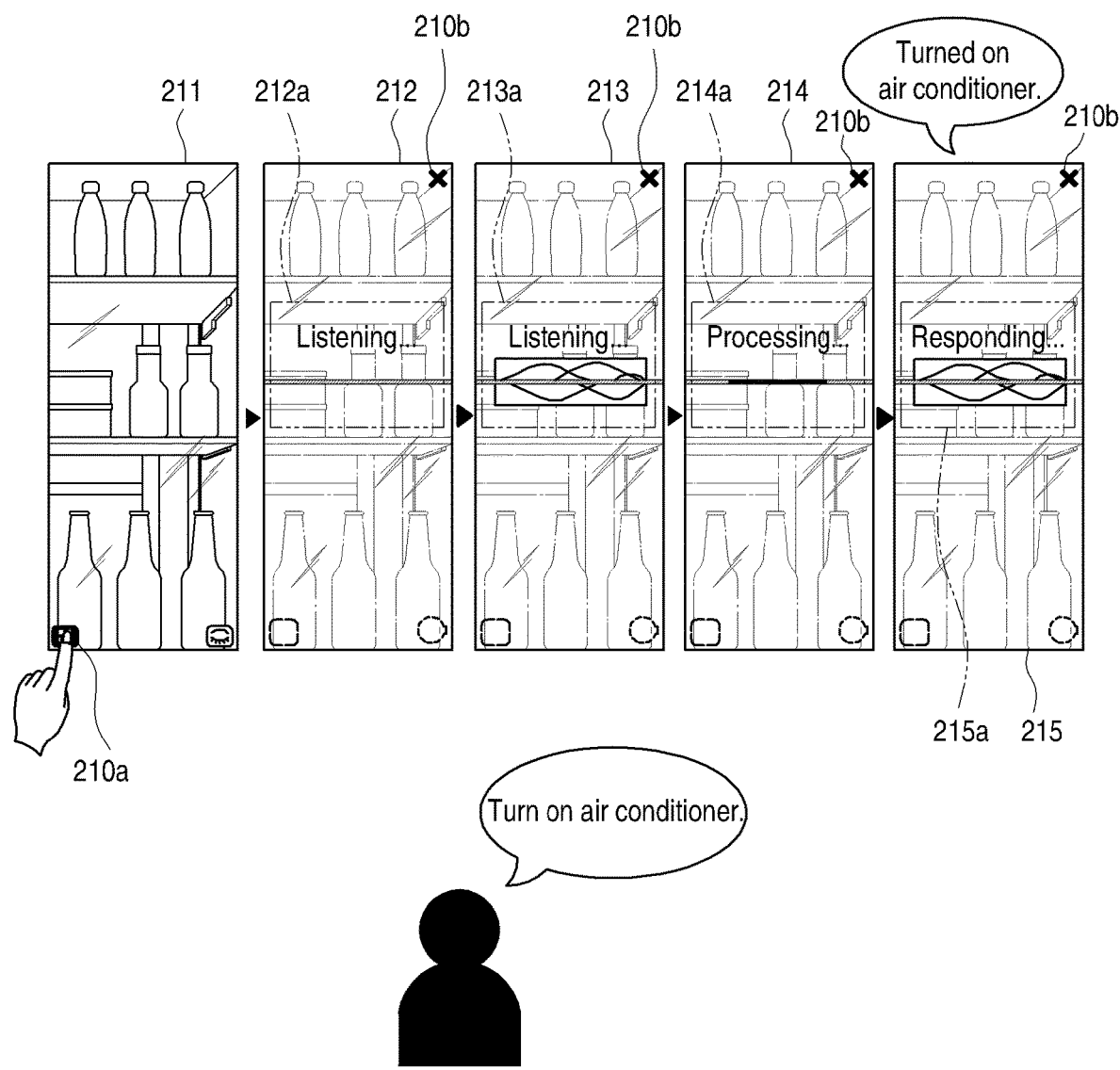
FIG. 31 is a view sequentially illustrating a third example of a state in which a screen outputted by the transparent display assembly is converted.
Figure 32:
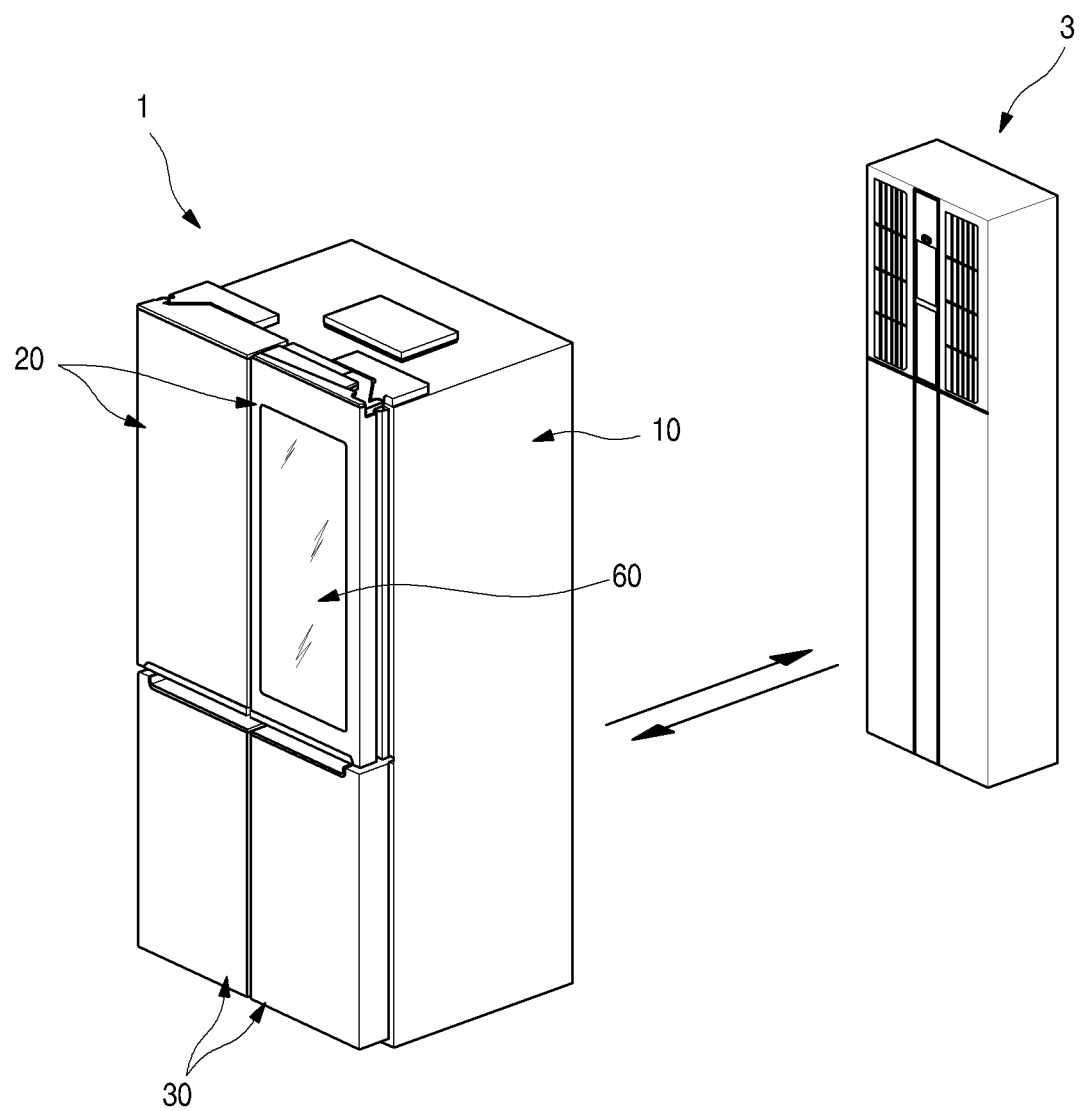
FIG. 32 is a view illustrating a communication state between the refrigerator and an air conditioner.

A different type of a voice command may be inputted into the refrigerator 1 according to an embodiment. For example, an operation of another home appliance may be controlled through the refrigerator 1. FIG. 31 is a view sequentially illustrating a third example of a state in which a screen outputted by the transparent display assembly is converted. Also, FIG. 32 is a view illustrating a communication state between the refrigerator and an air conditioner.

As illustrated in the drawing, the user manipulates the menu button 210a first on the initial screen 211 to input a voice. When the menu button 210a is manipulated, a screen displayed through the see-through part 21 may be converted into the voice input standby screen 212. Then, a rod-like status bar 212a may be outputted, and a phrase "Listening" may be outputted. In this state, the user may input the voice command.

When being converted into the voice input standby screen 212, the transparent display assembly 60 may more become opaque or dark than the initial screen 211 to more clearly display the status bar 212a and improve readability of a message. For this, the screen output of the display 62 may be adjusted, or the display light 68 or the door light 57 may be adjusted in the display PCB 15. Also, after the voice input standby screen 212, a voice input screen 213, an operation processing screen 214, and a response screen 215 may have the same brightness as the sound input standby screen 212.

When the user inputs the voice command, the see-through part 21 may display the voice input screen 213. Then, the status bar 213a having a rod-like wave shape may be displayed on the voice input screen 213 according to the voice to indicate that the user's voice command is being inputted, and a phrase "Listening" may be outputted.

When the user inputs the voice command on the voice input screen 213, the see-through part 21 may output the operation processing screen 214. The status bar 214a having the bar shape may be outputted again on the operation processing screen 214, and a phrase "Processing" may be outputted.

When the user inputs a voice command such as "Turn on air conditioner" on the voice input screen 213, the refrigerator 1 may instruct an operation of an air conditioner 3 connected to the network through the communication unit 154 while the operation processing screen 214 is outputted. Alternatively, the refrigerator 1 may be directly connected to the air conditioner 3 by a short distance communication method such as Bluetooth. In this case, the operation command may be directly transmitted to the air conditioner 3 through the communication unit 154.

Also, when the operation of the air conditioner 3 is completely confirmed in the refrigerator 1, the see-through part 21 may be converted into the response screen 215 to output a voice such as "Turned on air conditioner" through the speaker 182. Also, the status bar 215a having the rod-like wave shape may be displayed, and a phrase "Responding" may be outputted. Thus, the user may confirm that the response with respect to the voice command is properly performed through a change in state of the status bar 215a.

Figure 33:
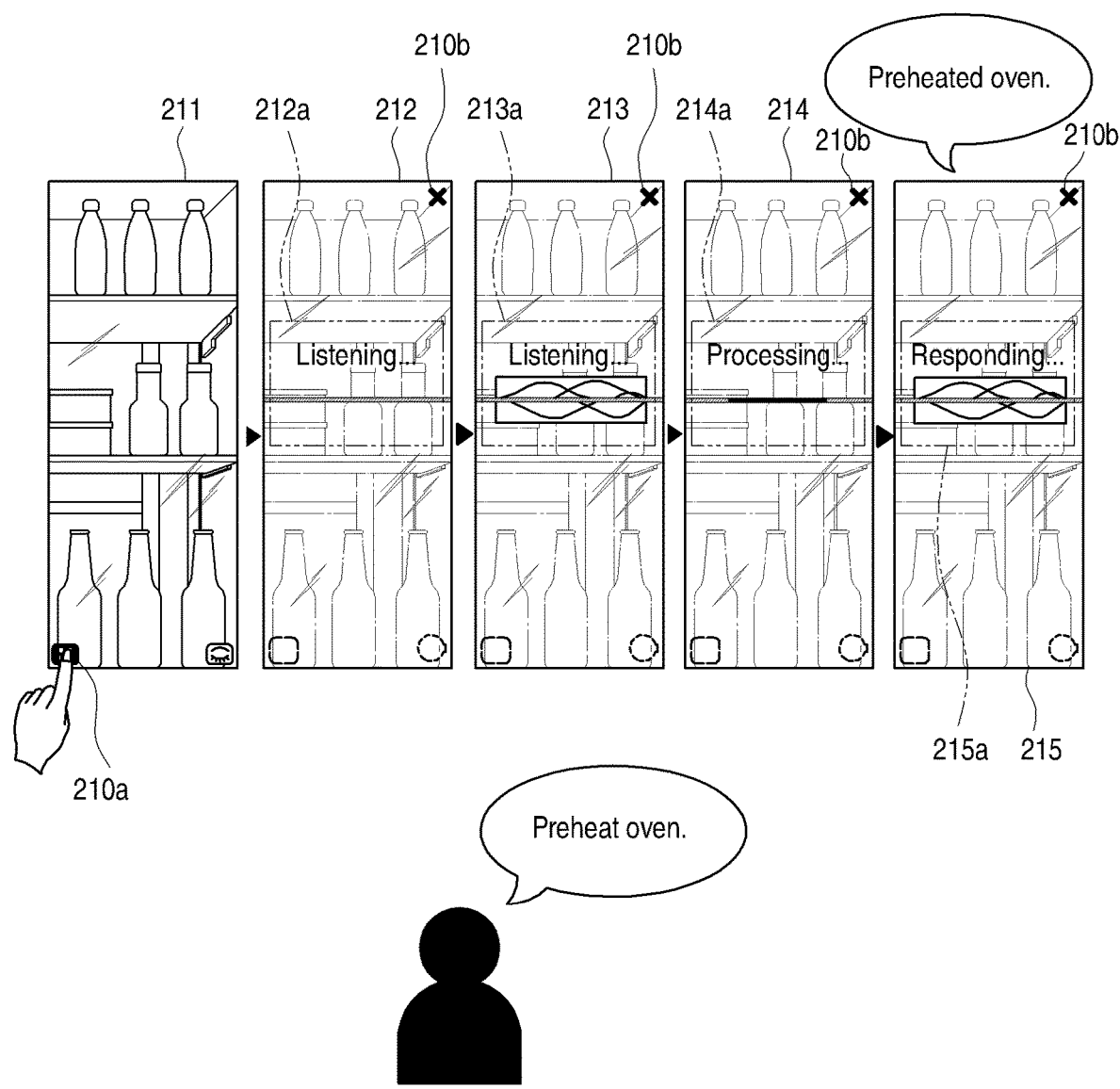
FIG. 33 is a view sequentially illustrating a fourth example of a state in which a screen outputted by the transparent display assembly is converted.
Figure 34:
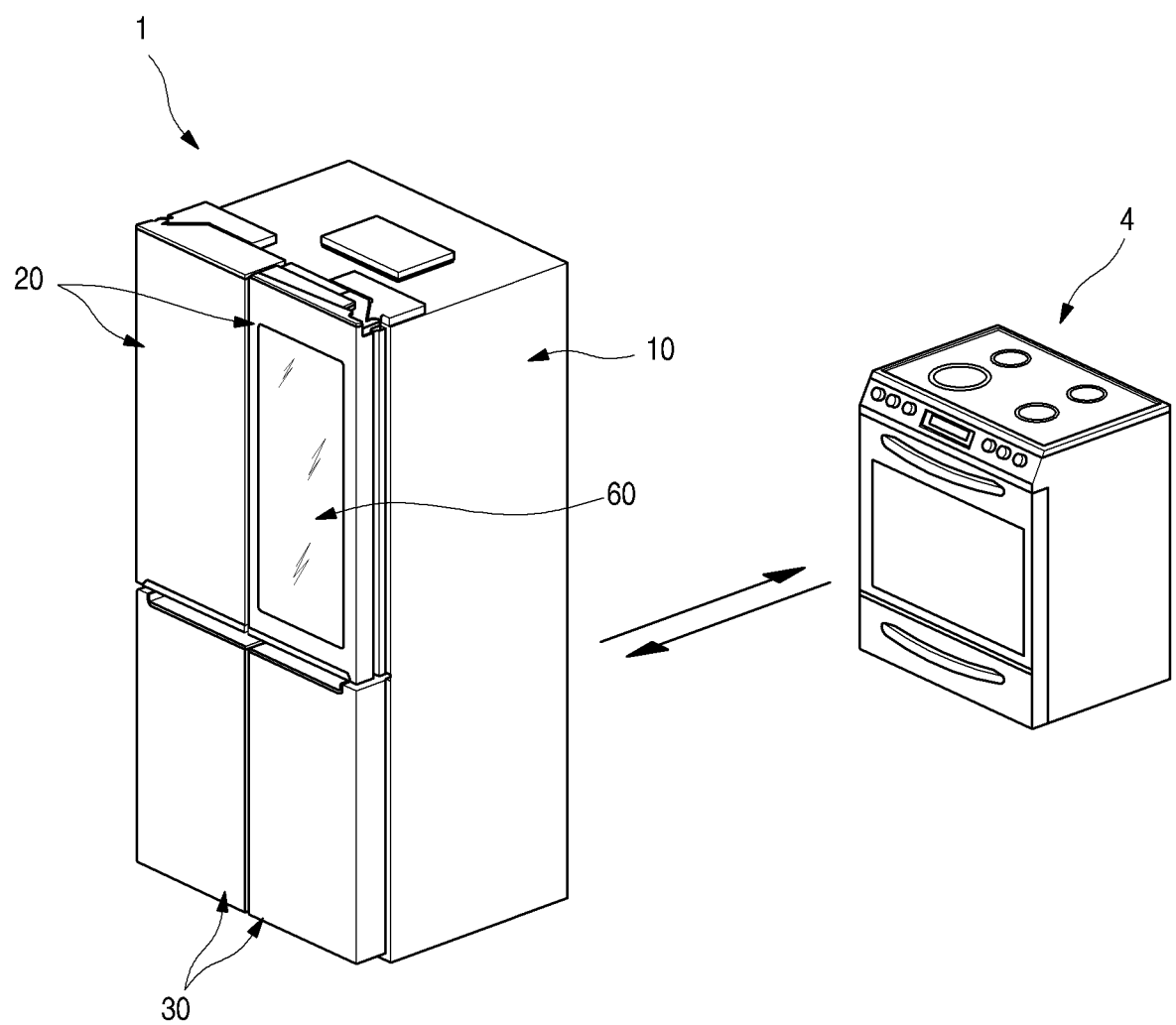
FIG. 34 is a view illustrating a communication state between the refrigerator and an oven.

FIG. 33 is a view sequentially illustrating a fourth example of a state in which a screen outputted by the transparent display assembly is converted. Also, FIG. 34 is a view illustrating a communication state between the refrigerator and an oven. As illustrated in the drawings, the user manipulates the menu button 210a first on the initial screen 211 to input a voice. When the menu button 210a is manipulated, a screen displayed through the see-through part 21 may be converted into the voice input standby screen 212. Then, a rod-like status bar 212a may be outputted, and a phrase "Listening" may be outputted. In this state, the user may input the voice command.

When being converted into the voice input standby screen 212, the transparent display assembly 60 may more become opaque or dark than the initial screen 211 to more clearly display the status bar 212a and improve readability of a message. For this, the screen output of the display 62 may be adjusted, or the display light 68 or the door light 57 may be adjusted in the display PCB 15. Also, after the voice input standby screen 212, a voice input screen 213, an operation processing screen 214, and a response screen 215 may have the same brightness as the sound input standby screen 212.

When the user inputs the voice command, the see-through part 21 may display the voice input screen 213. Then, the status bar 213a having a rod-like wave shape may be displayed on the voice input screen 213 according to the voice to indicate that the user's voice command is being inputted, and a phrase "Listening" may be outputted.

When the user inputs the voice command on the voice input screen 213, the see-through part 21 may output the operation processing screen 214. The status bar 214a having the bar shape may be outputted again on the operation processing screen 214, and a phrase "Processing" may be outputted.

When the user inputs a voice command such as "Preheat oven" on the voice input screen 213, the refrigerator 1 may instruct an operation of an oven 4 connected to the network through the communication unit 154 while the operation processing screen 214 is outputted. Alternatively, the refrigerator 1 may be directly connected to the oven 4 by a short distance communication method such as Bluetooth. In this case, the operation command may be directly transmitted to the oven 4 through the communication unit 154.

Also, when the operation of the oven 4 is completely confirmed in the refrigerator 1, the see-through part 21 may be converted into the response screen 215 to output a voice such as "Preheated oven" through the speaker 182. Also, the status bar 215a having the rod-like wave shape may be displayed, and a phrase "Responding" may be outputted. Thus, the user may confirm that the response with respect to the voice command is properly performed through a change in state of the status bar 215a.

Here, the operation command of the remote home appliance by the user is not limited to the air conditioner 3 and the oven 4. For example, it may also be possible to control not only home appliances but also various communication devices such as door locks, windows, gas valves, lightings, and the like.

Figure 35:
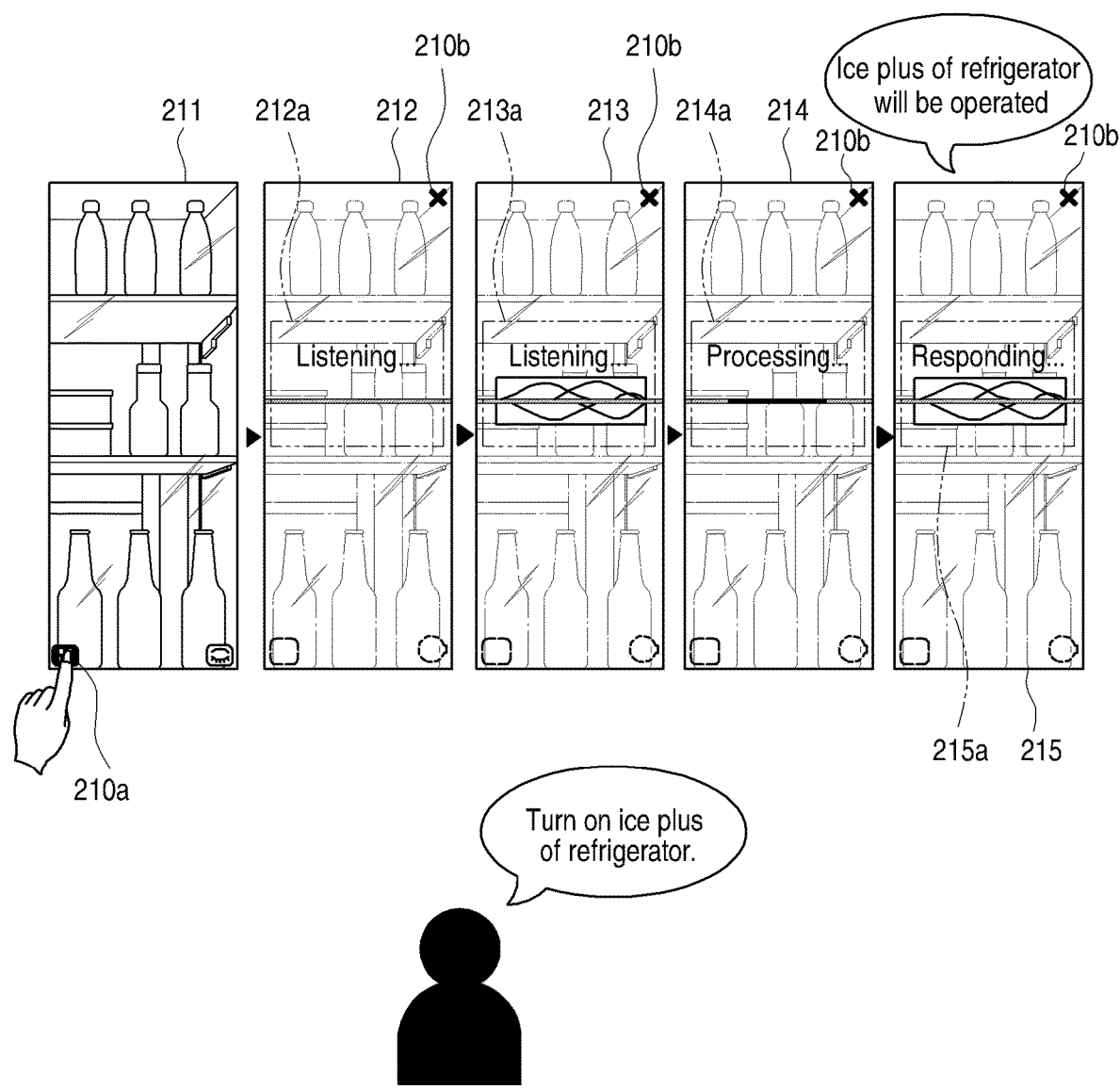
FIG. 35 is a view sequentially illustrating a fifth example of a state in which a screen outputted by the transparent display assembly is converted.

A different type of a voice command may be inputted into the refrigerator 1 according to an embodiment. For example, an operation of the refrigerator 1 itself may be controlled. FIG. 35 is a view sequentially illustrating a fifth example of a state in which a screen outputted by the transparent display assembly is converted.

As illustrated in the drawing, the user manipulates the menu button 210a first on the initial screen 211 to input a voice. When the menu button 210a is manipulated, a screen displayed through the see-through part 21 may be converted into the voice input standby screen 212. Then, a rod-like status bar 212a may be outputted, and a phrase "Listening" may be outputted. In this state, the user may input the voice command.

When being converted into the voice input standby screen 212, the transparent display assembly 60 may more become opaque or dark than the initial screen 211 to more clearly display the status bar 212a and improve readability of a message. For this, the screen output of the display 62 may be adjusted, or the display light 68 or the door light 57 may be adjusted in the display PCB 15. Also, after the voice input standby screen 212, a voice input screen 213, an operation processing screen 214, and a response screen 215 may have the same brightness as the sound input standby screen 212.

When the user inputs the voice command, the see-through part 21 may display the voice input screen 213. Then, the status bar 213a having a rod-like wave shape may be displayed on the voice input screen 213 according to the voice to indicate that the user's voice command is being inputted, and a phrase "Listening" may be outputted.

When the user inputs the voice command on the voice input screen 213, the see-through part 21 may output the operation processing screen 214. The status bar 214a having the bar shape may be outputted again on the operation processing screen 214, and a phrase "Processing" may be outputted.

When the user inputs a voice command such as "Turn on ice plus of refrigerator" on the voice input screen 213, the refrigerator 1 may rapidly make a large amount of ice in an ice maker (not shown) within the refrigerator 1 through the main PCB 141 while the operation processing screen 214 is outputted.

Also, when an operation of the ice maker is performed, the see-through part 21 may be converted into the response screen 215 to output a voice such as "Ice plus of refrigerator will be operated" through the speaker 182. Also, the status bar 215a having the rod-like wave shape may be displayed, and a phrase "Responding" may be outputted. Thus, the user may confirm that the response with respect to the voice command is properly performed through a change in state of the status bar 215a.

The user may manipulate various functions that are capable of being adjusted in the refrigerator itself such as a temperature control and quick freezing in the refrigerator 1, a brightness control of the see-through part 21, and the like by using voice commands in addition to the operation of the ice maker.

Figure 36:
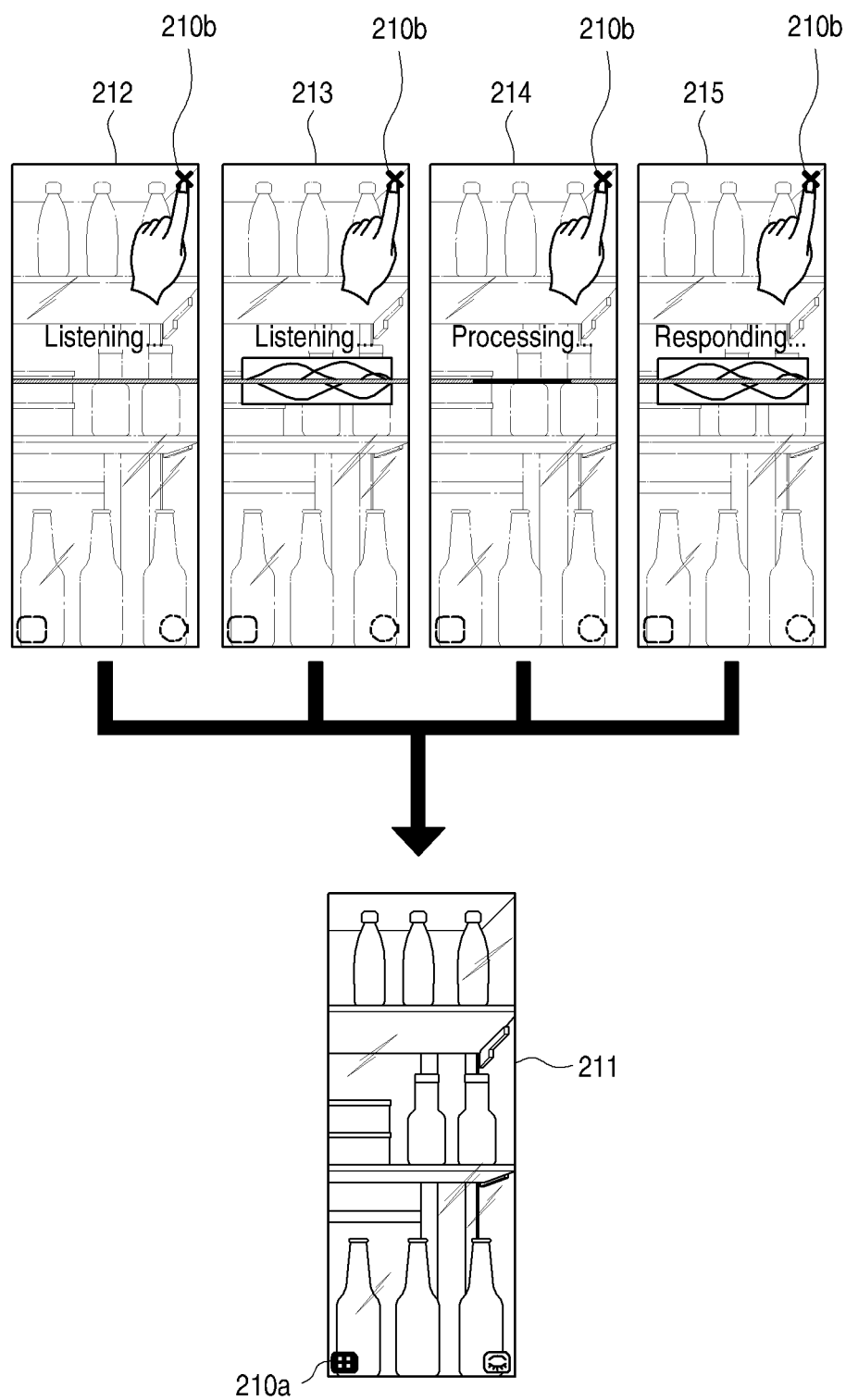
FIG. 36 is a view illustrating a cancel state of a screen outputted by the transparent display assembly.

FIG. 36 is a view illustrating a cancel state of a screen outputted by the transparent display assembly. As illustrated in the drawing, while the voice command is performed, the user may manipulate the menu button 210a or the cancel button 210b whenever the user wishes to perform the voice command.

That is, in the voice input standby screen 212, the voice input screen 213, the operation processing screen 214, and the response screen 215, when the menu button 210a displayed on a lower end of each of the screens is converted into a hidden state, and the corresponding area is touched, a menu may be outputted at any time. Although the menu button 210a is not outputted on the screen so that the user focuses on the transmission of the information, the user may operate the menu button when touching the corresponding position.

Also, the cancel button 210b is outputted on a right upper end of the voice input standby screen 212. When the user desires to cancel or re-input the voice command, the user may manipulate the cancel button 210b during the input of the voice command. Also, when the cancel button 210b is manipulated, the screen may return to the initial screen 211.

Figure 37:
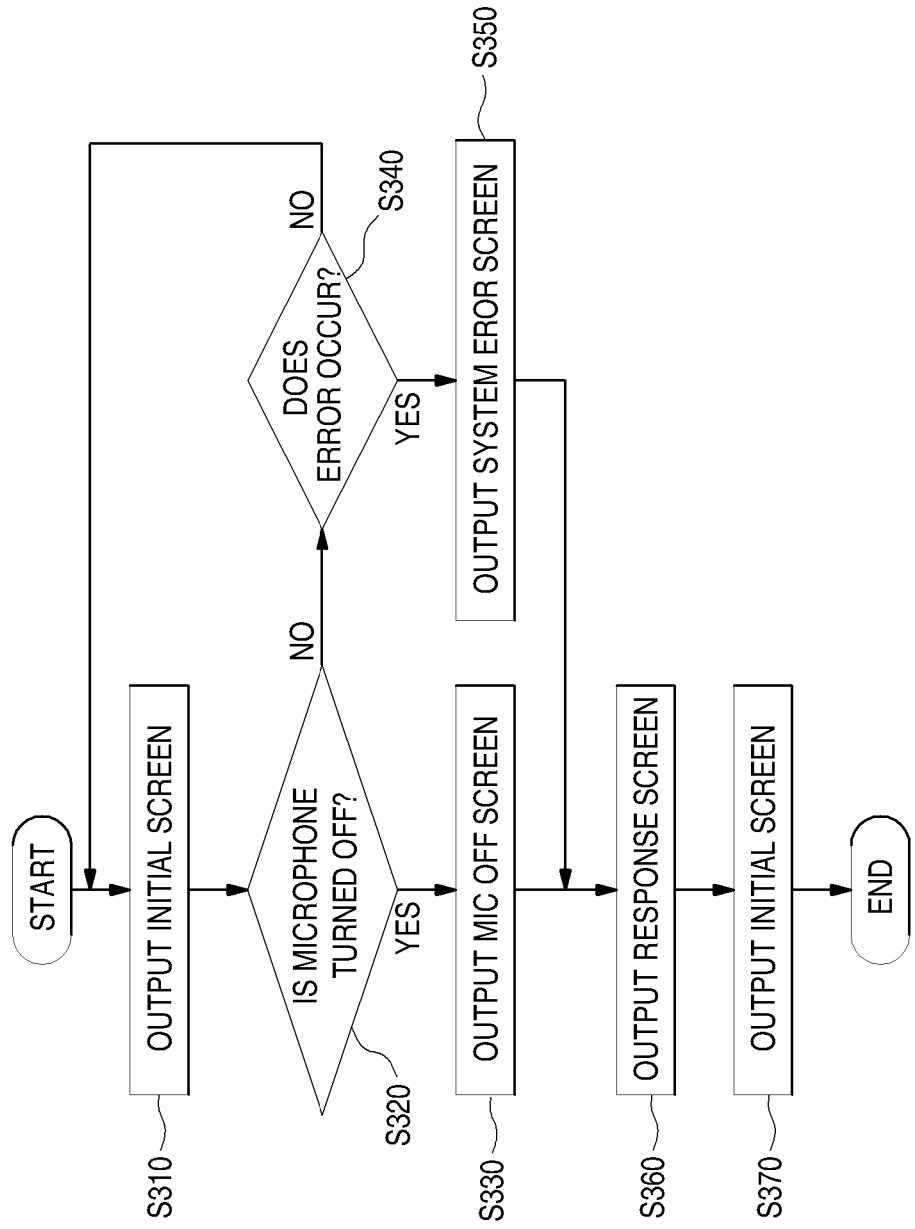
FIG. 37 is a view sequentially illustrating an operation in an error situation during manipulation for inputting a voice command in the refrigerator.
Figure 38:
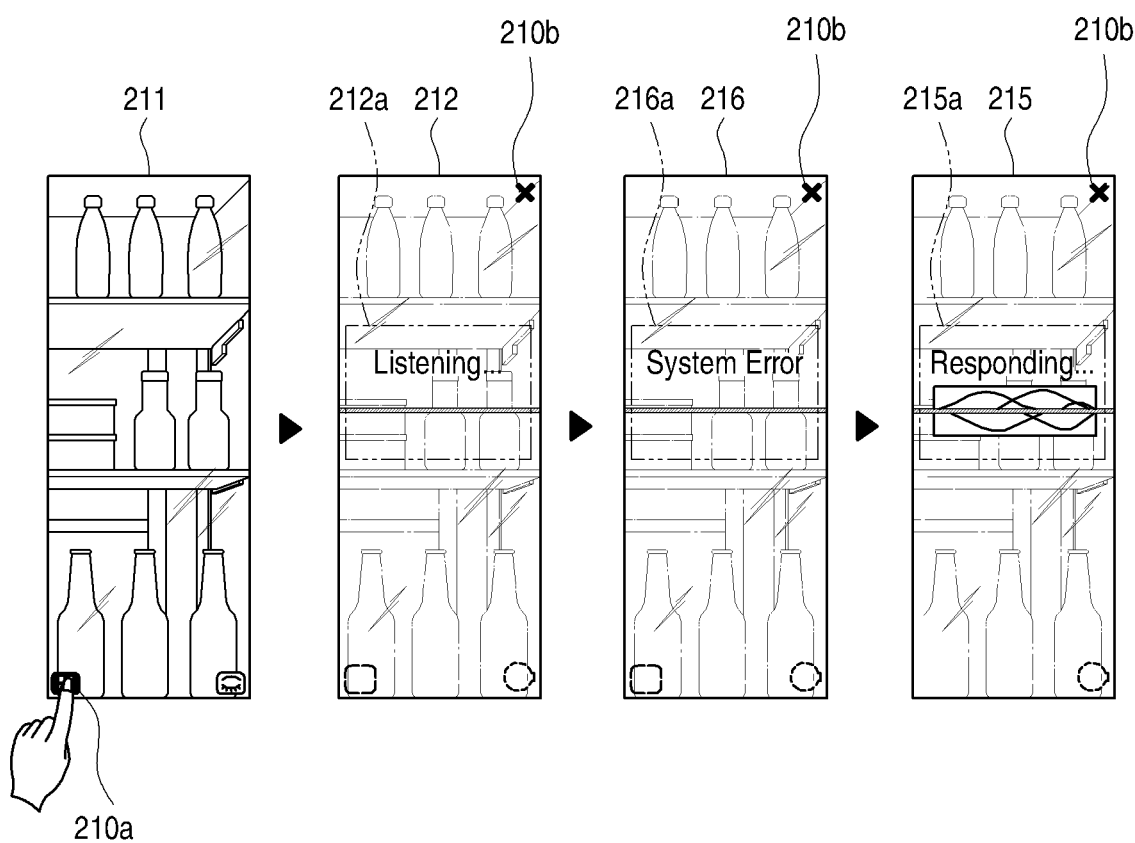
FIG. 38 is a view sequentially illustrating a state of a screen outputted by the transparent display assembly when a microphone is turned off.
Figure 39:
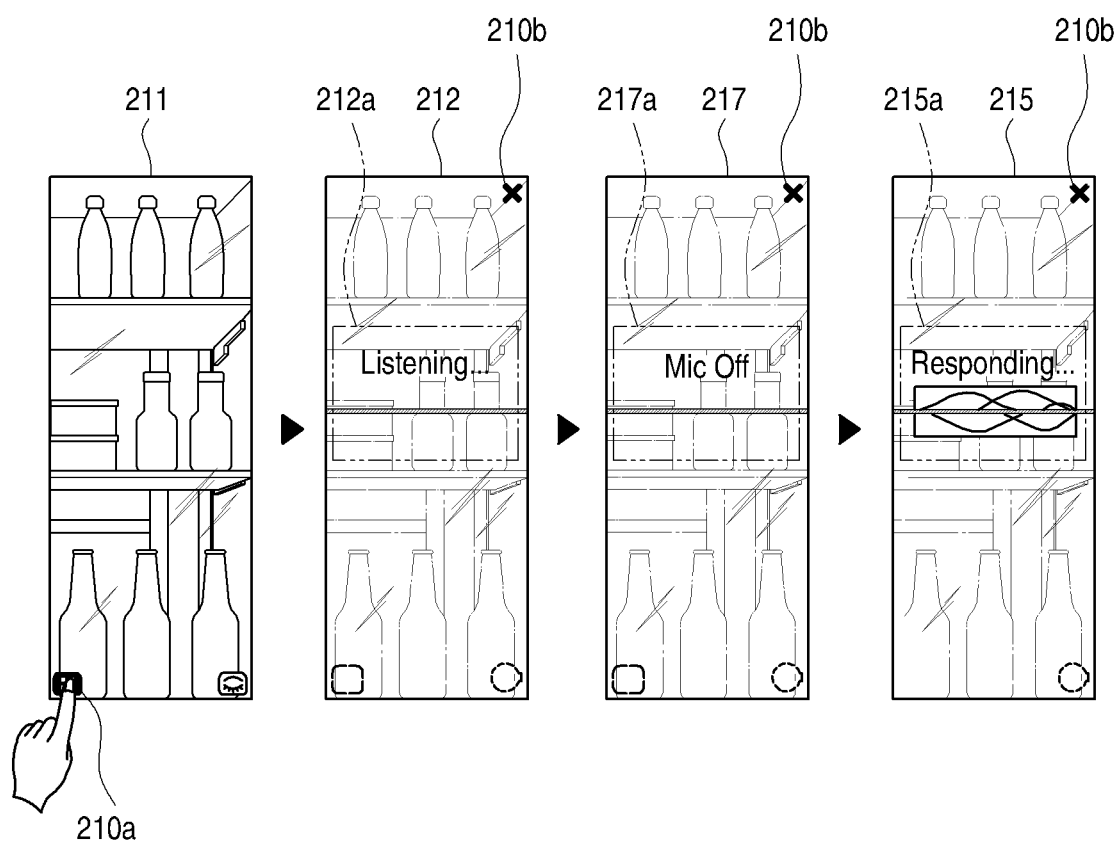
FIG. 39 is a view sequentially illustrating a state of a screen outputted by the transparent display assembly when a system is errored.

FIG. 37 is a view sequentially illustrating an operation in an error situation during manipulation for inputting a voice command in the refrigerator. Also, FIG. 38 is a view sequentially illustrating a state of a screen outputted by the transparent display assembly when the microphone is turned off. Also, FIG. 39 is a view sequentially illustrating a state of a screen outputted by the transparent display assembly when a system is errored.

As illustrated in the drawings, to input the user's voice command, the initial screen 211 is displayed. To input the voice command on the initial screen 211 [S310], when the menu button 210a is manipulated, the see-through part 21 is converted into the voice input standby screen 212. Also, the display PCB 15 may check a normal operation of the microphone 181 on the voice input standby screen 212. [S320] When the microphone 181 abnormally operates or is turned off, a microphone off screen 217 is outputted. In the microphone off screen 217, a color of the status bar 217a may be outputted as a color different from the normal operation, for example, a "red color, and a phrase "Mic OFF" may be outputted. [S330]

Then, the see-through part 21 may be converted into the voice input screen 213 to output the turn-off state of the microphone 181 through the speaker 182. Also, when a preset time elapses on the voice input screen 213, the screen may return again to the initial screen 211.

To input the user's voice command, the initial screen 211 is displayed. To input the voice command on the initial screen 211, when the menu button 210a is manipulated, the see-through part 21 is converted into the voice input standby screen 212. Also, the refrigerator 1 may check whether the system normally operates on the voice input standby screen 212. When an error occurs in the system [S340], for example, when the communication unit 154 fails to communicate or when an error occurs on the display PCB 15 for controlling the transparent display assembly 60, a system error screen 216 is outputted. In the system error screen 216, a color of the status bar 216a may be outputted as a color different from the normal operation, for example, a "red color, and a phrase "System error" may be outputted. [S350]. Then, the see-through part 21 may be converted into the voice input screen 213 to output the occurrence of the system error through the speaker 182.

Also, after the microphone off screen or the system error screen is outputted, the screen may be converted into the response screen 215 to output a voice such as "Mic off" or "System error" through the speaker 182. Also, the status bar 215a having the rod-like wave shape may be displayed, and a phrase "Responding" may be outputted. Also, when a preset time elapses on the voice input screen 213, the screen may return again to the initial screen 211. [S370]

The main components of the refrigerator according to an embodiment may be connected to the internet server through the main PCB and the display PCB, and information with respect to the operation of the refrigerator may be outputted through the transparent display assembly and a user's mobile device. Also, the refrigerator may control operations of the main components of the refrigerator through the voice command inputted through the microphone to output the controlled results through the transparent display assembly.

Figure 40:
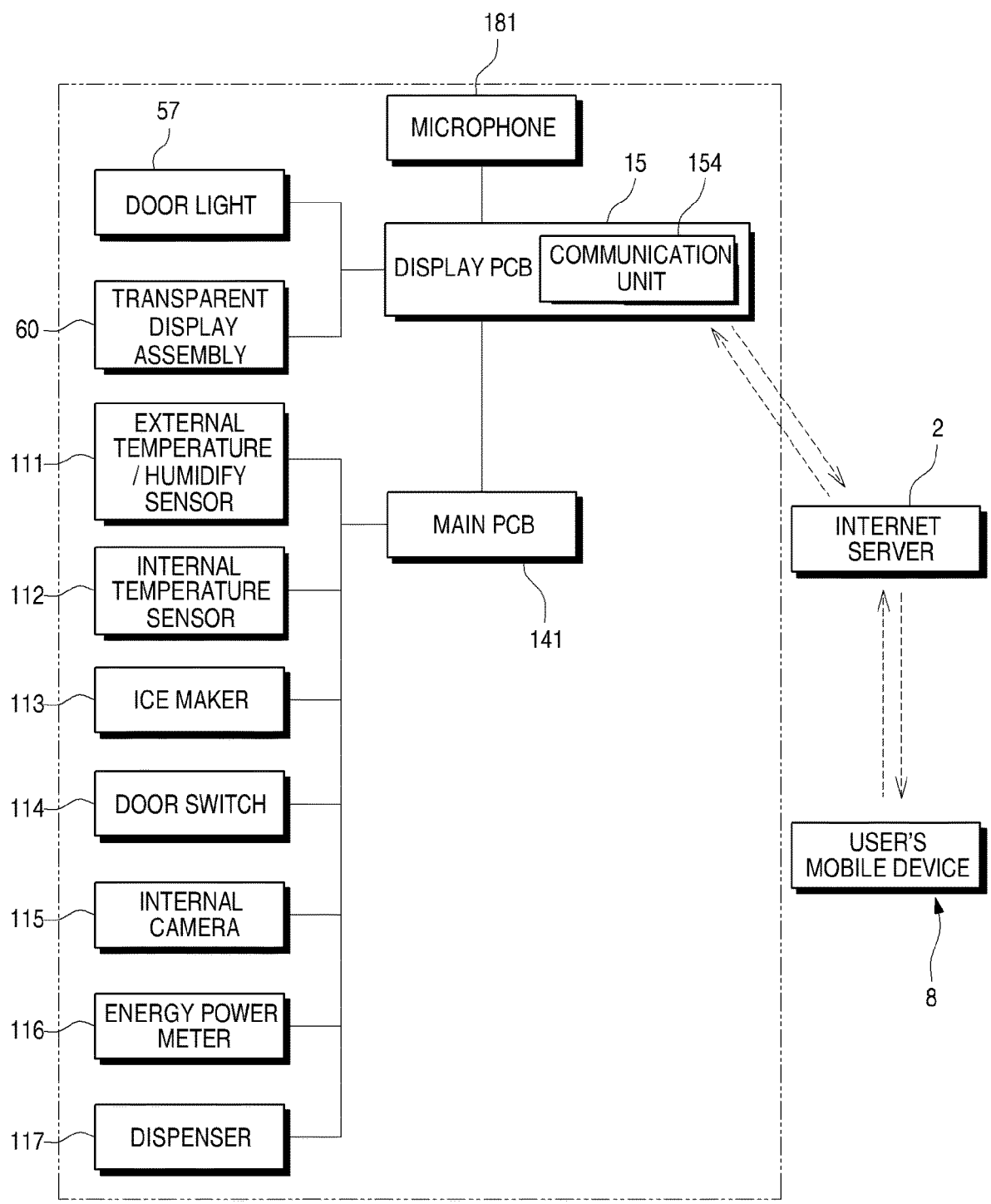
FIG. 40 is a block diagram illustrating a connection relationship between a main component of the refrigerator and a user's mobile device.

FIG. 40 is a block diagram illustrating a connection relationship between the main component of the refrigerator and the user's mobile device. As illustrated in the drawings, the display PCB 15 may include the communication unit 154 and be connected to the microphone 181. Also, the display PCB 15 may be connected to the door light 57 and the transparent display assembly 60 to control operations thereof.

Also, the display PCB 15 may be connected to the main PCB 141 for controlling an overall operation of the refrigerator 1. Alternatively, the display PCB 15 and the main PCB 141 may be integrated with each other and defined as a control unit. Thus, the main components of the refrigerator 1, which are connected to the main PCB 141, may be controlled by manipulating the transparent display assembly 60 or inputting the voice command through the microphone 181.

Referring to the main components connected to the main PCB 141, the main PCB 141 may be connected to an external temperature/humidity sensor 111 for measuring a temperature and humidity outside the refrigerator 1 to confirm temperature and humidity information outside the refrigerator 1, thereby controlling an operation of the refrigerator 1. Also, the main PCB 141 may be connected to an internal temperature sensor 112 for measuring a temperature inside the refrigerator 1 to confirm temperature information within the refrigerator, thereby controlling an operation of the refrigerator 1. Also, the main PCB 141 may be connected to the ice maker 113 which makes and stores ices to control an operation of the ice maker 113. Also, the main PCB 141 may be connected to a door switch 114 for detecting an opening/closing of the door 20 to confirm information with respect to whether the door 20 is opened or close and the number of opening/closing of the door 20. Also, the main PCB 141 may be connected to an internal camera 115 for photographing the inside of the refrigerator 1 to confirm an accommodated state of foods within the refrigerator and information of accommodated objects. Also, the main PCB 141 may be connected to an energy power meter 116 for measuring power consumption to confirm information with respect to power consumption of the refrigerator 1. Also, the main PCB 141 may be connected to a dispenser 117 for dispensing water and/or ices to control an operation of the dispenser 117.

In addition, the main PCB 141 may be interconnected with various electronic devices provided in the refrigerator 1 in addition to the above-described components to control the operations of the components or confirm information with respect to the components.

The communication unit 154 may be connected to the internet server 2 through wired/wireless communication. The internet server 2 may confirm the operation state of the refrigerator 1 through the information transmitted from the main PCB 141 and check and control the operation state of the refrigerator by comparing the information to data in the internet server 2. Also, the pieces of information of the internet server 2 may be outputted through the transparent display assembly 60 by using the communication unit 154 or outputted to the user's mobile device 8.

Also, the internet server 2 may be connected to the user's mobile device 8 through wireless communication. The user's mobile device 8 may be various devices that are capable of outputting and inputting information through video and/or audio, such as a mobile phone, an exclusive terminal, and a wearable device. Also, the instruction for the operation of the refrigerator 1 as well as the operation information and state of the refrigerator 1 may be realized through the user's mobile device 8.

A usage example of the refrigerator 1, the internet server 2, and the user's mobile device 8 will be described below. First, the user may directly manipulate the transparent display assembly 60, input a voice command through the microphone 181, or manipulate the user's mobile terminal 8 to control a temperature inside the refrigerator 1. Here, the information of the internal temperature sensor 112 may be used.

Also, after confirming the temperature/humidity information within the refrigerator 1 through the external temperature/humidity sensor 111, the temperature within the refrigerator 1 may be adjusted so that quick freezing or sterilization/deodorization is performed to improve the storage state of the foods. Here, the quick freezing or the sterilization/deodorization may be performed by directly manipulating the transparent display assembly 60, inputting the voice command through the microphone 181, or manipulating the user's mobile device. Also, when the quick freezing or the sterilization/deodorization is finished, the finish of the operation may be notified through push by using the transparent display assembly 60 or the user's mobile device 8.

Also, an execution time of the deforesting operation of the refrigerator 1 may be inputted by directly manipulating the transparent display assembly 60, inputting the voice command through the microphone 181, or manipulating the user's mobile device 8 so that a defrost delay operation is performed within a preset time.

Also, ingredients of a recipe, a cooking method, and the like are received from the Internet server 2 through the direct manipulation of the transparent display assembly 60, the input of the voice command through the microphone 181, or the manipulation of the user's mobile device 8 to output the received information through the transparent display assembly 60.

Also, the information with respect to the opening/closing of the door 20 of the refrigerator 1 may be request through the direct manipulation of the transparent display assembly 60, the input of the voice command through the microphone 181, or the manipulation of the user's mobile device 8. As a result, the push alarm may occurs when the door is opened for a preset time or more, or a time zone for reducing the energy consumption may be generated in addition to the guiding of the opened number or time of door to guide the above-described results through the transparent display assembly 60 or the user's mobile device 8.

Also, the information of the foods accommodated in the refrigerator 1 may be requested through the direct manipulation of the transparent display assembly 60, the input of the voice command through the microphone 181, or the manipulation of the user's mobile device 8. Also, the video information photographed by the camera 115 in the refrigerator 1 may be provided to confirm the stored state of the foods or output an expiration date of the stored foods, which is set by the user, through the transparent display assembly 60 and the user's mobile device 8. In addition, when the expiration date arrives, push alarm may be outputted.

Also, the operation information such as set states or usage numbers and periods of the ice maker 113 and the dispenser 117 may be outputted through the direct manipulation of the transparent display assembly 60, the input of the voice command through the microphone 181, or the manipulation of the user's mobile device 8 by using the transparent display assembly 60 and the user's mobile device 8.

Also, an error when the refrigerator 1 operates may be diagnosed through the direct manipulation of the transparent display assembly 60, the input of the voice command through the microphone 181, or the manipulation of the user's mobile device 8, or the firmware may be updated, or program installed in the refrigerator 1 may be updated to the latest version to output the updated firmware or program through the transparent display assembly 60 and the user's mobile device 8.

Figure 41:
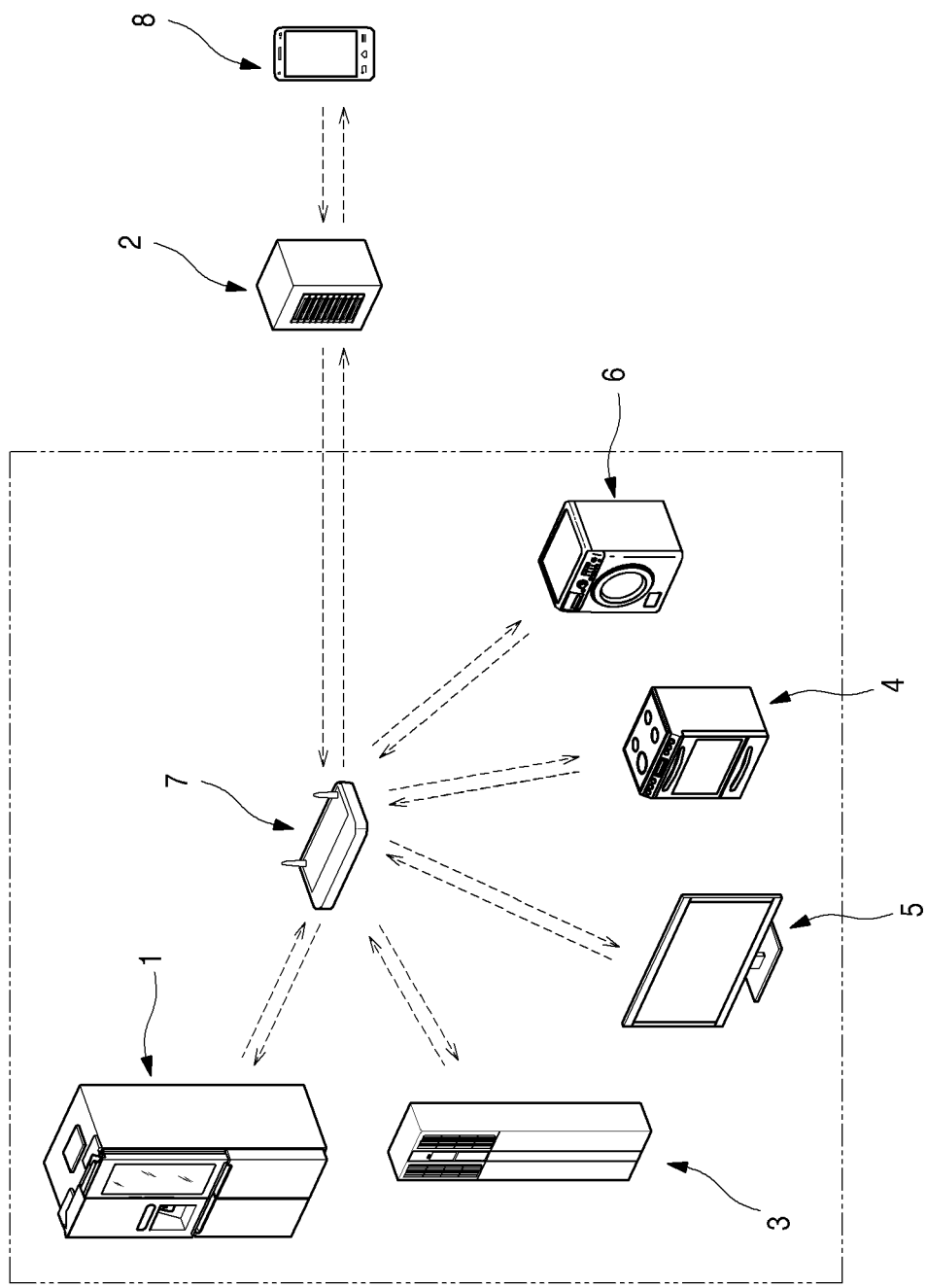
FIG. 41 is a view illustrating a home network system provided in the refrigerator.

The refrigerator 1 may be a portion of the home network and may control operations of other home appliances constituting the home network through the refrigerator 1. Hereinafter, this structure will be described in more detail with reference to the accompanying drawings. FIG. 41 is a view illustrating a home network system provided in the refrigerator.

As described above, the refrigerator 1 may be connected to a wireless router 7 by the communication unit 154, and the wireless router 7 may be connected to home appliances such as an air conditioner 3, an oven 4, a television 5, and a washing machine 6 to construct a whole home network system. Here, the refrigerator 1 may function as a main controller of the home network system in a state in which power is always supplied.

Also, the wireless router 7 may be connected to the internet server 2, and the internet server 2 may be connected to the user's mobile device 8 that is capable of outputting and inputting the information using the video and/or voice, such as a mobile phone, an exclusive terminal, a wearable device, and the like. Thus, in order to allow the user to manipulate the operation of the home appliance, a manipulation signal may be generated through the manipulation of the transparent display assembly 60 of the refrigerator 1 or the input of the voice command through the microphone 181 and then transmitted to the corresponding home appliance through the wireless router 7 so that the electronic device operates according to the corresponding manipulation. Also, the execution state of the corresponding operation may be outputted through the transparent display assembly 60 or the speaker 182.

A change in operation state of the home appliance may be stored in the internet server 2 and transmitted and outputted to the user's mobile device 8 through the internet server 2.

Alternatively, the user may control the operation of the home appliance through the user's mobile device 8. Here, the user's manipulation signal may drive the corresponding home appliance through the wireless router 7 via the internet server 2 and output the corresponding information through the transparent display assembly 60 or the speaker 182 of the refrigerator 1.

The wireless router 7 may communicate in a Wi-Fi manner, and a hub for converting the communication manner may be provided in the wireless router 7. The hub may be connected to the wireless router 7 in the Wi-Fi manner and receive signals in Bluetooth, Zigbee, Z-wave, and NEFF manners to communicate with other home appliances or other devices, which do not communicate in the Wi-Fi manner.

Thus, the hub may convert signals of the devices communicating in different manners to communicate with the wireless router 7 in the Wi-Fi manner, and vice versa. Thus, the information with respect to the manipulation of the devices through the refrigerator 1 and the hub and the operations of the devices may be outputted through the refrigerator 1.

Figure 42:
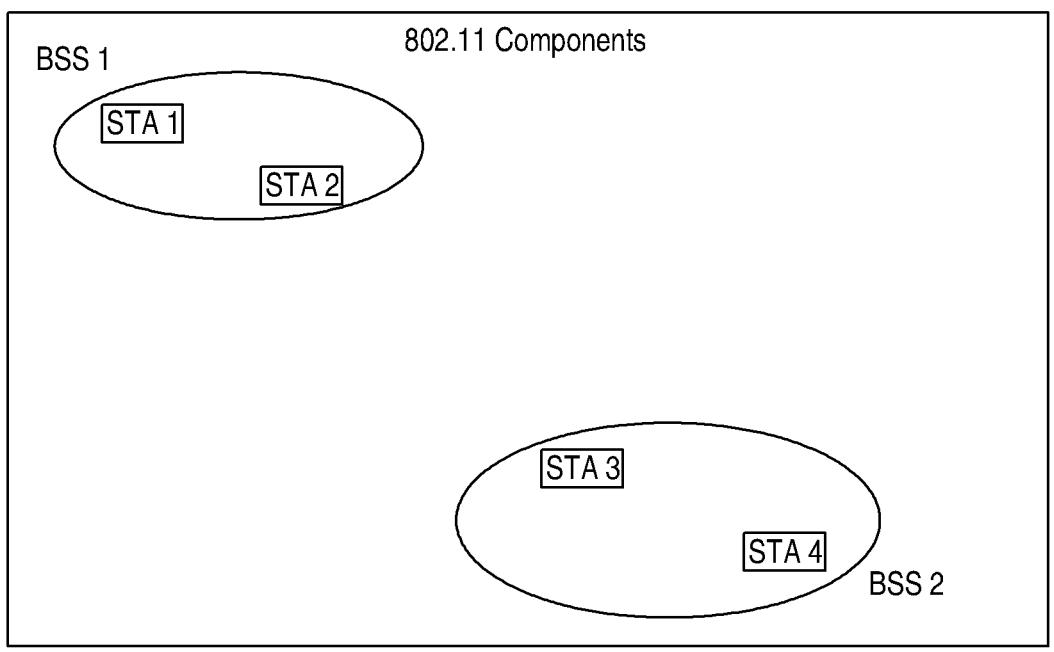
FIG. 42 is a view illustrating an exemplary structure of an IEEE 802.11 system to which the present disclosure is applicable.

Hereinafter, a communication system using Wi-FI applied to an embodiment will be described. FIG. 42 is a view illustrating an exemplary structure of an IEEE 802.11 system applied to the present disclosure.

A structure of the IEEE 802.11 system (Wi-Fi) may include a plurality of components. A WLAN which supports transparent STA mobility for a higher layer may be provided by interaction between components. A basic service set (BSS) may correspond to a basic component block in an IEEE 802.11 LAN. In FIG. 42, two BSSs (BSS1 and BSS2) are shown, and each of the BSSs includes two STAs as members thereof (i.e., STA1 and STA2 are provided in BSS1, and STA3 and STA4 are included in BSS2). In FIG. 42, an ellipse indicating each BSS may be understood as a coverage area in which the STAs provided in the BSS maintain communication. This area may be referred to as a basic service area (BSA). If an STA moves out of the BSA, the STA may not directly communicate with the other STAs within the BSA.

In the IEEE 802.11 LAN, the most basic type of BSS is an independent BSS (IBSS). For example, the IBSS may take a minimized form consisting of the two STAs. Also, the BSS (BSS1 or BSS2) of FIG. 1, which is the simplest form and in which other components are omitted, may correspond to a typical example of the IBSS. Such configuration is possible when the STAs may directly communicate with each other. Also, this type of LAN may be configured when the LAN is necessary, rather than being prescheduled. This network may be referred to as an ad-hoc network.

Memberships of an STA in a BSS may be dynamically changed depending on whether the STA is switched on or off and whether the STA enters or leaves the BSS area. The STA may use a synchronization process to join the BSS to be a member of the BSS. To access all services of a BSS infrastructure, the STA should be associated with the BSS. Such association may be dynamically established and may involve use of a distribution system service (DSS).

Figure 43:
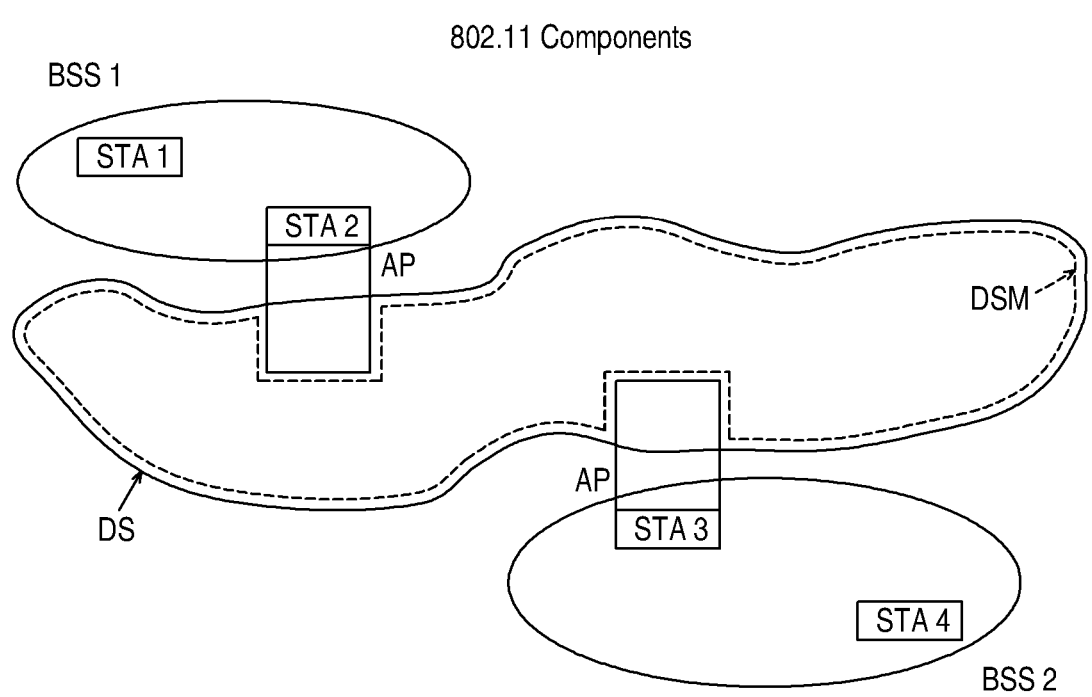
FIG. 43 is a view illustrating another exemplary structure of the IEEE 802.11 system to which the present disclosure is applicable.

FIG. 43 is a view illustrating another exemplary structure of an IEEE 802.11 system applied to the present disclosure. In FIG. 43, components such as a distribution system (DS), a distribution system medium (DSM), and an access point (AP) are added to the structure of FIG. 42.

A direct STA-to-STA distance in a LAN may be limited by physical layer (PHY) performance. In some cases, such limited distance may be sufficient for communication. However, in other cases, communication between the STAs over a long distance may be necessary. The DS may be configured to support extended coverage.

The DS refers to a structure in which the BSSs are connected to each other. Specifically, a BSS may be configured as a component of an extended form of a network including a plurality of BSSs, rather than being independently present as shown in FIG. 42.

The DS is a logical concept and may be specified by the characteristics of the DSM. In this regard, a wireless medium (WM) and the DSM are logically distinguished from each other in IEEE 802.11. Respective logical media are used for different purposes and are used by different components. According to IEEE 802.11, such media are not restricted to either the same or different media. The flexibility of the IEEE 802.11 LAN architecture (DS architecture or other network architectures) may be explained by the fact that plural media are logically different from each other. That is, the IEEE 802.11 LAN architecture may be implemented in various manners and may be independently specified by a physical property of each implementation. The DS may support mobile devices by providing seamless integration of multiple BSSs and providing logical services necessary for handling an address to a destination.

The AP refers to an entity that enables the associated STAs to access the DS through a WM and that has STA functionality. Data may move between the BSS and the DS through the AP. For example, STA2 and STA3 shown in FIG. 43 have STA functionality and provide a function of causing the associated STAs (STA1 and STA4) to access the DS. Moreover, since all APs basically correspond to the STAs, all APs are addressable entities. An address used by an AP for communication on the WM need not be identical to an address used by the AP for communication on the DSM.

Data transmitted from one of the STAs associated with the AP to an STA address of the AP may always be received by an uncontrolled port and may be processed by an IEEE 802.1X port access entity. Once the controlled port is authenticated, data (or frames) may be transmitted to the DS.

Figure 44:
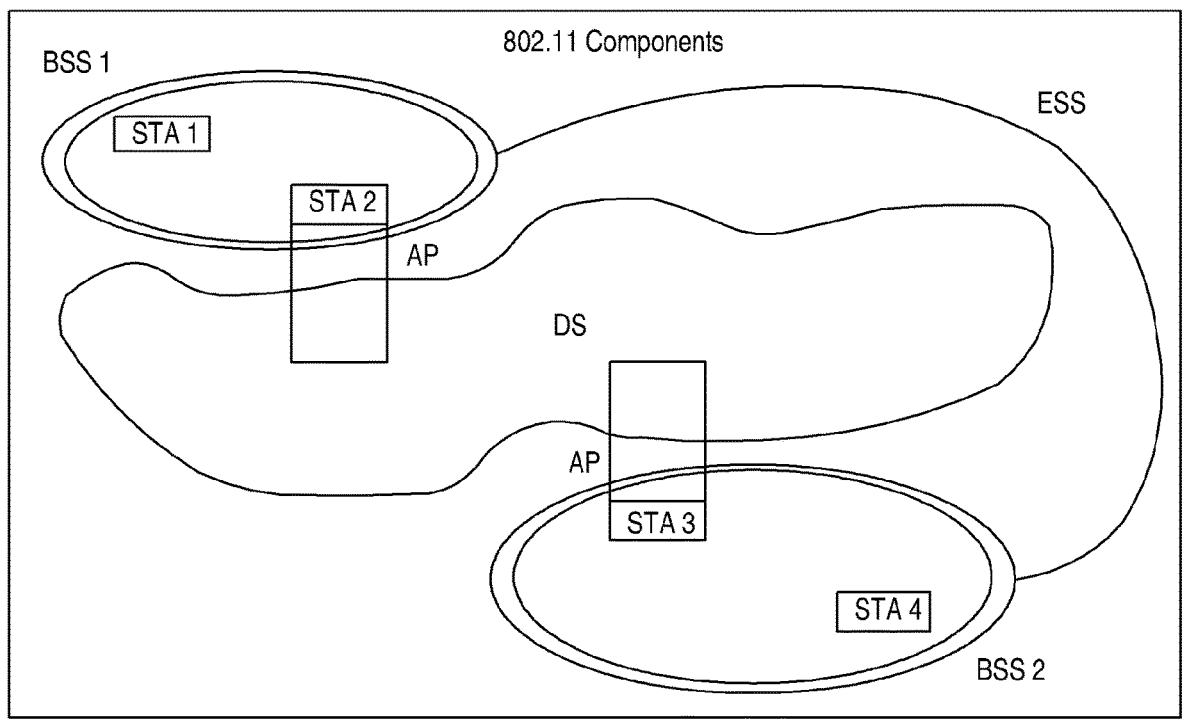
FIG. 44 is a view illustrating further another exemplary structure of the IEEE 802.11 system to which the present disclosure is applicable.

FIG. 44 is a view illustrating further another exemplary structure of an IEEE 802.11 system applied to the present disclosure. In addition to the structure of FIG. 44, FIG. 43 conceptually illustrates an extended service set (ESS) for providing wide coverage. A wireless network having arbitrary size and complexity may be constructed by a DS and BSSs. In the IEEE 802.11 system, this type of network is referred to as an ESS network. The ESS may correspond to a set of the BSSs connected to one DS. However, the ESS does not include the DS. The ESS network is characterized in that the ESS network is viewed as an IBSS network in a logical link control (LLC) layer. The STAs included in the ESS may communicate with each other and mobile STAs are movable transparently from one BSS to another BSS (within the same ESS) in LLC.

Regarding relative physical locations of the BSSs in FIG. 43, IEEE 802.11 does not assume any arrangement, and all the following arrangements are possible. The BSSs may partially overlap and this positional arrangement is generally used to provide continuous coverage. In addition, the BSSs may not be physically connected, and a distance between the BSSs is not logically limited. The BSSs may be located at the same physical position and this positional arrangement may be adopted to provide redundancy. One (or at least one) IBSS or ESS network may be physically present in one space as one (or at least one) ESS network. This may correspond to an ESS network form taken in the case in which an ad-hoc network operates in a location where the ESS network is present, in the case in which IEEE 802.11 networks of different organizations physically overlap, or in the case in which two or more different access and security policies are needed at the same location.

The following effects may be expected in the refrigerator according to the proposed embodiments. In the refrigerator according to the embodiments, the see-through part that sees the accommodation space may be provided in the door. The see-through part may include the transparent display and be selectively transparent or opaque according to the turn-on/off of the door light and the display light. Thus, the user may confirm the accommodation space through the see-through part by the user's manipulation without opening the door to improve the user's convenience and reduce the power consumption.

Also, in the see-through part, the display may operate according to the user's manipulation to display various screens and thereby to provide various pieces of information for the user's convenience and allow the user to input the manipulation thereof, thereby improving the user's convenience. Also, the user may instruct the operation to the refrigerator through the voice command, and the performed state of the voice command may be confirmed by the screen displayed through the see-through part on the door to improve the user's convenience.

Also, when the voice command is inputted, the voice command may be inputted in the state in which the user is capable of seeing the accommodation space inside the refrigerator through the initial screen to confirm the accommodated state inside the refrigerator and thus require the operation according to the accommodated state as the voice command.

Particularly, in the process before the voice command is inputted, the see-through part may be the brightest or the most transparent so that the inside of the refrigerator is more easily confirmed, and also, in the subsequent process, the brightness of the see-through part may be darker or less transparent so that the readability of the information output through the screen of the see-through part is more improved.

Also, the display PCB controlling the transparent display assembly may be provided, and the additional controller module using the separate voice recognition module and/or other operating system for the use of the voice recognition function may be selectively connected to the display PCB to minimize the change in design of the display PCB according to the model.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

Embodiments provide a refrigerator in which at least a portion of a refrigerator door is selectively transparent by user's manipulation to allow the user to see the inside of the refrigerator even though the refrigerator door is closed, and simultaneously, to selectively output a screen. Embodiments also provide a refrigerator in which a see-through part constituting a portion of a door is capable of being transparent or opaque or outputting a screen according to selective turn-on/off of a door light or a display light.

Embodiments also provide a refrigerator which is capable of confirming a state inside the refrigerator through a see-through part to give a command through a user's voice input. Embodiments also provide a refrigerator which is capable of easily inputting a user's voice command and displaying a state of voice command processing.

Embodiments also provide a refrigerator which is capable of selectively using a voice recognition module that performs an operation according to a voice command in a display PCB controlling a transparent display assembly to minimize a change in design according to a model. Embodiments also provide a refrigerator which is capable of selectively using an additional controller module that operates as a separate operating system in a display PCB controlling a transparent display assembly to minimize a change in design according to a model.

In one embodiment, an artificial intelligence refrigerator includes: a cabinet defining a storage space; a door opening and closing the cabinet; a transparent display assembly which covers an opened see-through part of the door and through which an inner space of the artificial intelligence refrigerator is seen, and a screen is outputted; a display PCB controlling an operation of the transparent display assembly; a voice recognition unit connected to the display PCB to process a user's voice signal; and a microphone connected to the voice recognition unit, wherein the display PCB outputs output screens of the transparent display assembly in stages according to a processing state of the voice signal when a user's voice is inputted.

The voice recognition unit may be connected to the display PCB to constitute one board. The voice recognition unit may be provided as a separate voice recognition module and connected to the display PCB by a connector. An additional controller which is provided as a separate additional controller and connected to a second connector and in which an operating system different from an operating system on the display PCB, which is realized on the transparent display assembly, is stored may be further disposed at one side of the display PCB.

A communication unit communicating with home appliances connected through a remote internet server or a network may be further disposed on the display PCB, and a voice may be inputted through the microphone to control the processing through the connection of the internet server and operation of the home appliance. A communication unit directly communicating with an indoor home appliance through near field wireless communication may be further disposed on the display PCB, and a voice may be inputted trough the microphone to control an operation of the home appliance.

The display PCB may allow the transparent display assembly to be the brightest or the most transparent to facilitate the seeing of the inside of the refrigerator before the user inputs the voice signal, and the display PCB may control the transparent display assembly to be relatively darker or less transparent so that readability of the output of the screen through the transparent display assembly after the user inputs the voice signal. The display PCB may be connected to a main PCB controlling an overall operation of the refrigerator to control the operation of the refrigerator through the main PCB by the voice signal inputted through the microphone.

The transparent display assembly may be converted into a screen that is capable of inputting a voice command after an initial screen is outputted due to touch manipulation so as to activate a user's voice command input function. The transparent display assembly may be converted into a screen that is capable of inputting a voice command when a specific command is inputted through the microphone so as to activate a user's voice command input function.

When the voice is inputted, the output screens of the transparent display assembly may be converted in the following order: an initial screen outputted to allow the inside of the door to be seen; a voice input standby screen outputted when manipulation for a voice command input is performed on the initial screen; a voice input screen outputted when the user inputs the voice command on the voice input standby screen; an operation processing screen outputted when the input of the voice command is completed; and a response screen outputting an operation processing result together with the voice.

The transparent display assembly may operate to be the brightest or the most transparent on the initial screen. The voice input standby screen, the voice input screen, the operation processing screen, and the response screen may output status bars and phrases different from each other to identify the present state.

A menu button may be outputted on the initial screen, and although the menu button is not outputted on the voice input standby screen, the voice input screen, the operation processing screen, and the response screen, when a corresponding position is touched, the menu button may be executed. A cancel button may be outputted on the voice input standby screen, the voice input screen, the operation processing screen, and the response screen, and when the cancel button is manipulated, the screen may return to the initial screen.

When turn-off of the microphone is confirmed on the voice input standby screen, a microphone off screen may be outputted, and the response screen for outputting the microphone off screen may be outputted. When an occurrence of a system error is confirmed on the voice input standby screen, a system error screen may be outputted, and the response screen for outputting the system error screen may be outputted.

The transparent display assembly may include: a front panel defining at least a portion of a front surface of the door; a rear panel defining at least a portion of a rear surface of the door; an outer spacer coming into contact with the front panel and the rear panel to maintain a space therebetween and disposed along a circumference of each of the front panel and the rear panel to define a sealed space therein; a display disposed on a rear surface of the front panel within the sealed space; a light guide plate spaced apart from the display to brighten up the display; and a first spacer supporting the light guide plate and maintaining a distance between the display and the light guide plate within the sealed space.

The microphone may be disposed on the refrigerator door or the cabinet to face a front side. The microphone may be provided in plurality, and the plurality of microphones may be disposed to be spaced a preset distance from each other so that the user's voice signal is easily received and analyzed.

In certain implementations, a refrigerator may comprise: a cabinet defining a storage space; a door configured to open and close the storage space, the door having an opening; a light device provided in the cabinet or the door; a transparent display assembly that is provided in the opening of the door, the transparent display assembly including: a front panel and a rear panel; a first spacer provided between the front panel and the rear panel, wherein a sealed space is defined by the front panel, the rear panel and the first spacer; a display provided within the sealed space; and a back light configured to emit light to illuminate the display based on operation of the display; a microphone configured to receive an audio input, wherein the transparent display assembly is configured to operate in a plurality of states, the plurality of states including: a transparent state in which the light device is turned on to allow the inner space of the refrigerator to be visible through the transparent display assembly, an opaque state in which the light device is turned off such that the inner space of the refrigerator is not visible through the transparent display assembly, and a display state in which the back light is turned on and the display is configured to output a screen, wherein the transparent display assembly is configured to change from one of the transparent state or the opaque state to the display state when the microphone is being operated to receive the audio input, and wherein the display is configured to output the screen with an indication that the audio input is being processed in response to the microphone receiving the audio input.

The transparent display assembly is further configured to change at least one of a transparency level or a brightness level of the transparent display assembly during the display state. The transparent display assembly is further configured to: before a user inputs the audio input, change one or more of the transparency level or the brightness level of the transparent display assembly to increase a visibility of the inner space of the refrigerator through the transparent display assembly; and after the user has input the audio input, change one or more of the transparency level or the brightness level of the transparent display assembly to increases a readability of the screen outputted on the display.

The transparent display assembly is further configured to, during the display state: display an initial screen; and in response to a touch manipulation or an input of a triggering voice command through the microphone at the initial screen, switch from displaying the initial screen to displaying a screen indicating activation of a voice command input function. A first region of the initial screen associated with activating a voice recognition mode, and the transparent display assembly may be configured to switch from displaying the initial screen to displaying a voice input standby screen based on receiving an input associated with the first region to activate a voice command input function.

The transparent display assembly may be configured to: switch from displaying the voice input standby screen to displaying a voice input screen based on initially receiving the audio input while displaying the voice input standby screen. The transparent display assembly may be further configured to: switch from displaying the voice input screen to displaying an operation processing screen based on completion of receiving the audio input while displaying the voice input screen; and switch from displaying the operation processing screen to displaying a response screen based on completion of processing the audio input, the response screen including an indication of a processing result associated with processing the audio input, and a sound corresponding to the processing result is outputted while displaying the response screen.

The voice input standby screen, the voice input screen, the operation processing screen, and the response screen may include at least one of respective different status bars or different texts corresponding to respective states of the refrigerator when the voice input standby screen, the voice input screen, the operation processing screen, and the response screen are displayed.

Each of the voice input standby screen, the voice input screen, the operation processing screen, and the response screen includes a second region, wherein receiving an input associated with the second region causes the refrigerator to stop performing of the voice recognition mode, and wherein the transparent display assembly is further configured to display the initial screen based on receiving the input associated with the second region.

The transparent display assembly may be further configured to: when the microphone is turned off while the voice input standby screen is displayed, switch from displaying the voice input standby screen to displaying a microphone off screen that includes an indication that the microphone is turned off; and after displaying the microphone off screen, switch to displaying the response screen with an indication that the microphone off screen has been displayed.

The transparent display assembly may be further configured to: when a system error occurs while displaying the voice input standby screen, switch from displaying the voice input standby screen to displaying a system error screen that includes an indication that the system error has occurred; and after displaying the system error screen, switch to displaying the response screen with an indication that the system error screen has been displayed.

The refrigerator may further comprise a controller including: a display printed circuit board (PCB) configured to control an operation of the transparent display assembly; and a voice recognition unit connected to the display PCB and to the microphone, and configured to process the audio input. The voice recognition unit and the display PCB may be formed on a single board. The refrigerator may further comprise a connector to couple the voice recognition unit and the display PCB. The display PCB includes a communication unit configured to communicate with at least one home appliances through at least one of a remote internet server or a network, and the audio input received through the microphone relates to control at least one operation of the at least one home appliance.

The display PCB may include a communication unit configured to communicate with an indoor home appliance through near-field wireless communication, and the audio input received through the microphone may relate to controlling an operation of the indoor home appliance. The controller may include a main PCB configured to control an overall operation of the refrigerator, wherein the display PCB is connected to the main PCB to control the overall operation of the refrigerator based on the audio input.

The transparent display assembly may further include: a front panel; a rear panel; a first spacer provided between the front panel and the rear panel, wherein a sealed space is defined by the front panel, the rear panel, and the first spacer, and the display is positioned in the sealed space, and wherein the display is positioned on a rear surface of the front panel within the sealed space. The transparent display assembly may further include: a light guide plate spaced apart from the display and configured to guide light from the back light to the display; and a second spacer configured to support the light guide plate and to maintain a distance between the display and the light guide plate within the sealed space. The microphone may be provided at a front surface of the door or a front surface at the cabinet.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator comprising:
a cabinet defining a storage space;
a door configured to open and close the storage space, the door having an opening;
a light device provided in the cabinet or the door;
a transparent display assembly that is provided in the opening of the door, the transparent display assembly including:
a front panel and a rear panel;
a first spacer provided between the front panel and the rear panel, wherein a sealed space is defined by the front panel, the rear panel and the first spacer;
a display provided within the sealed space; and
a back light configured to emit light to illuminate the display based on operation of the display;
a microphone configured to receive an audio input,
wherein the transparent display assembly is configured to operate in a plurality of states, the plurality of states including:
a transparent state in which the light device is turned on to allow the inner space of the refrigerator to be visible through the transparent display assembly,
an opaque state in which the light device is turned off such that the inner space of the refrigerator is not visible through the transparent display assembly, and
a display state in which the back light is turned on and the display is configured to output a screen,
wherein the transparent display assembly is configured to change from one of the transparent state or the opaque state to the display state when the microphone is being operated to receive the audio input, and
wherein the display is configured to output the screen with an indication that the audio input is being processed in response to the microphone receiving the audio input.

2. The refrigerator according to claim 1, wherein the transparent display assembly is further configured to change at least one of a transparency level or a brightness level of the transparent display assembly during the display state.

3. The refrigerator according to claim 2, wherein the transparent display assembly is further configured to:
before a user inputs the audio input, change one or more of the transparency level or the brightness level of the transparent display assembly to increase a visibility of the inner space of the refrigerator through the transparent display assembly; and
after the user has input the audio input, change one or more of the transparency level or the brightness level of the transparent display assembly to increase a readability of the screen outputted on the display.

4. The refrigerator according to claim 1, wherein the transparent display assembly is further configured to, during the display state:
display an initial screen; and
in response to a touch manipulation or an input of a triggering voice command through the microphone during the display of the initial screen, switch from displaying the initial screen to displaying a screen indicating activation of a voice command input function.

5. The refrigerator according to claim 4, wherein a first region of the initial screen is associated with activating a voice recognition mode to receive the audio content, and
wherein the transparent display assembly is configured to switch from displaying the initial screen to displaying a voice input standby screen based on receiving an input associated with the first region to activate the voice command input function.

6. The refrigerator according to claim 5, wherein the transparent display assembly is further configured to:
switch from displaying the voice input standby screen to displaying a voice input screen based on a portion of the voice signal being initially received while displaying the voice input standby screen.

7. The refrigerator according to claim 6, wherein the transparent display assembly is further configured to:
switch from displaying the voice input screen to displaying an operation processing screen based on completion of receiving the voice signal while displaying the voice input screen; and
switch from displaying the operation processing screen to displaying a response screen based on completion of processing the audio input, the response screen including an indication of a processing result associated with processing the audio input,
wherein a sound corresponding to the processing result is outputted while displaying the response screen.

8. The refrigerator according to claim 7, wherein the voice input standby screen, the voice input screen, the operation processing screen, and the response screen include at least one of respective different status bars or different texts corresponding to respective states of the refrigerator when the voice input standby screen, the voice input screen, the operation processing screen, and the response screen are displayed.

9. The refrigerator according to claim 8, wherein each of the voice input standby screen, the voice input screen, the operation processing screen, and the response screen includes a second region,
wherein receiving an input associated with the second region causes the refrigerator to stop performing of the voice recognition mode, and
wherein the transparent display assembly is further configured to display the initial screen based on receiving the input associated with the second region.

10. The refrigerator according to claim 7, wherein the transparent display assembly is further configured to:
when the microphone is turned off while the voice input standby screen is displayed, switch from displaying the voice input standby screen to displaying a microphone off screen that includes an indication that the microphone is turned off; and
after displaying the microphone off screen, switch to displaying the response screen with an indication that the microphone off screen has been displayed.

11. The refrigerator according to claim 7, wherein the transparent display assembly is further configured to:
when a system error occurs while displaying the voice input standby screen, switch from displaying the voice input standby screen to displaying a system error screen that includes an indication that the system error has occurred; and after displaying the system error screen, switch to displaying the response screen with an indication that the system error screen has been displayed.

12. The refrigerator according to claim 1, further comprising a controller including:
a display printed circuit board (PCB) configured to control an operation of the transparent display assembly; and
a voice recognition unit configured to process the audio input.

13. The refrigerator according to claim 12, wherein the voice recognition unit and the display PCB are formed on a single board.

14. The refrigerator according to claim 12, further comprising a connector to couple the voice recognition unit and the display PCB.

15. The refrigerator according to claim 12, wherein the display PCB includes a communication unit configured to communicate with at least one home appliance through at least one of a remote internet server or a network, and
wherein the audio input received through the microphone relates to control at least one operation of the at least one home appliance.

16. The refrigerator according to claim 12, wherein the display PCB includes a communication unit configured to communicate with an indoor home appliance through near-field wireless communications, and
wherein the audio input received through the microphone relates to controlling an operation of the indoor home appliance.

17. The refrigerator according to claim 12, wherein the controller includes a main PCB configured to control an operation of the refrigerator,
wherein the display PCB is connected to the main PCB to control the operation of the refrigerator based on the audio input.

18. The refrigerator according to claim 1, wherein the display is provided on a rear surface of the front panel within the sealed space.

19. The refrigerator according to claim 1, wherein the transparent display assembly further includes:
a light guide plate spaced apart from the display and configured to guide light from the back light to the display; and
a second spacer configured to support the light guide plate and to maintain a distance between the display and the light guide plate within the sealed space.

20. The refrigerator according to claim 1, wherein the microphone is provided at a front surface of the door or a front surface at the cabinet.

* * * * *